US010047294B2

(12) United States Patent
Morishima et al.

(10) Patent No.: US 10,047,294 B2
(45) Date of Patent: *Aug. 14, 2018

(54) POLARIZING FILM, DISPLAY DEVICE AND PRODUCTION PROCESS THEREOF

(71) Applicant: FUJIFILM Corporation, Minato-ku, Tokyo (JP)

(72) Inventors: Shinichi Morishima, Kanagawa (JP); Nobutaka Iwahashi, Kanagawa (JP); Masashi Ogiyama, Kanagawa (JP); Minoru Uemura, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 15/172,282

(22) Filed: Jun. 3, 2016

(65) Prior Publication Data

US 2016/0280999 A1 Sep. 29, 2016

Related U.S. Application Data

(63) Continuation of application No. 13/638,313, filed as application No. PCT/JP2011/057691 on Mar. 28, 2011, now Pat. No. 9,382,481.

(30) Foreign Application Priority Data

Mar. 31, 2010 (JP) ................................ 2010-082742

(51) Int. Cl.

| | |
|---|---|
| *C09B 29/08* | (2006.01) |
| *C09B 31/16* | (2006.01) |
| *C09B 31/30* | (2006.01) |
| *C09B 33/18* | (2006.01) |
| *C09B 56/02* | (2006.01) |
| *C09B 56/06* | (2006.01) |
| *G02F 1/1337* | (2006.01) |
| *G02B 5/30* | (2006.01) |
| *C09K 19/60* | (2006.01) |
| *G02F 1/1335* | (2006.01) |
| *C09B 31/043* | (2006.01) |
| *C09B 31/18* | (2006.01) |
| *C09B 33/22* | (2006.01) |
| *G02B 1/10* | (2015.01) |
| *B05D 3/06* | (2006.01) |
| *B05D 3/02* | (2006.01) |

(52) U.S. Cl.

CPC .......... *C09K 19/601* (2013.01); *C09B 29/081* (2013.01); *C09B 29/083* (2013.01); *C09B 31/043* (2013.01); *C09B 31/18* (2013.01); *C09B 31/30* (2013.01); *C09B 33/22* (2013.01); *C09B 56/02* (2013.01); *C09B 56/06* (2013.01); *G02B 5/3016* (2013.01); *G02F 1/133528* (2013.01); *B05D 3/0218* (2013.01); *B05D 3/062* (2013.01); *G02B 1/10* (2013.01); *G02B 5/30* (2013.01); *G02F 1/133788* (2013.01)

(58) Field of Classification Search

CPC ........................................... G02B 5/30–5/3091

See application file for complete search history.

(56) References Cited

U.S. PATENT DOCUMENTS

| | | | |
|---|---|---|---|
| 5,166,124 A | 11/1992 | Weber | |
| 5,706,131 A | 1/1998 | Ichimura et al. | |
| 5,922,246 A | 7/1999 | Matsushita et al. | |
| 6,563,640 B1 | 5/2003 | Ignatov et al. | |
| 6,686,980 B1 | 2/2004 | Ichihashi | |
| 7,527,862 B2 | 5/2009 | Yoneyama et al. | |
| 8,623,476 B2 | 1/2014 | Morishima et al. | |
| 8,865,275 B2 | 10/2014 | Morishima et al. | |
| 8,927,070 B2 | 1/2015 | Iwahashi et al. | |
| 9,382,481 B2 * | 7/2016 | Morishima ....... | G02F 1/133528 |
| 2005/0139123 A1 | 6/2005 | Fujiwara | |
| 2006/0182902 A1 | 8/2006 | Yoneyama et al. | |
| 2009/0074373 A1 | 3/2009 | Yamano et al. | |
| 2009/0273741 A1 | 11/2009 | Amimori et al. | |
| 2009/0274853 A1 | 11/2009 | Morishima | |

FOREIGN PATENT DOCUMENTS

| | | |
|---|---|---|
| GB | 2315903 A | 2/1998 |
| JP | 5-173016 A | 7/1993 |
| JP | 7-261024 A | 10/1995 |
| JP | 8-278409 A | 10/1996 |
| JP | 10-204304 A | 8/1998 |

(Continued)

OTHER PUBLICATIONS

International Search Report (PCT/ISA/210) dated Jun. 28, 2011, by the Japanese Patent Office as the International Searching Authority for International Application No. PCT/JP2011/057691.

(Continued)

*Primary Examiner* — Ramsey E Zacharia

(74) *Attorney, Agent, or Firm* — Buchanan, Ingersoll & Rooney PC

(57) ABSTRACT

Provided is a polarizing film showing high dichroism comprising a substrate, and a photo alignment film and a light absorption anisotropic film laminated on the substrate in this order. The light absorption anisotropic film is obtained by fixing the alignment of a dichroic dye composition comprising at least one nematic liquid crystalline azo dichroic dye and in X-ray diffraction measurement thereof, diffraction peaks derived from periodic structure along a vertical direction to the alignment axis are present, the period indicated by at least one of the diffraction peaks is 3.0 to 15.0 Å and an intensity of the diffraction peak does not show a maximum value in the range of ±70° of the film normal line direction in a plane vertical to the alignment axis.

11 Claims, 1 Drawing Sheet

(56) References Cited

FOREIGN PATENT DOCUMENTS

| | | | |
|---|---|---|---|
| JP | 11-101964 | A | 4/1999 |
| JP | 2001-133630 | A | 5/2001 |
| JP | 2001-330726 | A | 11/2001 |
| JP | 2004-133208 | A | 4/2004 |
| JP | 2005-187786 | A | 7/2005 |
| JP | 2005-189393 | A | 7/2005 |
| JP | 3667637 | B2 | 7/2005 |
| JP | 3687130 | B2 | 8/2005 |
| JP | 2005-281329 | A | 10/2005 |
| JP | 2006-079011 | A | 3/2006 |
| JP | 2006-79030 | A | 3/2006 |
| JP | 2008-90317 | A | 4/2008 |
| JP | 2009-244679 | A | 10/2009 |
| JP | 2009-263649 | A | 11/2009 |
| JP | 2010-001368 | A | 1/2010 |
| JP | 4404606 | B2 | 1/2010 |

OTHER PUBLICATIONS

International Preliminary Report on Patentability dated Nov. 13, 2012, for International Application No. PCT/JP2011/057691.

Office Action dated Mar. 12, 2013, issued by the Japanese Patent Office in the corresponding Japanese Patent Application No. 2010-082742 with an English language excerption. (5 pages).

Office Action dated Aug. 18, 2014, issued by the Korean Patent Office in the corresponding Korean Patent Application No. 2012-7027859 with an English language excerption. (8 pages).

Office Action issued in corresponding Korean Patent Application No. 2012-7027859 dated Dec. 12, 2014 (8 pages).

* cited by examiner

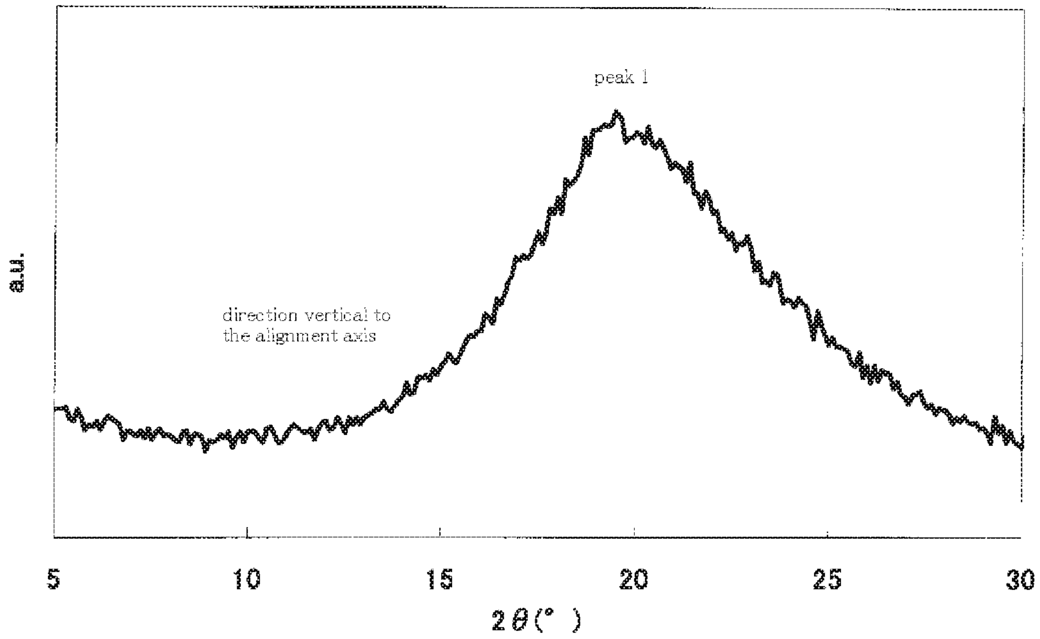
(Prior Art)

POLARIZING FILM, DISPLAY DEVICE AND PRODUCTION PROCESS THEREOF

TECHNICAL FIELD

The present invention relates to a polarizing film and a display device using the polarizing film, particularly to a polarizing film having reduced depolarization and a process for producing the same.

BACKGROUND ART

When an attenuation function, a polarization function, a scattering function, a light shielding function and the like of irradiating lights including a laser beam and natural light are required, there are conventionally used apparatuses operating according to theories varying depending on respective functions. Hence, also articles corresponding to these functions are produced by production steps varying depending on respective functions. For example, for LCD (liquid crystal device), a linear polarizing plate and a circular polarizing plate are used to control optical rotation and birefringence in display. Also in OLED (organic electroluminescence device), a circular polarizing plate is used for prevention of reflection of a light from the outside. Conventionally, iodine is widely used as a dichroic dye in these polarizing plates (polarizing device). An iodine polarizer is prepared by dissolving or adsorbing iodine in or on a polymer material such as polyvinyl alcohol, and stretching its film in the form of a film toward one direction to align a polyiodine complex. When used in a polarizing device, however, the heat resistance and the light resistance of iodine are not sufficient because of a significant sublimation property of iodine.

For this reason, a polarizing device using organic dyes as a dichroic dye has been considered. These organic dyes, however, have a problem that only a polarizing device having fairly poor dichroism is obtained as compared with iodine.

This method also has problems such as troublesome processes of a stretching treatment and the like.

Therefore, other methods have attracted attention recently. For example, there is a wet film-forming method in which a dichroic dye is aligned on a substrate made of glass, a transparent film and the like by utilizing intermolecular interaction of organic dye molecules. As a method of enhancing the dichroic ratio of an aligned dichroic dye, a dichroic dye is aligned in a phase having high orientation order in Patent Document 1. Further, Patent Documents 2 and 3 disclose a polarizing device containing a crystalline structure. However, these polarizing devices have a problem that the devices tends to cause a grain boundary with a domain, thereby causing scattering and depolarization since these polarizing devices have a low symmetry and high order structure. An azo dye having a substituent imparting water-solubility such as a sulfo group, a carboxyl group and the like described in Patent Document 2 is difficult to subject to a uniform alignment treatment by heat aging like in the case of a thermotropic liquid crystal, and it is hard to form a coated film having a smooth surface with the azo dye, generating causes for scattering and depolarization, since the azo dye is a lyotropic liquid crystal.

As alignment treatment methods of a dichroic dye, there are known a vapor deposition method, a rubbing method and an optical alignment method. For example, in Patent Document 4, organic dye molecules are vapor-deposited from a gas phase and aligned on an alignment film. The method described in this document, however, has a problem of a complicated process thereof for production. Patent Document 5 discloses a method of spin-coating and aligning a liquid crystalline azo dye on a rubbed alignment film. Though this rubbing method is widely used conventionally as a method of aligning a liquid crystal compound, it generates static electricity and dust, thus causing a problem with the production process such as necessity of a washing step after the alignment treatment leading to a decrease in yield, and a problem on performance such as lowering of contrast.

On the other hand, an optical alignment method has recently attracted attention as an alignment treatment method instead of this rubbing method, since a washing step after the alignment treatment is not necessary in the optical alignment method. For example, Patent Document 6 discloses a polarizing device obtained by coating and aligning dichroic molecules having a hydrophilic substituent such as a sulfonate group, an amino group, a hydroxyl group and the like on a layer having photoactive molecules (a so-called photo alignment film). Patent Documents 7 and 8 disclose a polarizing device formed by coating and aligning a composition prepared by dissolving a black dichroic dye in an ultraviolet-curable liquid crystal (a so-called guest-host type) on a photo alignment film. The polarizing devices obtained by these methods, however, are all significantly poor in dichroism as compared with an iodine polarizer, and cannot be used in liquid crystal display devices.

Recently, there has been advancement in application development of new polarizing devices aiming at improvement in display performance and the like. Patent Document 9 proposes to suppress depolarization (a so-called depolarization index) of a color filter by providing a polarizing layer (a so-called in-cell polarizing layer) between a color filter layer and a liquid crystal material layer. However, a polarizing layer disposed in a liquid crystal cell is required to attain a desired degree of polarization at a smaller film thickness, and a higher dichroism is necessary for this layer.

PRIOR ART DOCUMENT

Patent Document

Patent Document 1: JP No. 4404606
Patent Document 2: JP-A2006-79030
Patent Document 3: JP No. 3667637
Patent Document 4: JP No. 3687130
Patent Document 5: JP-A2005-189393
Patent Document 6: JP-A-H07-261024
Patent Document 7: JP-A2001-330726
Patent Document 8: JP-A-H11-101964
Patent Document 9: JP-A2008-90317

SUMMARY OF THE INVENTION

Problem to be Solved by the Invention

According to an investigation by the present inventors, when a polarizing layer is formed using a hexatic phase or a crystal phase described in Patent Document 1, a grain boundary (a so-called crystal grain boundary) is generated due to low symmetry thereof. It is found that depolarization occurs by a scattering light generated due to this grain boundary, lowering contrast. Further, in Patent Document 1, a rubbed film obtained by a rubbing treatment of a polyvinyl alcohol film is used as the alignment film. In the rubbed film, scattering occurs at a boundary surface with a polarizer, to lower contrast, because of deteriorated smoothness of the film surface. On the other hand, in Patent Document 5, a photo alignment film is used, and depolarization occurs by a scattering light generated due to fluctuated alignment of an ultraviolet-curable liquid crystal, thereby deteriorating the depolarizability.

The present invention is made in view of the above-described background art, and has an object to achieve the purposes as described below.

The present invention has an object of providing a high contrast polarizing film showing high dichroism and lowered depolarization by a scattering light and a display device equipped with this polarizing film, and a process for producing the above-described polarizing film.

SUMMARY OF THE INVENTION

The method for solving the above-mentioned problem is as follows.

<1> A polarizing film comprising a substrate, and a photo alignment film and a light absorption anisotropic film laminated on the substrate in this order, wherein the light absorption anisotropic film has a content ratio of 30% by mass or less of a liquid crystalline non-colorable low molecular weight compound and is obtained by fixing the alignment of a dichroic dye composition comprising at least one nematic liquid crystalline azo dichroic dye;

in X-ray diffraction measurement thereof, diffraction peaks derived from periodic structure along a vertical direction to the alignment axis are present, the period indicated by at least one of the diffraction peaks is 3.0 to 15.0 Å and an intensity of the diffraction peak does not show a maximum value in the range of ±70° of the film normal line direction in a plane vertical to the alignment axis.

<2> The polarizing film according to <1>, wherein at least one diffraction peak of said light absorption anisotropic film is a diffraction peak derived from the periodic structure along the inplane direction.

<3> The polarizing film according to <1> or <2>, wherein said light absorption anisotropic film shows diffraction peaks derived from the periodic structure along a direction parallel to the alignment axis in X-ray diffraction measurement thereof.

<4> The polarizing film according to <3>, wherein the period indicated by at least one of said diffraction peaks is 3.0 to 50.0 Å.

<5> The polarizing film according to any one of <1> to <4>, wherein the half-value width of at least one of said diffraction peaks is 1.0 Å or less.

<6> The polarizing film according to any one of <1> to <5>, wherein said dichroic dye composition comprises two or more dichroic dyes.

<7> The polarizing film according to any one of <1> to <6>, wherein said at least one dichroic dye is a compound represented by the following formula (I), the following formula (II), the following formula (III) or the following formula (IV):

Formula (I)

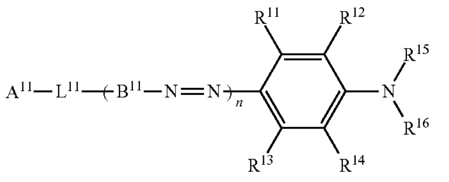

(wherein, $R^{11}$ to $R^{14}$ each represent independently a hydrogen atom or a substituent; $R^{15}$ and $R^{16}$ each represent independently a hydrogen atom or an alkyl group optionally having a substituent; $L^{11}$ represents —N═N—, —CH═N—, —N═CH—, —C(═O)O—, —OC(═O)— or —CH═CH—; $A^{11}$ representsa phenyl group optionally having a substituent, a naphthyl group optionally having a substituent or an aromatic heterocyclic group optionally having a substituent; $B^{11}$ represents a divalent aromatic hydrocarbon group optionally having a substituent or divalent aromatic heterocyclic group optionally having a substituent; n represents an integer of 1 to 5, when n is 2 or more, a plurality of $B^{11}$s may be mutually the same or different.)

Formula (II)

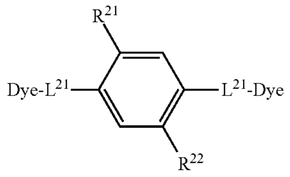

(wherein, $R^{21}$ and $R^{22}$ each represent a hydrogen atom, an alkyl group, an alkoxy group or a substituent represented by $-L^{22}-Y$, provided that, at least one of them represents a group other than a hydrogen atom; $L^{22}$ represents an alkylene group, and one $CH_2$ group or non-adjacent two or more $CH_2$ groups present in the alkylene group may each be substituted with —O—, —COO—, —OCO—, —OCOO—, —NRCOO—, —OCONR—, —CO—, —S—, —$SO_2$—, —NR—, —$NRSO_2$— or —$SO_2NR$— (R represents a hydrogen atom or an alkyl group having 1 to 4 carbons); Y represents a hydrogen atom, a hydroxy group, an alkoxy group, a carboxyl group, a halogen atom or a polymerizable group; $L^{21}$s each represent a linking group selected from the group consisting of an azo group (—N═N—), a carbonyloxy group (—C(═O)O—), an oxycarbonyl group (—O—C(═O)—), an imino group (—N═CH—) and a vinylene group (—C═C—); Dyes each represent an azo dye residue represented by the following formula (IIa);

(IIa)

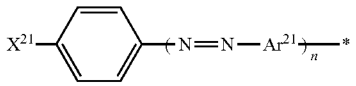

in the formula (IIa), * represents a linkage part to $L^{21}$; $X^{21}$ represents a hydroxy group, a substituted or un-substituted alkyl group, a substituted or un-substituted alkoxy group, an un-substituted amino group or a mono or dialkylamino group; $Ar^{21}$s each represent an aromatic hydrocarbon ring group optionally having a substituent or aromatic heterocyclic group optionally having a substituent; n represents an integer of 1 to 3, and when n is 2 or more, two $Ar^{21}$s may be mutually the same or different.)

Formula (III)

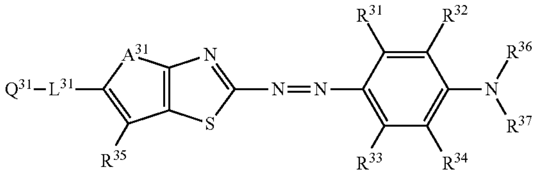

s(wherein, $R^{31}$ to $R^{35}$ each represent independently a hydrogen atom or a substituent; $R^{36}$ and $R^{37}$ each represent independently a hydrogen atom or an alkyl group optionally having a substituent; $Q^{31}$ represents an aromatic hydrocarbon group optionally having a substituent, aromatic heterocyclic group optionally having a substituent or cyclohexane ring group optionally having a substituent; $L^{31}$ represents a divalent linking group; $A^{31}$ represents an oxygen atom or a sulfur atom.)

Formula (IV)

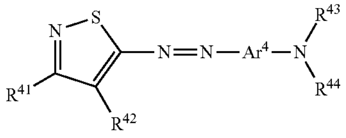

(wherein, $R^{41}$ and $R^{42}$ each represent a hydrogen atom or a substituent, and may be mutually linked to form a ring; $Ar^4$ represents an optionally substituted divalent aromatic hydrocarbon group or an optionally substituted aromatic heterocyclic group; $R^{43}$ and $R^{44}$ each represent a hydrogen atom or an optionally substituted alkyl group, and may be mutually linked to form a hetero ring.).

<8> The polarizing film according to any one of <1> to <7>, wherein said at least one dichroic dye is a squarylium dye.

<9> The polarizing film according to <8>, wherein said squarylium dye is a compound represented by the following formula (VI):

Formula (VI)

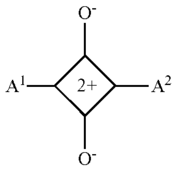

(wherein, $A^1$ and $A^2$ each represent independently a substituted or un-substituted hydrocarbon ring group or a substituted or un-substituted hydrocarbon heterocyclic group.).

<10> A display device comprising the polarizing film according to any one of <1> to <9>.

<11> A process for producing the polarizing film according to any one of <1> to <9>, comprising at least the following [1] to [3] in this order:

[1] irradiating a photo alignment film formed on a substrate,

[2] coating a dichroic dye composition dissolved in an organic solvent on the photo alignment film, and

[3] aligning the coated film of the dichroic dye composition by heating at 50° C. or higher and 250° C. or lower to give a light absorption anisotropic film.

EFFECT OF THE INVENTION

The present invention is capable of providing a high contrast polarizing film showing high dichroism and lowered depolarization by a scattering light and a display device using this polarizing film.

BRIEF DESCRIPTION OF THE DRAWING

FIG. 1 is an X-ray diffraction pattern of Comparative Example 1.

MODES FOR CARRYING OUT THE INVENTION

The present invention will be described in detail below. In the present specification, "to" is used to mean that numerical values described in the vicinity thereof indicate the lower limit and the upper limit.

1. Polarizing Film

The present invention relates to a polarizing film comprising a substrate, and a photo alignment film and alight absorption anisotropic film laminated on the substrate in this order, wherein the light absorption anisotropic film has a content ratio of 30% by mass or less of liquid crystalline non-colorable low molecular weight compound and is obtained by fixing the alignment of a dichroic dye composition comprising at least one nematic liquid crystalline azo dichroic dye.

(1)-1 Light Absorption Anisotropic Film

The light absorption anisotropic film used in the present invention is a dye film having anisotropy in any two directions selected from three directions in total in a steric coordinate system composed of a thickness direction of the dye film and any crossing inplane two directions for electromagnetic properties. Electromagnetic properties include optical properties such as absorption, refraction and the like, and electric properties such as resistance, capacity, and the like. Examples of films having optical anisotropy of absorption, refraction and the like include a linear polarizing film, a circular polarizing film, a retardation film, a resistivity anisotropic film and the like. That is, the light absorption anisotropic film of the present invention can be used as a polarizing film, a retardation film or a resistivity anisotropic film. The light absorption anisotropic film of the present invention is particularly useful as a polarizing film since it shows high absorbance over the whole visible light region.

In the polarizing film of the present invention, the above-described light absorption anisotropic film is characterized in that in its X-ray diffraction measurement, diffraction peaks derived from the periodic structure along the vertical direction to the alignment axis are present, the period indicated by at least one of the diffraction peaks is 3.0 to 15.0 Å, and the intensity of the diffraction peak does not show the maximum value in the range of ±70° of the film normal line direction in a plane vertical to the alignment axis.

Here, the alignment axis means a direction at which the light absorption anisotropic film shows the maximum absorbance against a linear polarized light, and usually coincides with the direction of the alignment treatment. For example, in a film obtained by fixing the horizontal alignment of a dichroic dye composition, the alignment axis is an axis in the film plane, and coincides with the alignment treatment direction (a direction of the largest birefringence index realized by irradiating to a photo alignment film, since a photo alignment film is used in the present invention).

In general, an azo dichroic dye forming a light absorption anisotropic film is a rod-shaped molecule having a large aspect ratio (=molecular long axis length/molecular short axis length), and transition moment absorbing visible light is present in a direction approximately corresponding to the molecular long axis direction (Non-Patent Document, Dichroic Dyes for Liquid Crystal Displays) . Therefore, if the angle made by the molecular long axis and the alignment axis of a dichroic dye is smaller on average and variation thereof is smaller, then, a light absorption anisotropic film shows a higher dichroic ratio.

The light absorption anisotropic film of the present invention shows diffraction peaks as a result of the period along the vertical direction to the alignment axis. This period corresponds, for example, to an intermolecular distance along the molecular short axis direction of a dichroic dye of which molecular long axes are adjusted and aligned to the alignment axis direction, and in the present invention, it is in the range of 3.0 to 15.0 Å, preferably 3.0 to 10.0 Å, more preferably 3.0 to 6.0 Å, further preferably 3.3 to 5.5 Å.

The light absorption anisotropic film of the present invention does not show the maximum value when distribution of the intensity of the above-described diffraction peak is measured in the range of ±70° of the film normal line direction in a plane vertical to the alignment axis. A case showing the maximum value of the intensity of the diffraction peak in this measurement indicates the presence of anisotropy in packing along the vertical direction to the alignment axis, that is, along the molecular short axis direction. This aggregate state includes specifically a crystal, a hexatic phase, a crystal phase and the like (Liquid Crystal Handbook). When packing has anisotropy, a grain boundary with a domain is generated by discontinuous packing, possibly inviting haze generation, irregular alignment of each domain, and depolarization. Thus, anisotropy in packing is not preferable. Since the light absorption anisotropic film of the present invention has no anisotropy in packing along the vertical direction to the alignment axis, a grain boundary with a domain is not generated and a uniform film is formed. This aggregate state specifically includes, but is not limited to, a nematic phase, a smectic phase A, supercooled conditions of these phases, and the like. An embodiment in which a plurality of aggregate states are mixed and present, showing the above-described diffraction peak feature in its entirety, may also be used.

The presence or absence of the maximum value when distribution of the intensity is measured in the range of ±70° of the film normal line direction in a plane vertical to the alignment axis can be confirmed by measurement using a usual X-ray diffractometer, and for example, can be confirmed by measurement according to methods described in "X-Ray Diffraction Main Summary" (CULLITY,B.D, published by Agne Gijutsu Center, 1961), "Thin Film Analysis by X-Ray Scattering: Thin Film Analysis by X-Ray Scattering" (Birkholz, Mario, Wiley, 2006), "X-Ray Crystal Structure Analysis" (Yuji Ohashi, published by Shokabo, Sep. 25, 2005), "X-Ray Analysis Introduction (Second Edition)" (Masao Sumido, Yoshio Sasada, (authors), published by Tokyo Kagaku Dojin Co., Ltd, 1973) and the like.

In general, since a light absorption anisotropic film is used against a light entering at an angle vertical to a film or approximately vertical to a film, it is preferable for the film to have a high dichroic ratio along the inplane direction. Accordingly, it is preferable that the light absorption anisotropic film has a periodic structure along the inplane direction, and shows diffraction peaks as a result of the periodic structure.

It is preferable that the light absorption anisotropic film of the present invention shows diffraction peaks as a result of the period along a direction parallel to the alignment axis. Particularly, it is preferable that molecules adjacent along the vertical direction of the alignment axis form layers and the formed layers are laminated along a direction parallel to the alignment axis. Such an aggregate state is similar to that of a smectic phase which is highly ordered than a nematic phase, and a high dichroic ratio is obtained under this aggregate state. The period includes, for example, cases corresponding to the molecular length or double length thereof, and the range is 3.0 to 50.0 Å, preferably 10.0 to 45.0 Å, more preferably 15.0 to 40.0 Å, further preferably 25.0 to 35.0 Å.

The diffraction peak shown by the light absorption anisotropic film of the present invention has a half-value width of preferably 1.0 Å or less.

Here, in one diffraction peak in the X-ray diffraction measurement, the intensity of the peak apex based on a baseline is determined, and two points existing each on the right side and the left side of the peak apex and showing the half value of the intensity are determined, and a difference between the periods of the two points is calculated to obtain the half-value width.

The light absorption anisotropic film showing diffraction peaks in X-ray diffraction measurement and realizing its half-value width of 1.0 Å or less is predicted to show a high dichroic ratio because of the following reason. When variation in an angle made by the molecular long axis and the alignment axis of a dichroic dye is large, variation in the intermolecular distance also becomes large. Then, if a periodic structure exists, also the value of its period varies, and the diffraction peak obtained in X-ray diffraction measurement becomes broad, thus showing large half-value width.

On the other hand, it is predicted that a sharp diffraction peak having half-value width of a certain value or less means that variation in the intermolecular distance is small, and an angle made by the molecular long axis and the alignment axis of a dichroic dye is small on average, that is, molecules are aligned highly ordered, and a high dichroic ratio is realized.

In the present invention, the half-value width of the above-described diffraction peak is 1.0 Å or less, preferably 0.90 Å or less, more preferably 0.70 Å or less, further preferably 0.50 Å or less and preferably 0.05 Å or more. If the half-value width is over the upper limit, variation in the intermolecular distance of a dye increases, and highly ordered alignment is prevented, and this is not preferable. If the half-value width is below the lower limit, alignment deformation tends to be generated, a grain boundary with a domain is generated, possibly inviting haze generation, irregular alignment including a domain, and depolarization, and this is not preferable.

The period of a diffraction peak and the half-value width of the light absorption anisotropic film are obtained from X-ray profiles measured by an X-ray diffractometer for thin film evaluation (manufactured by Rigaku Corporation, trade name: "ATX-G" inplane optical system) or equivalent apparatuses thereof.

Measurement of X-ray diffraction of the light absorption anisotropic film according to the present invention is carried out, for example, by the following procedure.

First, for the light absorption anisotropic film, inplane measurement is performed in all directions with an interval of 15°. A direction in the substrate plane at which the peak intensity is large is determined by so-called φ scanning. In the φ scanning, a sample is rotated in a plane parallel to the substrate while fixing the angle at which the peak is measured. Using peaks in inplane measurement at the resultant direction, the period and the half-value width can be determined.

The light absorption anisotropic film of the present invention which is obtained by fixing the alignment of a dichroic dye and has the above-described features in the period of a diffraction peak and the half-value width thereof shows a high dichroic ratio and is useful as a polarizing film.

Materials utilizable for fabrication of the light absorption anisotropic film satisfying the above-described properties in X-ray diffraction measurement and the like will be described in detail below.

In the present invention, the light absorption anisotropic film is obtained by fixing the alignment of a dichroic dye composition comprising a liquid crystalline non-colorable low molecular weight compound content of 30% by mass or less and at least one nematic liquid crystalline azo dichroic dye.

In the dichroic dye composition used in the present invention, the content of a liquid crystalline non-colorable low molecular weight compound is 30% by mass or less, preferably 20% by mass or less, more preferably 10% by mass or less, further more preferably 5% by mass or less. That is, it is preferable that, in the dichroic dye composition used in the present invention, the dichroic dye molecule is aligned by its own aligning ability or by combination with another dye and its condition is fixed, thus, the dichroic dye molecules function as a light absorption anisotropic film such as a polarizing film and the like. For example, a so-called guest-host (GH) type composition can be prepared by using a composition containing a non-colorable liquid crystal compound as the main component together with a dichroic dye, and aligning the molecule of the dichroic dye along the alignment of the molecule of the liquid crystal compound, thereby attaining a predetermined dichroic ratio, however, the above-described embodiment is capable of attaining a higher dichroic ratio and more preferable than the GH embodiment. The dichroic dye composition to be used in the present invention is capable of obtaining a high dye concentration owing to low content of a liquid crystalline non-colorable low molecular weight compound or no content thereof, thus, the light absorption anisotropic film can be made thinner by using this composition.

Here, the non-colorable liquid crystal compound means a compound showing no absorption in the spectral region of visible light, that is, in the spectral region of 400 to 700 nm and realizing a nematic liquid crystal phase or a smectic liquid crystal phase, and examples thereof include liquid crystal compounds described in "Liquid Crystal Device Handbook" Japan Society for the Promotion of Science 142nd Committee ed., The Nikkan Kogyo Shinbun, Ltd., 1989), pp. 154 to 192 and pp. 715 to 722.

In the present invention, a dichroic dye composition containing at least one nematic liquid crystalline azo dichroic dye is used. In the present invention, "dichroic dye" means a dye showing absorbance varying depending on a direction. "Dichroism" and "dichroic ratio" are calculated as the ratio of the absorbance of polarization along the absorption axis direction to the absorbance of polarization along the polarizing axis direction, when a dichroic dye composition is processed into a light absorption anisotropic film.

It is particularly preferable that the dichroic dye composition in the present invention contains at least one of the azo dyes represented by the following formulae (I), (II), (III) or (IV). It is preferable that the dichroic dye represented by the following formulae (I) to (IV) has nematic liquid crystallinity.

Formula (I)

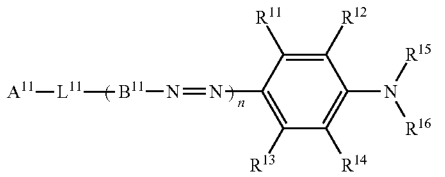

In the formula, $R^{11}$ to $R^{14}$ each represent independently a hydrogen atom or a substituent; $R^{15}$ and $R^{16}$ each represent independently a hydrogen atom or an alkyl group optionally having a substituent; $L^{11}$ represents —N=N—, —CH=N—, —N=CH—, —C(=O)O—, —OC(=O)— or —CH=CH—; $A^{11}$ represents a phenyl group optionally having a substituent, a naphthyl group optionally having a substituent or an aromatic heterocyclic group optionally having a substituent; $B^{11}$ represents a divalent aromatic hydrocarbon group optionally having a substituent or divalent aromatic heterocyclic group optionally having a substituent; n represents an integer of 1 to 5, and when n is 2 or more, a plurality of $B^{11}$s may be mutually the same or different.

The substituents represented by $R^{11}$ to $R^{14}$ in the above-described formula (I) include groups listed below.

Alkyl groups (alkyl groups preferably having 1 to 20 carbons, more preferably having 1 to 12 carbons and particularly preferably having 1 to 8 carbons, and examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group and the like), alkenyl groups (alkenyl groups preferably having 2 to 20 carbons, more preferably having 2 to 12 carbons and particularly preferably having 2 to 8 carbons, and examples thereof include a vinyl group, an aryl group, a 2-butenyl group, a 3-pentenyl group and the like) , alkynyl groups (alkynyl groups preferably having 2 to 20 carbons, more preferably having 2 to 12 carbons and particularly preferably having 2 to 8 carbons, and examples thereof include a propargyl group, a 3-pentynyl group and the like), aryl groups (aryl groups preferably having 6 to 30 carbons, more preferably having 6 to 20 carbons and particularly preferably having 6 to 12 carbons, and examples thereof include a phenyl group, a 2,6-diethylphenyl group, a 3,5-ditrifluoromethylphenyl group, a naphthyl group, a biphenyl group and the like), substituted or un-substituted amino groups (amino groups preferably having 0 to 20 carbons, more preferably having 0 to 10 carbons and particularly preferably having 0 to 6 carbons, and examples thereof include an un-substituted amino group, a methylamino group, a dimethylamino group, a diethylamino group, an anilino group and the like), alkoxy groups (preferably having 1 to 20 carbons, more preferably having 1 to 10 carbons and particularly preferably having 1 to 6 carbons, and examples thereof include a methoxy group, an ethoxy group, a butoxy group and the like), oxycarbonyl groups (preferably having 2 to 20 carbons, more preferably having 2 to 15 carbons and particularly preferably having 2 to 10 carbons, and examples thereof include a methoxycarbonyl group, an ethoxycarbonyl group, a phenoxycarbonyl group and the like), acyloxy groups (preferably having 2 to 20 carbons, more preferably having 2 to 10 carbons and particularly preferably having 2 to 6 carbons, and examples thereof include an acetoxy group, a benzoyloxy group and the like), acylamino groups (preferably having 2 to 20 carbons, more preferably having 2 to 10 carbons and particularly preferably having 2 to 6 carbons, and examples thereof include an acetylamino group, a benzoylamino group and the like), alkoxycarbonylamino groups (preferably having 2 to 20 carbons, more preferably having 2 to 10 carbons and particularly preferably having 2 to 6 carbons, and examples thereof include a methoxycarbonylamino group and the like), aryloxycarbonylamino groups (preferably having 7 to carbons, more preferably having 7 to 16 carbons and particularly preferably having 7 to 12 carbons, and examples thereof include a phenyloxycarbonylamino group and the like), sulfonylamino groups (preferably having 1 to 20 carbons, more preferably having 1 to 10 carbons and particularly preferably having 1 to 6 carbons, and examples thereof include a methanesulfonylamino group, a benzenesulfonylamino group and the like), sulfamoyl groups (preferably having 0 to 20 carbons, more preferably having 0 to 10 carbons and particularly preferably having 0 to 6 carbons, and examples thereof include a sulfamoyl group, a methylsulfamoyl group, a dimethylsulfamoyl group, a phenylsulfamoyl group and the like), carbamoyl groups (preferably having 1 to 20 carbons, more preferably having 1 to 10 carbons and particularly preferably having 1 to 6 carbons, and examples thereof include an un-substituted carbamoyl group, a methylcarbamoyl group, a diethylcarbamoyl group, a phenylcarbamoyl group and the like), alkylthio groups (preferably having 1 to 20 carbons, more preferably having 1 to 10 carbons and particularly preferably having 1 to 6 carbons, and examples thereof include a methylthio group, an ethylthio group and the like), arylthio groups (preferably having 6 to 20 carbons, more preferably having 6 to 16 carbons and particularly preferably having 6 to 12 carbons, and examples thereof include a phenylthio group and the like), sulfonyl groups (preferably having 1 to 20 carbons, more preferably having 1 to 10 carbons and particularly preferably having 1 to 6 carbons, and examples thereof include a mesyl group, a tosyl group and the like), sulfinyl groups (preferably having 1 to 20 carbons, more preferably having 1 to 10 carbons and particularly preferably having 1 to 6 carbons, and examples thereof include a methanesulfinyl group, a benzenesulfinyl group and the like), ureide groups (preferably having 1 to 20 carbons, more preferably having 1 to 10 carbons and particularly preferably having 1 to 6 carbons, and examples thereof include an un-substituted ureide group, a methylureide group, a phenylureide group and the like), phosphoric amide groups (preferably having 1 to 20 carbons, more preferably having 1 to 10 carbons and particularly preferably having 1 to 6 carbons, and examples thereof include a diethylphosphoric amide group, a phenylphosphoric amide group and the like), a hydroxy group, mercapto groups, halogen atoms (for example, a fluorine atom, a chlorine atom, a bromine atom, an iodine atom), a cyano group, a nitro group, a hydroxamic acid group, a sulfino group, a hydrazino group, an imino group (—CH=N— or —N=CH—), an azo group, hetero ring groups (hetero ring groups preferably having 1 to 30 carbons and more preferably having 1 to 12 carbons, for example, hetero ring groups having a hetero atom such as a nitrogen atom, an oxygen atom, a sulfur atom and the like, and examples thereof include an imidazolyl group, a pyridyl group, a quinolyl group, a furyl group, a piperidyl group, a morpholino group, a benzoxazolyl group, a benzimidazolyl group, a benzthiazolyl group and the like), silyl groups (silyl groups preferably having 3 to 40 carbons, more preferably having 3 to 30 carbons and particularly preferably having 3 to 24 carbons, and examples thereof include a trimethylsilyl group, a triphenylsilyl group and the like).

These substituents may be further substituted with these substituents. When two or more substituents are carried, these may be the same or different. If possible, these may be mutually linked to form a ring.

The group represented by $R^{11}$ to $R^{14}$ is preferably a hydrogen atom, an alkyl group, an alkoxy group or a halogen atom, more preferably a hydrogen atom, an alkyl group or an alkoxy group, further preferably a hydrogen atom or a methyl group.

The alkyl groups optionally having a substituent represented by $R^{15}$ and $R^{16}$ are alkyl groups preferably having 1 to 20 carbons, more preferably having 1 to 12 carbons and particularly preferably having 1 to 8 carbons, and examples thereof include a methyl group, an ethyl group, an n-octyl group and the like. The substituents of the alkyl groups represented by $R^{15}$ and $R^{16}$ are the same as the substituents represented by $R^{11}$ to $R^{14}$ described above. When $R^{15}$ or $R^{16}$ represents an alkyl group, it may be linked with $R^{12}$ or $R^{14}$ to form a cyclic structure. $R^{15}$ and $R^{16}$ are preferably a hydrogen atom or an alkyl group, more preferably a hydrogen atom, a methyl group or an ethyl group.

$A^{11}$ represents a phenyl group optionally having a substituent, a naphthyl group optionally having a substituent or an aromatic heterocyclic group optionally having a substituent.

The substituent optionally carried on the phenyl group or the naphthyl group is preferably a group introduced to enhance solubility or nematic liquid crystallinity of an azo compound, a group having an electron donative property or an electron withdrawing property introduced to adjust the color tone as a dye or a group having a polymerizable group introduced to fix alignment, and specifically, is the same as the substituent represented by $R^{11}$ to $R^{14}$ described above. Preferable are an alkyl group optionally having a substituent, an alkenyl group optionally having a substituent, an alkynyl group optionally having a substituent, an aryl group optionally having a substituent, an alkoxy group optionally having a substituent, an oxycarbonyl group optionally having a substituent, an acyloxy group optionally having a substituent, an acylamino group optionally having a substituent, an amino group optionally having a substituent, an alkoxycarbonylamino group optionally having a substituent, a sulfonylamino group optionally having a substituent, a sulfamoyl group optionally having a substituent, a carbamoyl group optionally having a substituent, an alkylthio group optionally having a substituent, a sulfonyl group optionally having a substituent, a ureide group optionally having a substituent, a nitro group, a hydroxy group, a cyano group, an imino group, an azo group and a halogen atom, and particularly preferable are an alkyl group optionally having a substituent, an alkenyl group optionally having a substituent, an aryl group optionally having a substituent, an alkoxy group optionally having a substituent, an oxycarbonyl group optionally having a substituent, an acyloxy group optionally having a substituent, a nitro group, an imino group and an azo group. The preferable range of the number of carbon atoms of the above-mentioned substituents having a carbon atom is the same as the preferable range of the number of carbon atoms for the substituents represented by $R^{11}$ to $R^{14}$.

The phenyl group or the naphthyl group may have 1 to 5 of these substituents, preferably has one substituent. It is more preferable for the phenyl group that one substituent is carried at a para-position with respect to $L^1$.

As the aromatic heterocyclic group, groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridyl group, a quinolyl group, a thiophenyl group, a thiazolyl group, a benzothiazolyl group, a thiadiazolyl group, a quinolonyl group, a naphthalimidyl group, a thienothiazolyl group and the like.

The aromatic heterocyclic group is preferably a pyridyl group, a quinolyl group, a thiazolyl group, a benzothiazolyl group, a thiadiazolyl group or a thienothiazolyl group, more preferably a pyridyl group, a benzothiazolyl group, a thiadiazolyl group or a thienothiazolyl group, further preferably a pyridyl group, a benzothiazolyl group or a thienothiazolyl group.

$A^{11}$ represents particularly preferably a phenyl group optionally having a substituent, a pyridyl group optionally having a substituent, a benzothiazolyl group optionally having a substituent or a thienothiazolyl group optionally having a substituent.

$B^{11}$ represents a divalent aromatic hydrocarbon group optionally having a substituent or divalent aromatic heterocyclic group optionally having a substituent. n represents 1 to 4, when n is 2 or more, a plurality of $B^{11}$'s may be mutually the same or different.

The aromatic hydrocarbon group is preferably a phenyl group or a naphthyl group. The substituent optionally carried on the aromatic hydrocarbon group includes an alkyl group optionally having a substituent, an alkoxy group optionally having a substituent, a hydroxy group, a nitro group, a halogen atom, an amino group optionally having a substituent, an acylamino group optionally having a substituent and a cyano group. As the substituent optionally carried on the aromatic hydrocarbon group, an alkyl group optionally having a substituent, an alkoxy group optionally having a substituent, a hydroxy group and a halogen atom are preferable, an alkyl group optionally having a substituent, an alkoxy group optionally having a substituent and a halogen atom are more preferable, and a methyl group or a halogen atom is further preferable.

As the aromatic heterocyclic group, groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridyl group, a quinolyl group, an isoquinolyl group, a benzothiadiazole group, a phthalimide group, a thienothiazole group and the like. Among them, a thienothiazole group is particularly preferable.

The substituent optionally carried on the aromatic heterocyclic group includes alkyl groups such as a methyl group, an ethyl group and the like; alkoxy groups such as a methoxy group, an ethoxy group and the like; an unsubstituted amino group or amino groups such as a methylamino group and the like; an acetylamino group, an acylamino group, a nitro group, a hydroxy group, a cyano group, a halogen atom and the like. The preferable range of the number of carbon atoms of the above-mentioned substituents having a carbon atom is the same as the preferable range of the number of carbon atoms for the substituents represented by $R^{11}$ to $R^{14}$.

Preferable examples of the azo dye represented by the above-described formula (I) include azo dyes represented by any of the following formulae (Ia) and (Ib).

Formula (Ia)

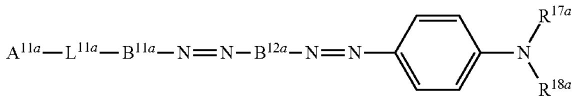

In the formula, $R^{17a}$ and $R^{18a}$ each represent independently a hydrogen atom, a methyl group or an ethyl group; $L^{11a}$ represents —N═N—, —N═CH—, —O(C═O)— or —CH═CH—; $A^{11a}$ represents a group represented by the following formula (Ia-I) or (Ia-III); $B^{11a}$ and $B^{12a}$ each represent independently a group represented by the following formula (Ia-IV), (Ia-V) or (Ia-VI);

(Ia-II)

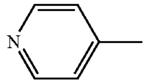

(Ia-III)

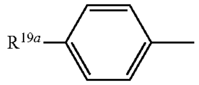

In the formula, $R^{19a}$ represents an alkyl group optionally having a substituent, an aryl group optionally having a substituent, an alkoxy group optionally having a substituent, an oxycarbonyl group optionally having a substituent or an acyloxy group optionally having a substituent.

(Ia-IV)

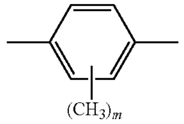

(Ia-V)

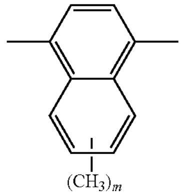

(Ia-VI)

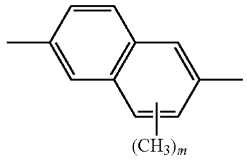

In the formula, m represents an integer of 0 to 2.

Formula (Ib)

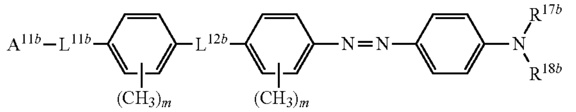

In the formula, $R^{17b}$ and $R^{18b}$ each represent independently a hydrogen atom, a methyl group or an ethyl group; $L^{11b}$ represents —N═N— or —(C═O)O—; $L^{12b}$ represents —N═CH—, —(C═O)O— or —O(C═O)—; $A^{11b}$ represents a group represented by the following formula (Ib-II) or (Ib-III);mrepresents an integer of 0 to 2;

(Ib-II)

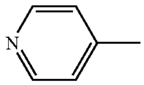

(Ib-III)

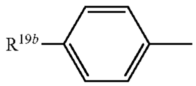

In the formula, $R^{19b}$ represents an alkyl group optionally having a substituent, an aryl group optionally having a substituent, an alkoxy group optionally having a substituent, an oxycarbonyl group optionally having a substituent or an acyloxy group optionally having a substituent.

Examples of the substituent carried on each group in the above-described formulae (Ia) and (Ib) are the same as the examples of the substituent represented by $R^{11}$ to $R^{14}$ in the formula (I) . The preferable range of the number of carbon atoms of the alkyl groups and the like having a carbon atom is the same as the preferable range of the number of carbon atoms for the substituents represented by $R^{11}$ to $R^{14}$.

The compound represented by the above-described formulae (I), (Ia) and (Ib) may have a polymerizable group as a substituent. It is preferable to have a polymerizable group since a film curing property is improved. Examples of the polymerizable group include unsaturated polymerizable groups, an epoxy group and an aziridinyl group, and unsaturated polymerizable groups are preferable and an ethylenically unsaturated polymerizable group is particularly preferable. Examples of the ethylenically unsaturated polymerizable group include an acryloyl group and a methacryloyl group.

It is preferable that the polymerizable group is situated at the molecular end, that is, it is preferable that, in the formula (I), the polymerizable group is present as a substituent of $R^{15}$ and/or $R^{16}$ and as a substituent of $Ar^{11}$.

Specific examples of the azo dye represented by the formula (I) include, but are not limited to, the following specific examples.

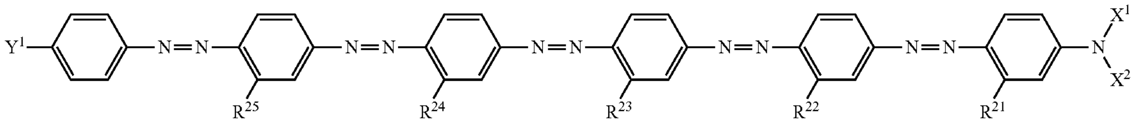

| No. | $X^1$ | $X^2$ | $R^{21}$ | $R^{22}$ | $R^{23}$ | $R^{24}$ | $R^{25}$ | $Y^1$ |
|---|---|---|---|---|---|---|---|---|
| A-1 | $—C_2H_5$ | $—C_2H_5$ | —H | $—CH_3$ | —H | —H | —H | $—C_4H_9$ |
| A-2 | $—C_2H_5$ | $—C_2H_5$ | —H | $—CH_3$ | $—CH_3$ | $—CH_3$ | —H | $—C_4H_9$ |
| A-3 | $—CH_3$ | $—CH_3$ | —H | $—CH_3$ | —H | —H | —H | $—C_4H_9$ |

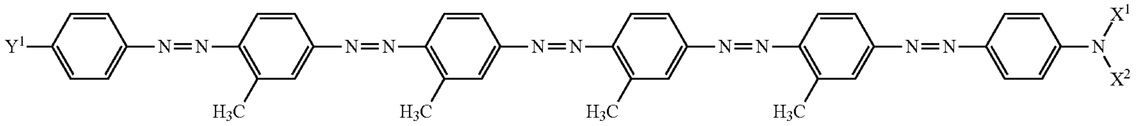

| No. | $X^1$ | $X^2$ | $Y^1$ |
|---|---|---|---|
| A-4 | $—C_2H_5$ | $—C_2H_5$ | 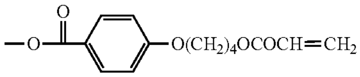 |
| A-5 | $—C_2H_5$ | $—C_2H_5$ | 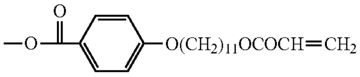 |

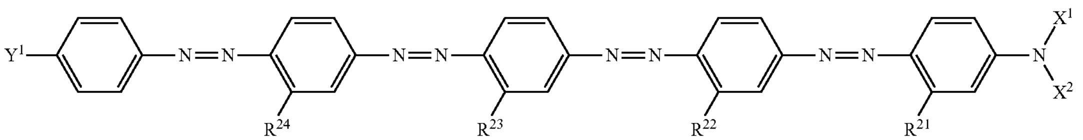

| No. | $X^1$ | $X^2$ | $R^{21}$ | $R^{22}$ | $R^{23}$ | $R^{24}$ | $Y^1$ |
|---|---|---|---|---|---|---|---|
| A-9 | $—C_2H_5$ | $—C_2H_5$ | —H | $—CH_3$ | —H | —H | $—C_4H_9$ |
| A-10 | $—C_2H_5$ | $—C_2H_5$ | $—CH_3$ | $—CH_3$ | —H | —H | $—C_4H_9$ |
| A-11 | $—C_2H_5$ | $—C_2H_5$ | —H | $—CH_3$ | $—CH_3$ | $—CH_3$ | $—C_4H_9$ |
| A-15 | $—C_2H_5$ | $—C_2H_5$ | —H | $—CH_3$ | $—CH_3$ | $—CH_3$ | 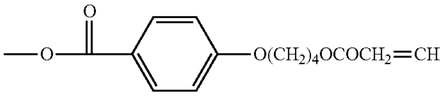 |
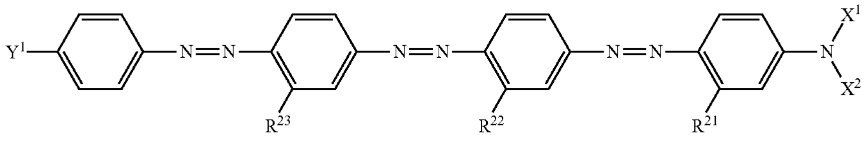
| No. | $X^1$ | $X^2$ | $R^{21}$ | $R^{22}$ | $R^{23}$ | $Y^1$ |
|---|---|---|---|---|---|---|
| A-16 | $—C_2H_5$ | $—C_2H_5$ | —H | $—CH_3$ | —H | $—C_4H_9$ |
| A-17 | $—C_2H_5$ | $—C_2H_5$ | —H | $—CH_3$ | $—CH_3$ | $—C_4H_9$ |
| A-18 | $—C_2H_5$ | $—C_2H_5$ | —H | $—CH_3$ | —H | 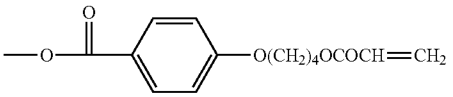 |
| A-19 | $—C_2H_5$ | $—C_2H_5$ | —H | $—CH_3$ | —H | 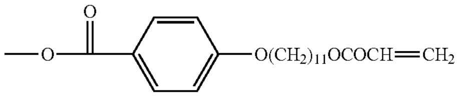 |
| A-24 | $—C_2H_5$ | $—C_2H_5$ | $—OCH_3$ | $—CH_3$ | —H | $—C_4H_9$ |
| A-25 | $—C_2H_5$ | $—C_2H_5$ | —H | $—CH_3$ | $—CH_3$ | 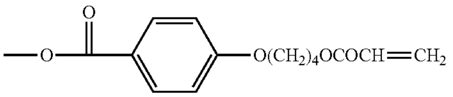 |
A-27
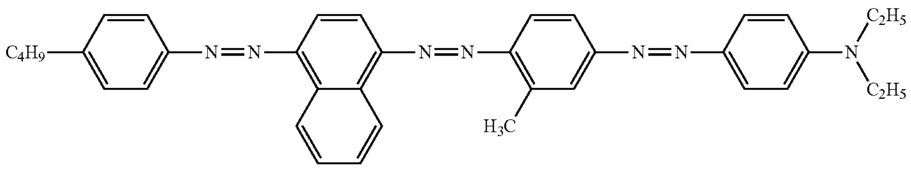
A-28
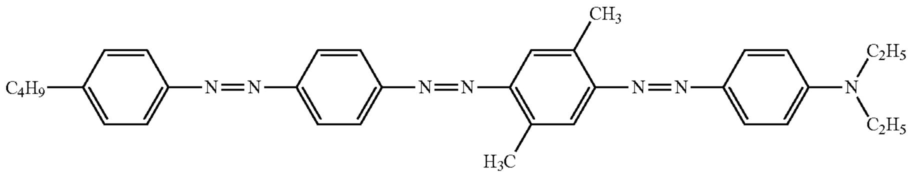

-continued
A-29
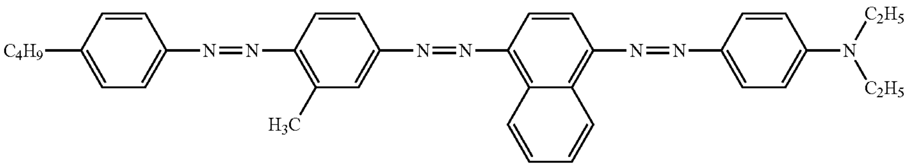
A-30
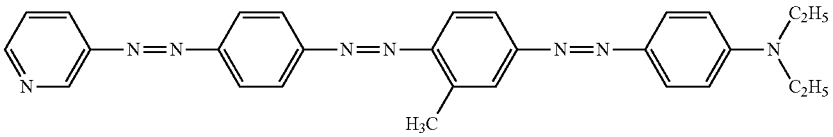
A-31
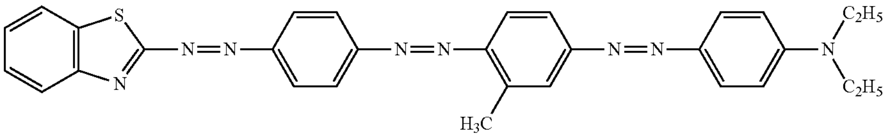
A-32
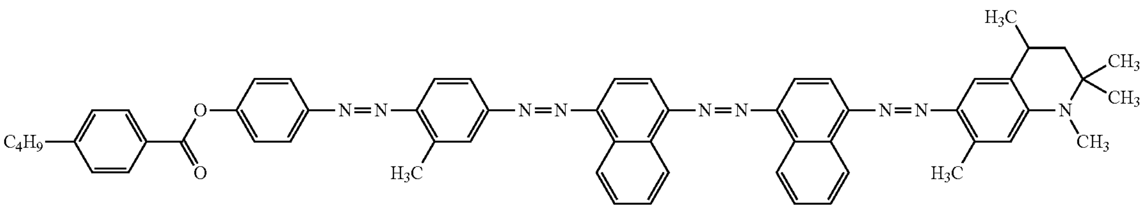
A-33
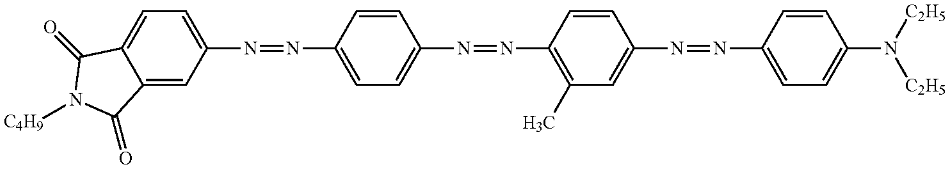
A-34
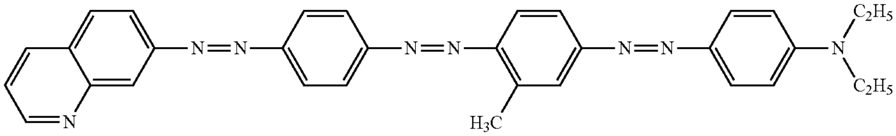
A-35
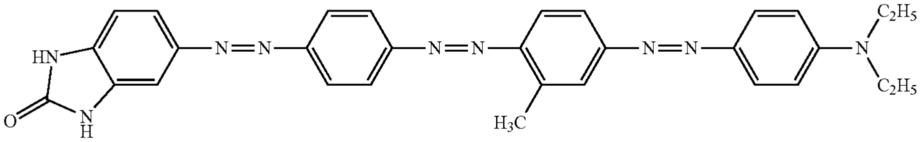
A-36
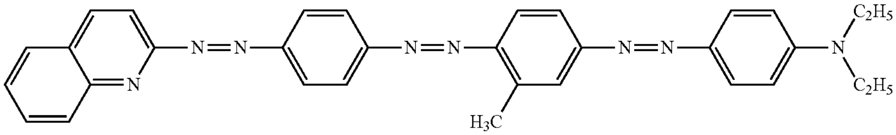
A-37
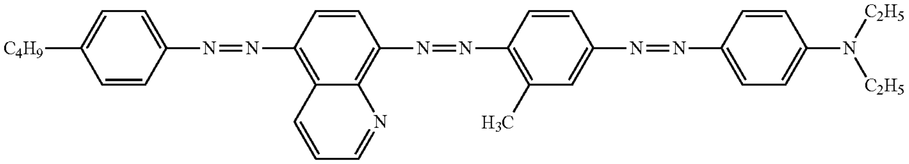

-continued
A-38
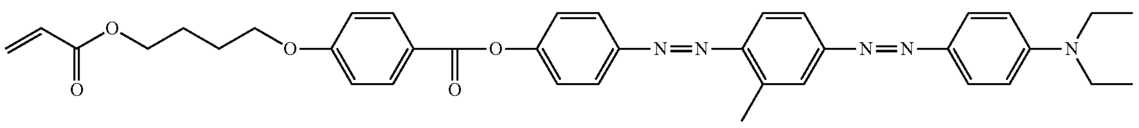
A-40
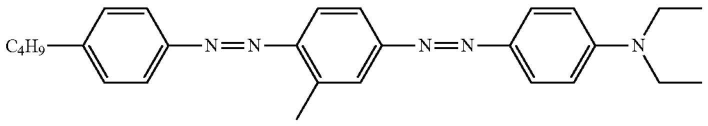
A-41
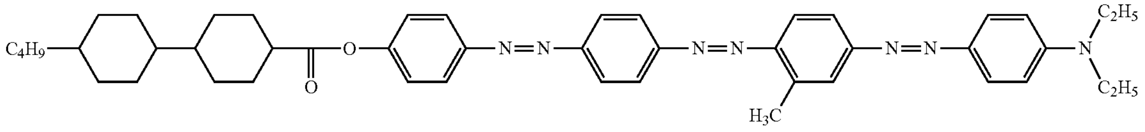
A-42
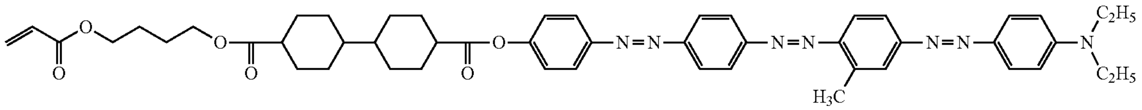
A-45
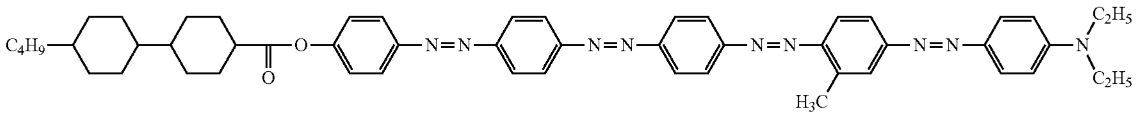
A-46
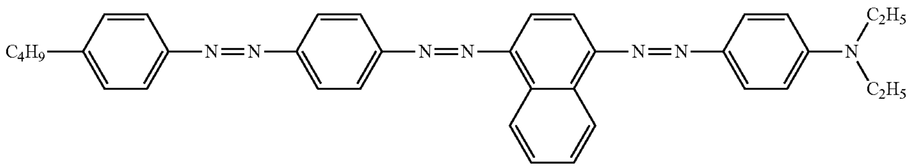
A-47
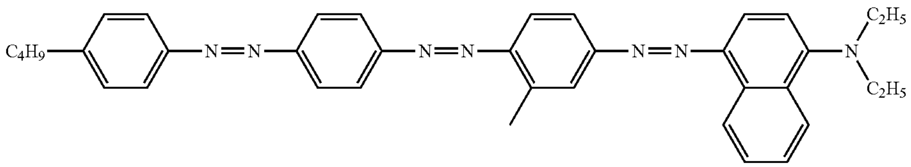
A-48
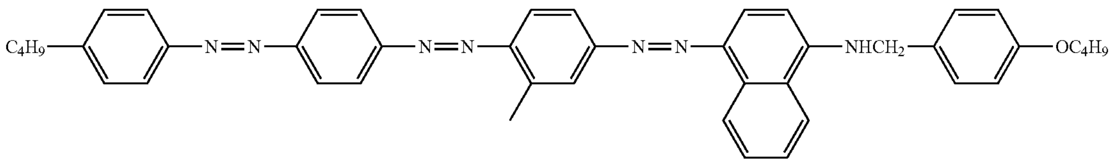
A-50
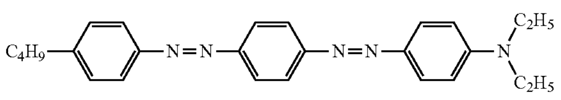
A-51
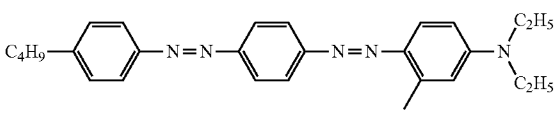
A-52
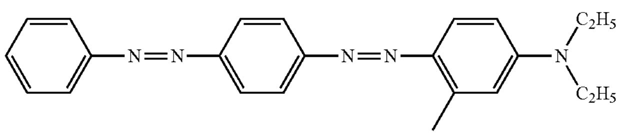

-continued
A-53
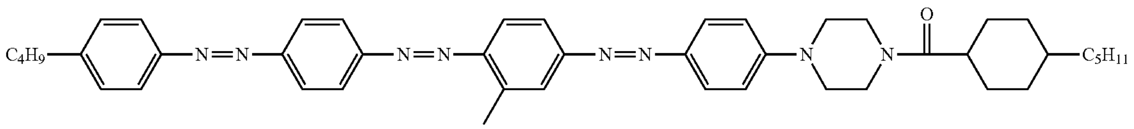
A-54
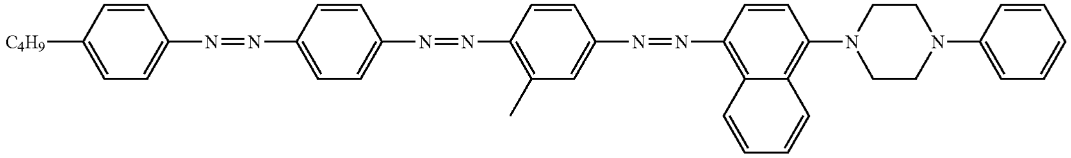
A-55
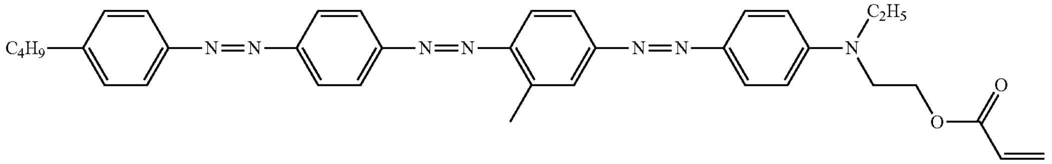
A-56
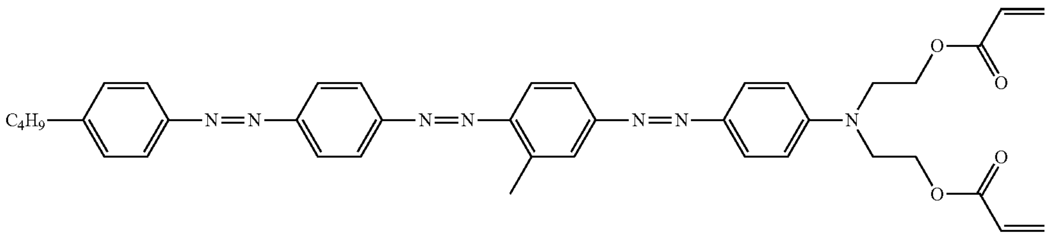
A-57
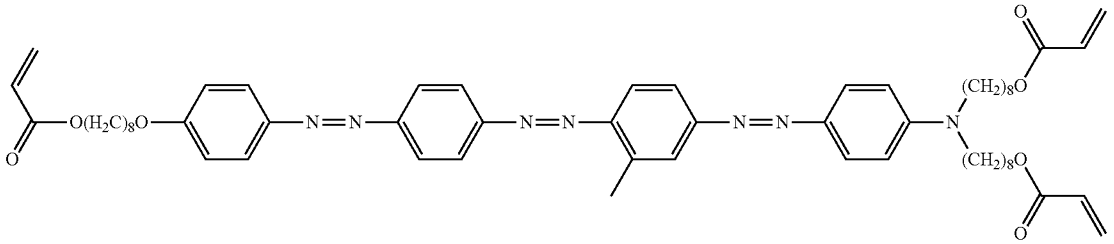
A-58
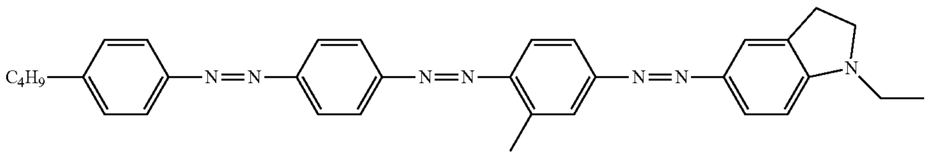
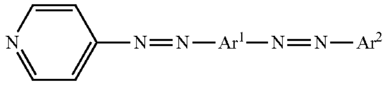

| compound example | $Ar^1$ | $Ar^2$ |
|---|---|---|
| B-1 |  | 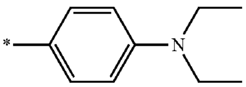 |
| B-2 | 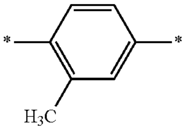 | 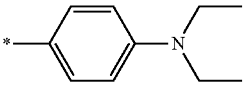 [SMILES: *c1ccc(N(CC)CC)cc1] |
-continued
| compound example | $Ar^1$ | $Ar^2$ |
|---|---|---|
| B-3 | 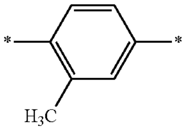 [SMILES: *c1ccc(*)c(C)c1] | 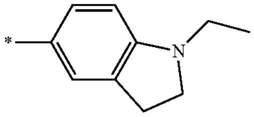 [SMILES: *c1ccc2c(c1)CCN2CC] |
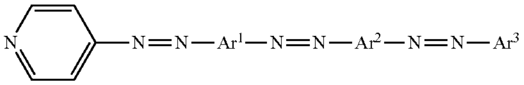
| compound example | $Ar^1$ | $Ar^2$ | $Ar^3$ |
|---|---|---|---|
| B-4 |  | 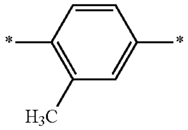 | 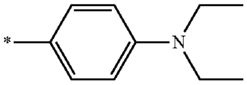 [SMILES: *c1ccc(N(CC)CC)cc1] |
| B-5 | 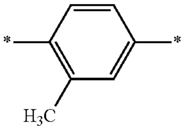 | 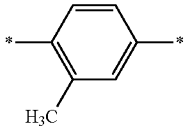 | 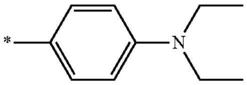 |
| B-6 | 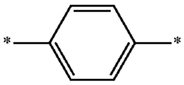 | 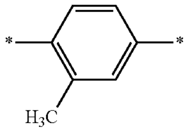 [SMILES: *c1ccc(*)c(C)c1] | 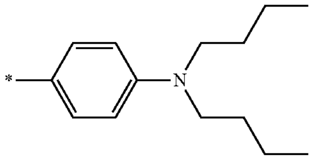 [SMILES: *c1ccc(N(CCCC)CCCC)cc1] |
| B-7 |  | 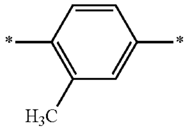 [SMILES: *c1ccc(*)c(C)c1] | 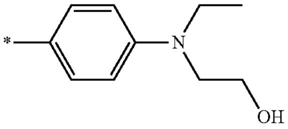 |
| B-8 | 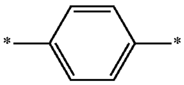 [SMILES: *c1ccc(*)cc1] | 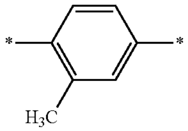 | 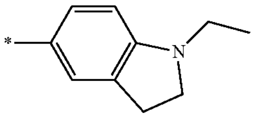 [SMILES: *c1ccc2c(c1)CCN2CC] |
| B-9 |  | 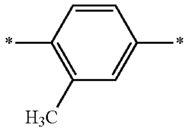 | 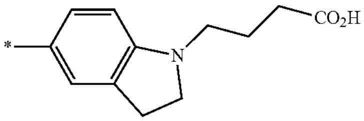 [SMILES: *c1ccc2c(c1)CCN2CCCC(=O)O] |
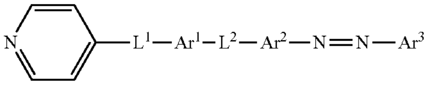

| compound example | $L^1$ | $Ar^1$ | $L^2$ | $Ar^2$ | $Ar^3$ |
|---|---|---|---|---|---|
| B-10 | *—N═N—* | 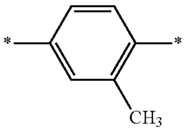 | 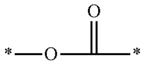 [SMILES: *OC(*)=O] | 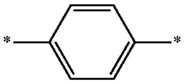 | 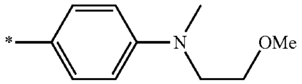 [SMILES: *c1ccc(N(C)CCOC)cc1] |
| B-11 | *—N═N—* | 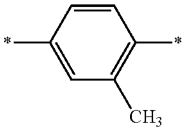 | 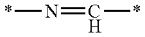 | 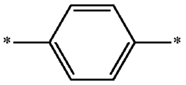 [SMILES: *c1ccc(*)cc1] | 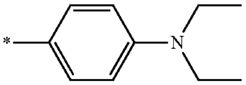 [SMILES: *c1ccc(N(CC)CC)cc1] |
| B-12 | 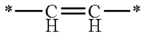 |  | 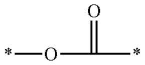 [SMILES: *OC(*)=O] | 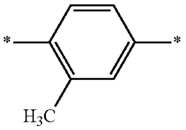 | 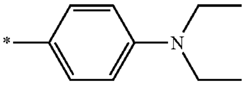 |
| B-13 | 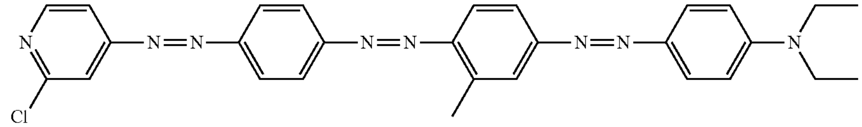 | | | | |
| B-14 | 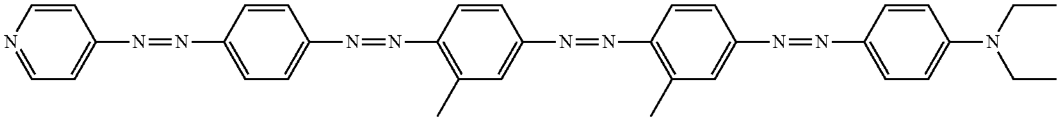 | | | | |
| C-1 | 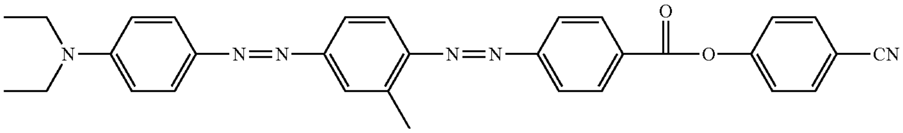 | | | | |
| C-2 | 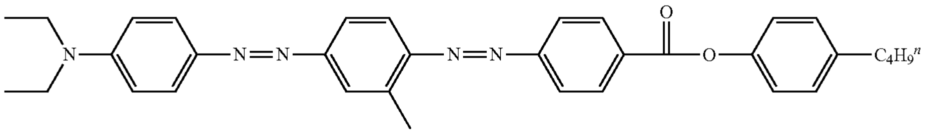 | | | | |
| C-3 | 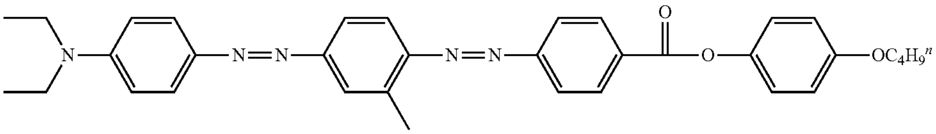 | | | | |
| C-4 | 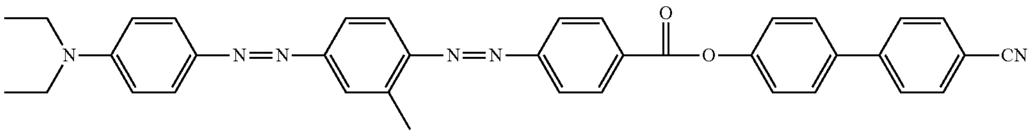 | | | | |
| C-5 | 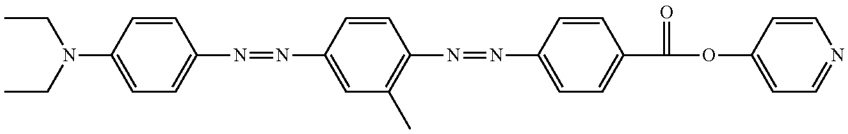 | | | | |
| C-6 | 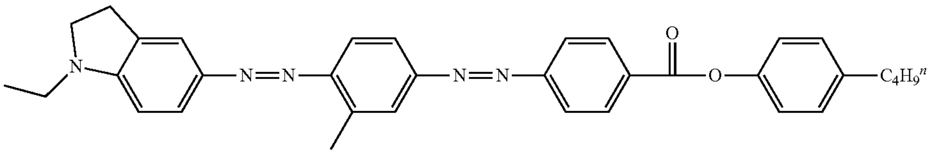 | | | | |

-continued
| compound example | $L^1$ | $Ar^1$ | $L^2$ | $Ar^2$ | $Ar^3$ |
|---|---|---|---|---|---|
| C-7 | 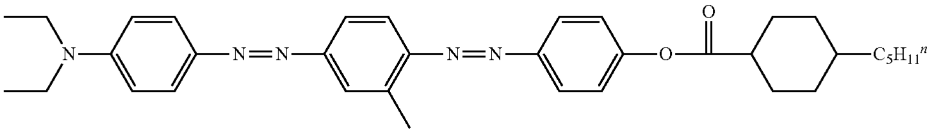 | | | | |
| C-8 | 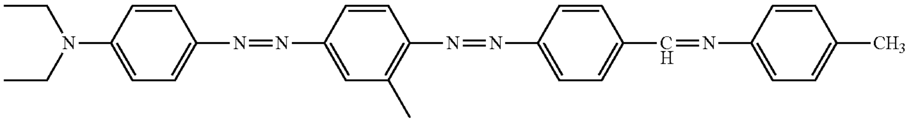 | | | | |
| C-9 | 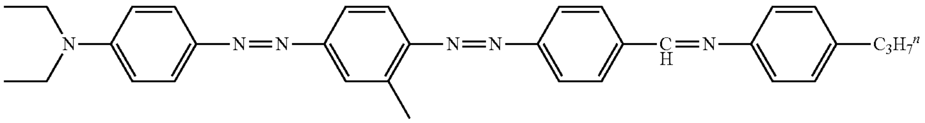 | | | | |
| C-10 | 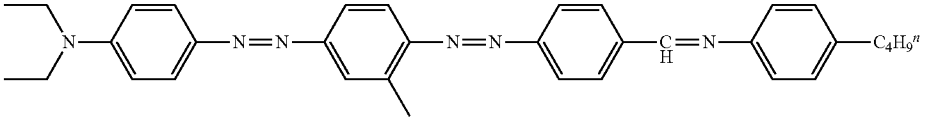 | | | | |
| C-11 | 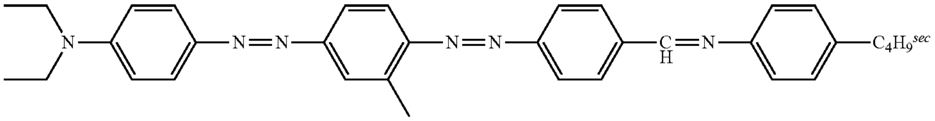 | | | | |
| C-12 | 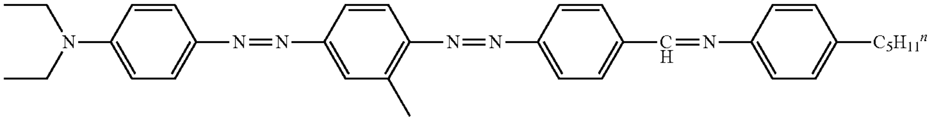 | | | | |
| C-13 | 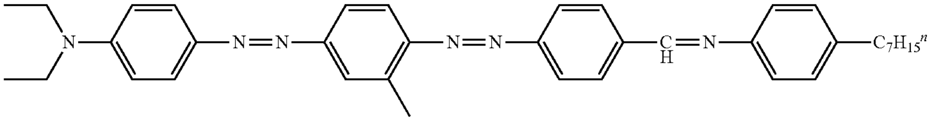 | | | | |
| C-14 | 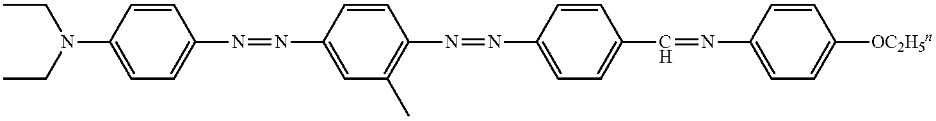 | | | | |
| C-15 | 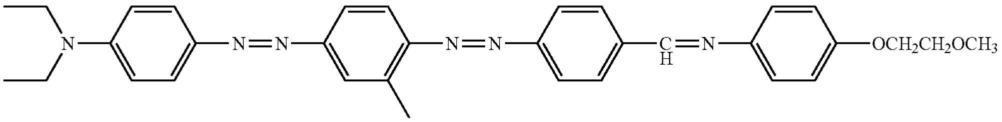 | | | | |
| C-16 | 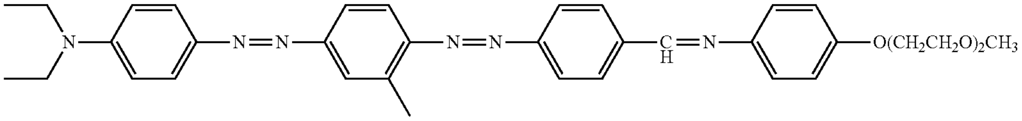 | | | | |
| C-17 | 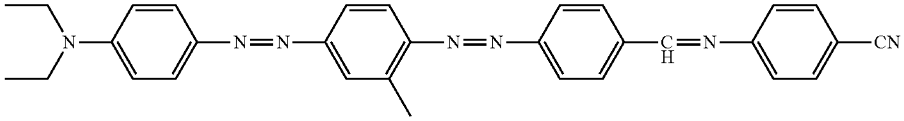 | | | | |

-continued
| compound example | $L^1$ | $Ar^1$ | $L^2$ | $Ar^2$ | $Ar^3$ |
|---|---|---|---|---|---|
| C-18 | 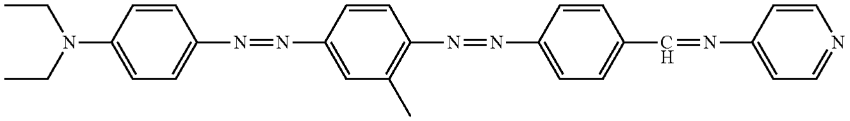 | | | | |
| C-19 | 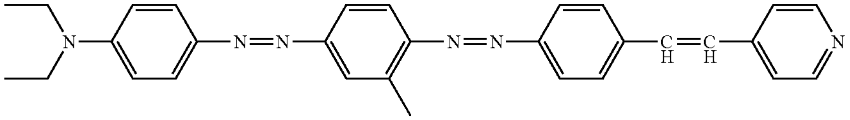 | | | | |
| C-20 | 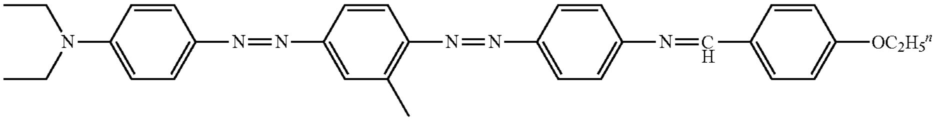 | | | | |
| C-21 | 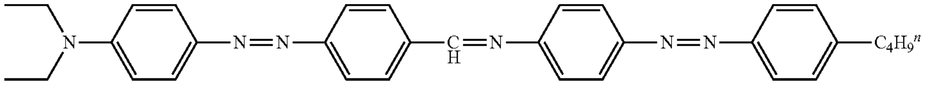 | | | | |
| C-22 | 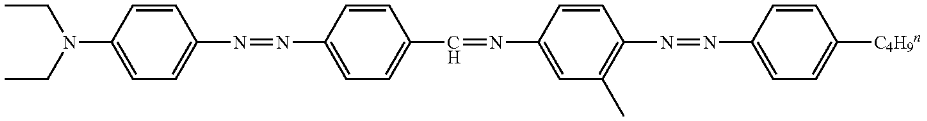 | | | | |
| C-23 | 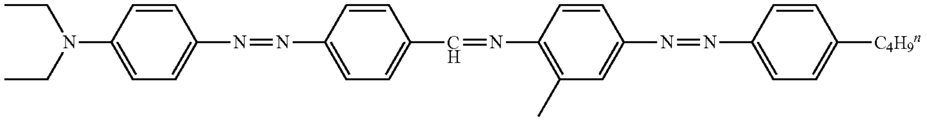 | | | | |
| C-24 | 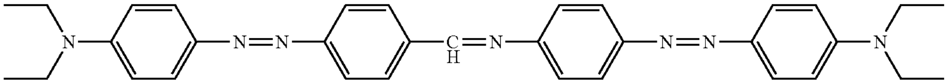 | | | | |
| C-25 | 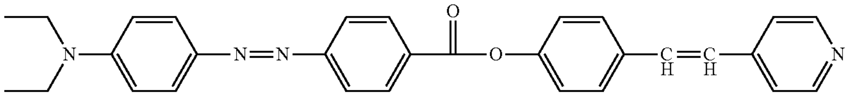 | | | | |
| C-26 | 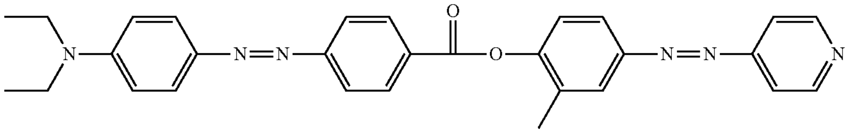 | | | | |
| C-27 | 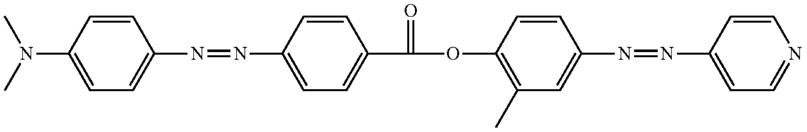 | | | | |
| C-28 | 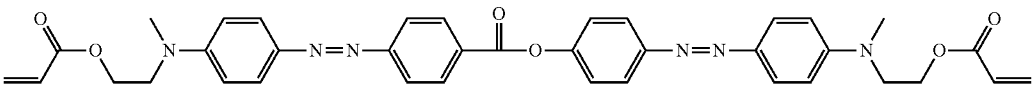 | | | | |
| C-29 | 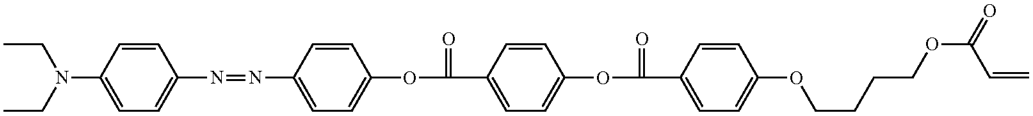 | | | | |

Formula (II)

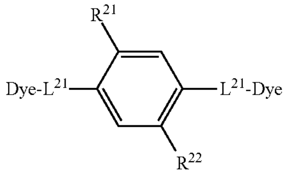

In the formula, $R^{21}$ and $R^{22}$ each represent a hydrogen atom, an alkyl group, an alkoxy group or a substituent represented by $-L^{22}-Y$, provided that at least one of them represents a group other than a hydrogen atom. $L^{22}$ represents an alkylene group, and one $CH_2$ group or non-adjacent two or more $CH_2$ groups present in the alkylene group may each be substituted with —O—, —COO—, —OCO—, —OCOO—, —NRCOO—, —OCONR—, —CO—, —S—, —$SO_2$—, —NR—, —$NRSO_2$— or —$SO_2NR$— (R represents a hydrogen atom or an alkyl group having 1 to 4 carbons). Y represents a hydrogen atom, a hydroxy group, an alkoxy group, a carboxyl group, a halogen atom or a polymerizable group.

Particularly, it is preferable that one of $R^{21}$ and $R^{22}$ is a hydrogen atom or an approximately $C_1$ to $C_4$ short chain substituent and the other of $R^{21}$ and $R^{22}$ is an approximately $C_5$ to $C_{30}$ long chain substituent, since solubility is further improved in this case. In general, it is well known that the molecular shape and anisotropy of polarizability and the like significantly affect realization of liquid crystallinity, and details thereof are described in the Liquid Crystal Handbook (2000, Maruzen) and the like. A typical skeleton of a rod-shaped liquid crystal molecule is composed of a rigid mesogen and flexible end chains along the molecular long axis direction, and in general, lateral substituents along the molecular short axis direction corresponding to $R^{21}$ and $R^{22}$ in the formula (II) are small substituents not disrupting rotation of the molecule, or substituents are not present. As examples characterized in lateral substituents, examples of stabilization of a smectic phase by introducing a hydrophilic (for example, ionic) lateral substituent are known, however, there are scarcely known examples realizing a stable nematic phase. Particularly, examples in which solubility is improved without lowering the orientational order parameter, by introducing a long chain substituent into a specific substitution position of a rod-shaped liquid crystalline molecule realizing a nematic phase are not known at all.

The alkyl group each represented by $R^{21}$ and$R^{22}$ includes $C_1$ to $C_{30}$ alkyl groups. As examples of the above-described short chain alkyl group, $C_1$ to $C_9$ groups are preferable and $C_1$ to $C_4$ groups are more preferable. On the other hand, as the above-described long chain alkyl group, $C_5$ to $C_{30}$ groups are preferable, $C_{10}$ to $C_{30}$ groups are more preferable and $C_{10}$ to $C_{20}$ groups are further preferable.

The alkoxy group each represented by $R^{21}$ and $R^{22}$ includes $C_1$ to $C_{30}$ alkoxy groups. As examples of the above-described short chain alkoxy group, $C_1$ to $C_8$ groups are preferable and $C_1$ to $C_3$ groups are more preferable. On the other hand, as the above-described long chain alkoxy group, $C_5$ to $C_{30}$ groups are preferable, $C_{10}$ to $C_{30}$ groups are more preferable and $C_{10}$ to $C_{20}$ groups are further preferable.

As the alkylene group represented by $L^{22}$ in the substituent represented by $-L^{22}-Y$ each represented by $R^{21}$ and $R^{22}$, $C_5$ to $C_{30}$ groups are preferable, $C_{10}$ to $C_{30}$ groups are more preferable and $C_{10}$ to $C_{20}$ groups are further preferable. One $CH_2$ group or non-adjacent two or more $CH_2$ groups present in the above-described alkylene group may each be substituted with at least one selected from the group of divalent groups consisting of —O—, —COO—, —OCO—, —OCOO—, —NRCOO—, —OCONR—, —CO—, —S—, —$SO_2$—, —NR—, —$NRSO_2$— and —$SO_2NR$— (R represents a hydrogen atom or an alkyl group having 1 to 4 carbons). Of course, one $CH_2$ group or non-adjacent two or more $CH_2$ groups may also be substituted with two or more groups selected from the group of the above-described divalent groups. $CH_2$ situated at the end of $L^{22}$ and linking to Y may be substituted with any of the above-described divalent groups. Further, $CH_2$ situated at the end of $L^{22}$ and linking to a phenyl group may be substituted with any of the above-described divalent groups.

Particularly, it is preferable that $L^{22}$ is an alkyleneoxy group or contains an alkyleneoxy group, and it is further preferable that $L^{22}$ is a polyethyleneoxy group represented by $-(OCH_2CH_2)_p-$ (here, p represents a number of 3 or more, preferably 3 to 10, more preferably 3 to 6) or contains a polyethyleneoxy group, from the standpoint of improvement in solubility.

Examples of $-L^{22}-$ include, but are not limited to, the following examples. In the following formulae, q is a number of 1 or more, preferably 1 to 10, more preferably 2 to 6. r is 5 to 30, preferably 10 to 30, more preferably 10 to 20.

$-(OCH_2CH_2)_p-$ $-(OCH_2CH_2)_p-O-(CH_2)_q-$ $-(OCH_2CH_2)_p-OC(=O)-(CH_2)_q-$ $-(OCH_2CH_2)_p-OC(=O)NH-(CH_2)_q-$ $-O(CH_2)_r-$ $-(CH_2)_r-$

Y in the substituent represented by $-L^{22}-Y$ each represented by $R^{21}$ and $R^{22}$ represents a hydrogen atom, a hydroxy group, an alkoxy group (preferably a $C_1$ to $C_{10}$ alkoxy group, more preferably a $C_1$ to $C_5$ alkoxy group), a carboxyl group, a halogen atom or a polymerizable group.

By combining $L^{22}$ with Y, the end of $-L^{22}-Y$ can be, for example, a substituent reinforcing the intermolecular interaction such as a carboxyl group, an amino group, an ammonium group and the like, and can be a leaving group such as a sulfonyloxy group, a halogen atom and the like.

The end of $-L^{22}-Y$ may be a substituent forming a covalent bond to another molecule, such as a crosslinkable group, a polymerizable group and the like, and may also be a polymerizable group such as, for example, $-O-C(=O)CH=CH_2$, $-O-C(=O)C(CH_3)=CH_2$ and the like.

When used as a material for a curing film, Y is preferably a polymerizable group (however, here, even if the compound of the above-described formula (II) has no polymerizable group, when a compound to be used together is polymerizable, the alignment of the compound of the formula (II) can be fixed by promoting the polymerization reaction of the other compound). The polymerization reaction is preferably an addition polymerization (including ring-opening polymerization) or a condensation polymerization. That is, it is preferable that the polymerizable group is a functional group capable of performing an addition polymerization reaction or a condensation polymerization reaction. Examples of the polymerizable group represented by the above-described formula include an acrylate group represented by the following formula (M-1) and a methacrylate group represented by the following formula (M-2).

(M-1)

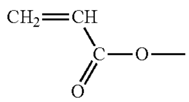

-continued (M-2)

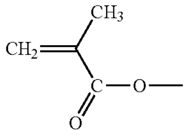

Also, ring-opening polymerizable groups are preferable, and for example, cyclic ether groups are preferable, an epoxy group or an oxetanyl group is more preferable and an epoxy group is particularly preferable.

$L^{21}$s in the above-described formula (II) each represent a linking group selected from the group consisting of an azo group (—N═N—), a carbonyloxy group (—C(═O)O—), an oxycarbonyl group (—O—C(═O)—), an imino group (—N═CH—) and a vinylene group (—C═C—). Among them, a vinylene group is preferable.

Dyes in the above-described formula (II) each represent an azo dye residue represented by the following formula (IIa).

(IIa)

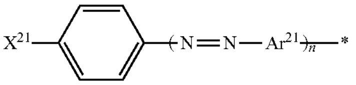

In the formula (IIa), * represents a linkage part to $L^{21}$; $X^{21}$ represents a hydroxy group, a substituted or un-substituted alkyl group, a substituted or un-substituted alkoxy group, an un-substituted amino group or a mono or dialkylamino group; $Ar^{21}$s each represent an aromatic hydrocarbon ring optionally having a substituent or aromatic hetero ring optionally having a substituent; n represents an integer of 1 to 3, and when n is 2 or more, a plurality of $Ar^{21}$s may be mutually the same or different.

The alkyl group represented by $X^{21}$ is preferably a $C_1$ to $C_{12}$ alkyl group and more preferably a $C_1$ to $C_6$ alkyl group. Specifically, a methyl group, an ethyl group, a propyl group, a butyl group and the like are mentioned. The alkyl group may have a substituent, and examples of the substituent include a hydroxy group, a carboxyl group and a polymerizable group. Preferable examples of the polymerizable group are the same as the preferable examples of the polymerizable group represented by Y described above.

The alkoxy group represented by $X^{21}$ is preferably a $C_1$ to $C_{20}$ alkoxy group, more preferably a $C_1$ to $C_{10}$ alkoxy group and further preferably a $C_1$ to $C_6$ alkoxy group. Specifically, a methoxy group, an ethoxy group, a propyloxy group, a butoxy group, a pentaoxy group, a hexaoxy group, a heptaoxy group, an octaoxy group and the like are mentioned. The alkoxy group may have a substituent, and examples of the substituent include a hydroxy group, a carboxyl group and a polymerizable group. Preferable examples of the polymerizable group are the same as the preferable examples of the polymerizable group represented by Y described above.

The substituted or un-substituted amino group represented by $X^{21}$ is preferably a $C_0$ to $C_{20}$ amino group, more preferably a $C_0$ to $C_{10}$ amino group and further preferably a $C_0$ to $C_6$ amino group. Specifically, an un-substituted amino group, a methylamino group, a dimethylamino group, a diethylamino group, a methyl•hexylamino group, an anilino group and the like are mentioned.

Among them, $X^{21}$ is preferably an alkoxy group.

In the above-described formula (II), $Ar^{21}$ represents an aromatic hydrocarbon ring group optionally having a substituent or aromatic heterocyclic group optionally having a substituent. Examples of the aromatic hydrocarbon ring group and the aromatic heterocyclic group include a 1,4-phenylene group, a 1,4-naphthylene group, a pyridine ring group, a pyrimidine ring group, a pyrazine ring group, a quinoline ring group, a thiophene ring group, a thiazole ring group, a thiadiazole ring group, a thienothiazole ring group and the like. Among them, a 1,4-phenylene group, a 1,4-naphthylene group and a thienothiazole ring group are preferable and a 1,4-phenylene group is most preferable.

The substituent that $Ar^{21}$ optionally has includes preferably an alkyl group having 1 to 10 carbons, a hydroxy group, an alkoxy group having 1 to 10 carbons, a cyano group and the like, more preferably an alkyl group having 1 to 2 carbons and an alkoxy group having 1 to 2 carbons.

n is preferably 1 or 2 and more preferably 1.

Examples of the compound represented by the above-described formula (II) include compounds represented by the following formula (IIb). The meaning of each symbol in the formula is the same as those in the formula (II), and also the preferable range thereof is the same as for the formula (II).

(IIb)

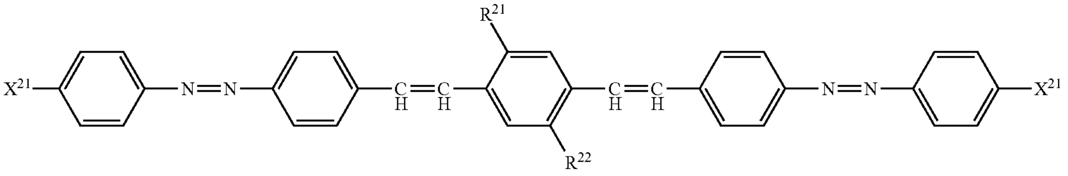

In the formula, it is preferable that $X^{21}$s are mutually the same or different and represent a $C_{1-12}$ alkoxy group; it is preferable that $R^{21}$ and $R^{22}$ are mutually different, and it is preferable that one of $R^{21}$ and $R^{22}$ is a hydrogen atom or a $C_1$ to $C_4$ short chain substituent (an alkyl group, an alkoxy group or a substituent represented by $-L^{22}-Y$) and the other of $R^{21}$ and $R^{22}$ is a $C_5$ to $C_{30}$ long chain substituent (an alkyl group, an alkoxy group or a substituent represented by $-L^{22}-Y$). Alternatively, it is also preferable that $R^{21}$ and $R^{22}$ each represent a substituent represented by $-L^{22}-Y$ and $L^{22}$ is an alkyleneoxy group or contains an alkyleneoxy group.

Specific examples of the compound represented by the above-described formula (II) include, but are not limited to, the following compound examples.

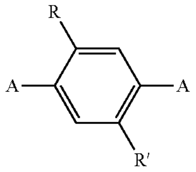
| | A | R | R' |
|---|---|---|---|
| A2-1 | 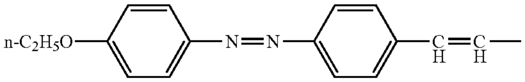 | MeO | $—(OCH_2CH_2)_3—OMe$ |
| A2-2 | 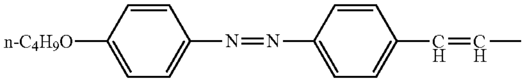 | MeO | $—(OCH_2CH_2)_3—OMe$ |
| A2-3 | 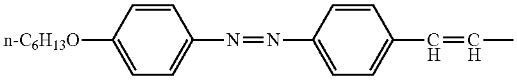 | MeO | $—(OCH_2CH_2)_3—OMe$ |
| A2-4 | 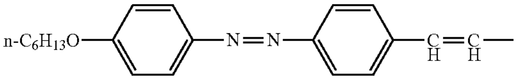 | MeO | $—(OCH_2CH_2)_3—OH$ |
| A2-5 | 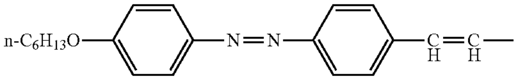 | MeO | $—(OCH_2CH_2)_6—OH$ |
| A2-6 | 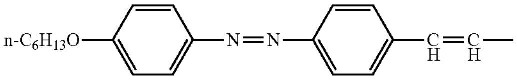 | MeO | 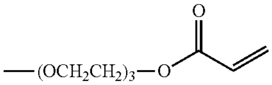 |
| A2-7 | 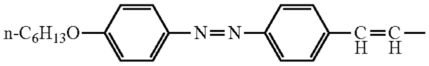 | MeO | 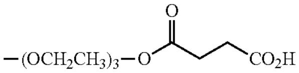 |
| A2-8 | 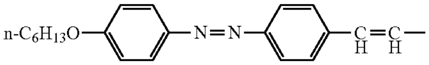 | MeO | 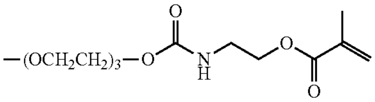 |
| A2-9 | 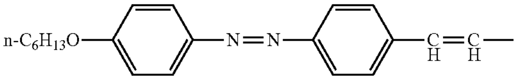 | MeO | $—OC_{18}H_{37}$-n |
| A2-10 | 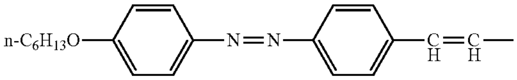 | $—(OCH_2CH_2)_3—OMe$ | $—(OCH_2CH_2)_3—OMe$ |
| A2-11 | 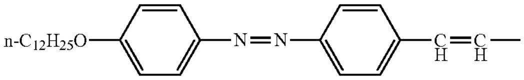 | MeO | $—(OCH_2CH_2)_3—OMe$ |
| A2-12 | 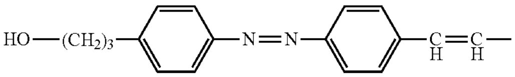 | MeO | $—(OCH_2CH_2)_3—OH$ |
| A2-13 | 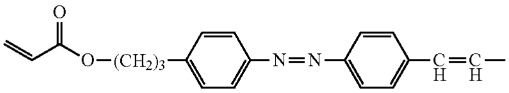 | MeO | 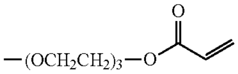 |
| A2-14 | 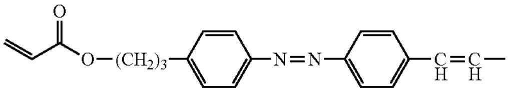 | MeO | $—(OCH_2CH_2)_3—OMe$ |

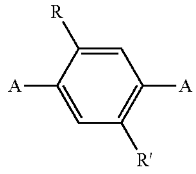
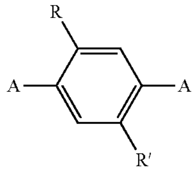
| | A | R | R' |
|---|---|---|---|
| A2-15 | 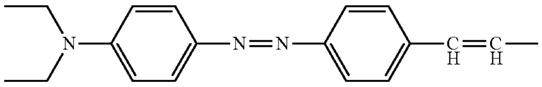 | MeO | $—(OCH_2CH_2)_3—OH$ |
| A2-16 | 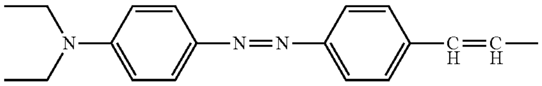 | MeO | $—OC_{18}H_{37}$-n |
| A2-17 | 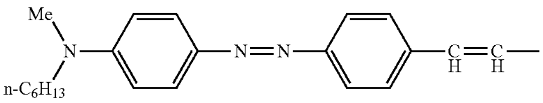 | MeO | $—(OCH_2CH_2)_3—OH$ |
| A2-18 | 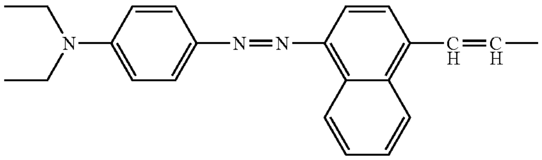 | MeO | $—(OCH_2CH_2)_3—OH$ |
| A2-19 | 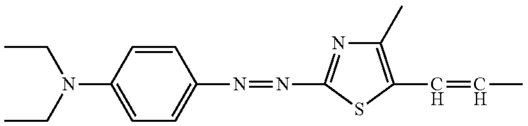 | MeO | $—(OCH_2CH_2)_3—OH$ |
| A2-20 | 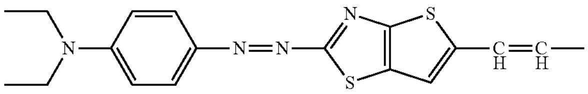 | MeO | $—(OCH_2CH_2)_3—OH$ |
| A2-21 | 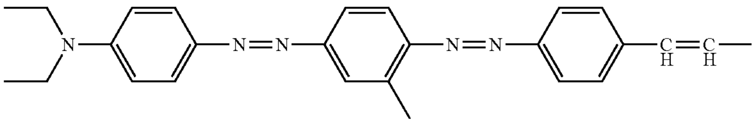 | MeO | $—(OCH_2CH_2)_3—OH$ |
| A2-22 | 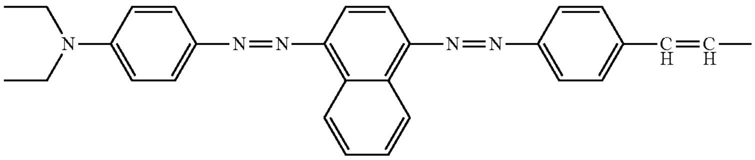 | MeO | $—(OCH_2CH_2)_3—OH$ |
| A2-23 | 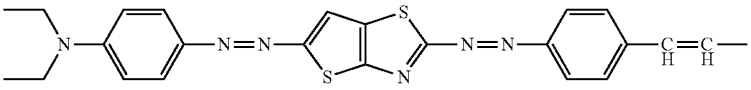 | MeO | $—(OCH_2CH_2)_3—OH$ |

| | A | R | R' |
|---|---|---|---|
| A2-24 | 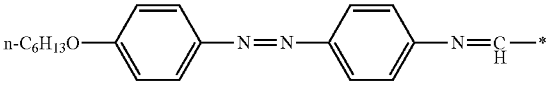 | MeO | $*—(OCH_2CH_2)_3—OH$ |
| A2-25 | 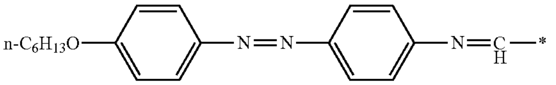 | MeO | $*—OC_{12}H_{25}$-n |
| A2-26 | 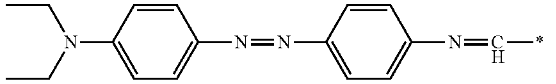 [SMILES: *C=Nc1ccc(N=Nc2ccc(N(CC)CC)cc2)cc1] | MeO | $*—(OCH_2CH_2)_3—OH$ |
| A2-27 | 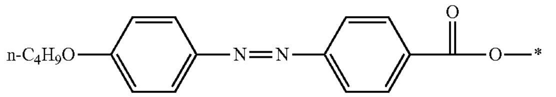 | MeO | $*—(OCH_2CH_2)_6—OH$ |
| A2-28 | 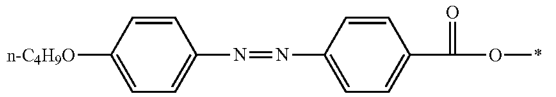 | H | $*—OC_{18}H_{37}$-n |
| A2-29 | 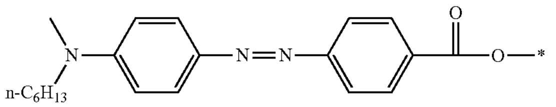 | MeO | $*—(OCH_2CH_2)_3—OMe$ |
| A2-30 | 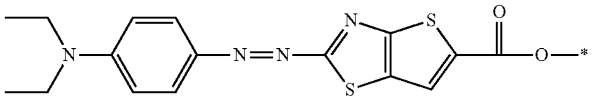 [SMILES: *OC(=O)c1cc2sc(N=Nc3ccc(N(CC)CC)cc3)nc2s1] | MeO | $*—(OCH_2CH_2)_3—OH$ |
| A2-31 | 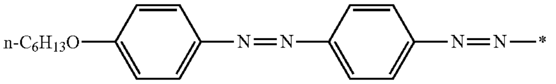 | MeO | $*—(OCH_2CH_2)_3—OH$ |
| A2-32 | 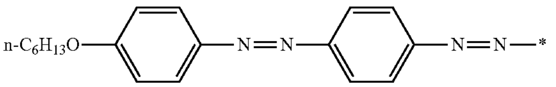 | MeO | $*—(OCH_2CH_2CH_2)_3—OH$ |
| A2-33 | 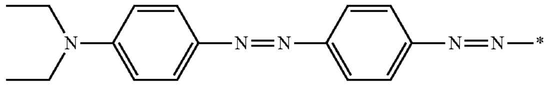 | MeO | $*—(OCH_2CH_2)_3—OMe$ |
| A2-34 | 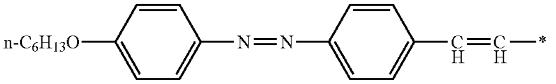 | MeO | MeO |

Formula (III)

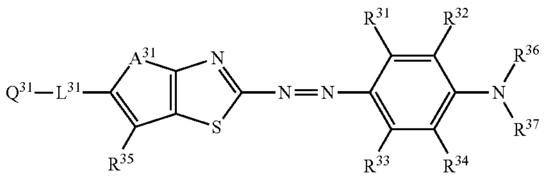

In the formula, $R^{31}$ to $R^{35}$ each represent independently a hydrogen atom or a substituent; $R^{36}$ and $R^{37}$ each represent independently a hydrogen atom or an alkyl group optionally having a substituent; $Q^{31}$ represents an aromatic hydrocarbon group optionally having a substituent, an aromatic heterocyclic group optionally having a substituent or a cyclohexane ring group optionally having a substituent; $L^{31}$ represents a divalent linking group; $A^{31}$ represents an oxygen atom or a sulfur atom.

Examples of the substituent represented by $R^{31}$ to $R^{35}$ are the same as the examples of the substituent each represented by $R^{11}$ to $R^{14}$ in the above-described formula (I). The examples thereof include preferably a hydrogen atom, an alkyl group, an alkoxy group and a halogen atom, particularly preferably a hydrogen atom, an alkyl group and an alkoxy group and most preferably a hydrogen atom or methyl group.

The alkyl group optionally having a substituent represented by $R^{36}$ and $R^{37}$ in the above-described formula (III) is an alkyl group preferably having 1 to 20 carbons, more preferably having 1 to 12 carbons and particularly preferably having 1 to 8 carbons, and examples thereof include a methyl group, an ethyl group, an n-octyl group and the like.

The substituent on the alkyl group represented by $R^{36}$ and $R^{37}$ is the same as the substituent represented by $R^{31}$ to $R^{35}$ described above. When $R^{36}$ and $R^{37}$ represent an alkyl group, they may be mutually linked to form a cyclic structure. When $R^{36}$ or $R^{37}$ represents an alkyl group, each of them may be linked to $R^{32}$ or $R^{34}$ to form a cyclic structure.

The group represented by $R^{36}$ and $R^{37}$ is particularly preferably a hydrogen atom or an alkyl group and further preferably a hydrogen atom, a methyl group or an ethyl group.

In the above-described formula (III), $Q^{31}$ represents an aromatic hydrocarbon group optionally having a substituent (preferably having 1 to 20 carbons and more preferably having 1 to 10 carbons, and examples thereof include a phenyl group, a naphthyl group and the like), an aromatic heterocyclic group optionally having a substituent or a cyclohexane ring group optionally having a substituent.

The substituent optionally carried on the group represented by $Q^{31}$ is preferably a group introduced to enhance solubility or nematic liquid crystallinity of an azo compound, a group having an electron donative property or an electron withdrawing property introduced to adjust the color tone as a dye or a group having a polymerizable group introduced to fix alignment, and specifically, is the same as the substituent represented by $R^{31}$ to $R^{35}$ described above. Preferable are an alkyl group optionally having a substituent, an alkenyl group optionally having a substituent, an alkynyl group optionally having a substituent, an aryl group optionally having a substituent, an alkoxy group optionally having a substituent, an oxycarbonyl group optionally having a substituent, an acyloxy group optionally having a substituent, an acylamino group optionally having a substituent, an amino group optionally having a substituent, an alkoxycarbonylamino group optionally having a substituent, a sulfonylamino group optionally having a substituent, a sulfamoyl group optionally having a substituent, a carbamoyl group optionally having a substituent, an alkylthio group optionally having a substituent, a sulfonyl group optionally having a substituent, a ureide group optionally having a substituent, a nitro group, a hydroxy group, a cyano group, an imino group, an azo group and a halogen atom, and particularly preferable are an alkyl group optionally having a substituent, an alkenyl group optionally having a substituent, an aryl group optionally having a substituent, an alkoxy group optionally having a substituent, an oxycarbonyl group optionally having a substituent, an acyloxy group optionally having a substituent, a nitro group, an imino group and an azo group. The preferable range of the number of carbon atoms of the above-mentioned substituents having a carbon atom is the same as the preferable range of the number of carbon atoms for the substituents represented by $R^{31}$ to $R^{35}$.

The aromatic hydrocarbon group, the aromatic heterocyclic group or the cyclohexane ring group may have 1 to 5 of these substituents, and preferably, has one substituent . When $Q^{31}$ is a phenyl group, it is preferable that one substituent is carried at a para-position with respect to $L^{31}$, and when $Q^{31}$ is a cyclohexane ring group, it is preferable that one substituent is carried in trans configuration at a 4-position with respect to $L^{31}$.

As the aromatic heterocyclic group represented by $Q^{31}$, groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridyl group, a quinolyl group, a thiophenyl group, a thiazolyl group, a benzothiazolyl group, a thiadiazolyl group, a quinolonyl group, a naphthalimidyl group, a thienothiazolyl group and the like.

The aromatic heterocyclic group is preferably a pyridyl group, a quinolyl group, a thiazolyl group, a benzothiazolyl group, a thiadiazolyl group or a thienothiazolyl group, particularly preferably a pyridyl group, a benzothiazolyl group, a thiadiazolyl group or a thienothiazolyl group, most preferably a pyridyl group, a benzothiazolyl group or a thienothiazolyl group.

The group represented by $Q^{31}$ is particularly preferably a phenyl group optionally having a substituent, a naphthyl group optionally having a substituent, a pyridyl group optionally having a substituent, a benzothiazolyl group optionally having a substituent, a thienothiazolyl group optionally having a substituent or a cyclohexane ring group optionally having a substituent, more preferably a phenyl group, a pyridyl group, a benzothiazolyl group or a cyclohexane ring group.

The linking group represented by $L^{31}$ in the above-described formula (III) includes a single bond, alkylene groups (preferably having 1 to 20 carbons, more preferably having 1 to 10 carbons and particularly preferably having 1 to 6 carbons, and examples thereof include a methylene group, an ethylene group, a propylene group, a butylene group, a pentylene group, a cyclohexane-1,4-diyl group and the like), alkenylene groups (preferably having 2 to 20 carbons, more preferably having 2 to 10 carbons and particularly preferably having 2 to 6 carbons, and examples thereof include an ethenylene group and the like), alkynylene groups (preferably having 2 to 20 carbons, more preferably having 2 to 10 carbons and particularly preferably having 2 to 6 carbons, and examples thereof include an ethynylene group and the like), alkyleneoxy groups (preferably having 1 to 20 carbons, more preferably having 1 to 10 carbons and particularly preferably having 1 to 6 carbons, and examples thereof include a methyleneoxy group and the like), an amide group, an ether group, an acyloxy group ($—C(=O)O—$), an oxycarbonyl group ($—OC(=O)—$), an imino group ($—CH=N—$ or $—N=CH—$), a sulfoamide group, a sulfonate group, a ureide group, a sulfonyl group, a sulfinyl group, a thioether group, a carbonyl group, an $—NR—$ group (here, R represents a hydrogen atom, an alkyl group or an aryl group), an azo group, an azoxy group, or divalent linking groups having 0 to 60 carbons constituted by combining two or more of them.

The group represented by $L^{31}$ is particularly preferably a single bond, an amide group, an acyloxy group, an oxycarbonyl group, an imino group, an azo group or an azoxy group, more further preferably an azo group, an acyloxy group, an oxycarbonyl group or an imino group.

In the above-described formula (III), $A^{31}$ represents an oxygen atom or a sulfur atom, preferably a sulfur atom.

The compound represented by the above-described formula (III) may have a polymerizable group as a substituent. It is preferable to have a polymerizable group since a film curing property is improved. Examples of the polymerizable group include unsaturated polymerizable groups, an epoxy group and an aziridinyl group, and unsaturated polymerizable groups are preferable and an ethylenically unsaturated polymerizable group is particularly preferable. Examples of the ethylenically unsaturated polymerizable group include an acryloyl group and a methacryloyl group.

It is preferable that the polymerizable group is situated at the molecular end, that is, it is preferable that, in the formula (III), the polymerizable group is present as a substituent of $R^{36}$ and/or $R^{37}$ and as a substituent of $Q^1$.

Among compounds represented by the above-described formula (III), particularly preferable are compounds represented by the following formula (IIIa).

(IIIa)

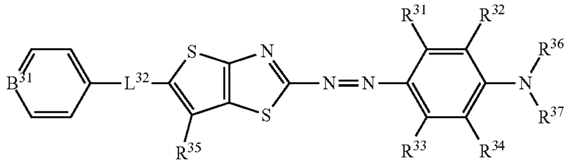

In the formula, $R^{31}$ to $R^{35}$ are the same as those in the above-described formula (III), and also the preferable range thereof is the same as for the formula (III). $B^{31}$ represents a nitrogen atom or a carbon atom optionally having a substituent; $L^{32}$ represents an azo group, an acyloxy group (—C(═O)O—), an oxycarbonyl group (—OC(═O)—) or an imino group.

In the above-described formula (IIIa), $R^{35}$ represents preferably a hydrogen atom or a methyl group and more preferably a hydrogen atom.

The substituent optionally carried when $B^{31}$ is a carbon atom in the above-described formula (IIIa) is the same as the substituent optionally carried on $Q^{31}$ in the above-described formula (III), and also the preferable range thereof is the same as for the formula (III).

In the above-described formula (IIIa), $L^{32}$ represents an azo group, an acyloxy group, an oxycarbonyl group or an imino group, preferably an azo group, an acyloxy group or an oxycarbonyl group and more preferably an azo group.

Specific examples of the compound represented by the formula (III) include, but are not limited to, the following specific examples.

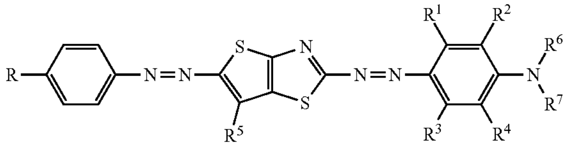

| No. | $R^1$ | $R^2$ | $R^3$ | $R^4$ | $R^5$ | $R^6$ | $R^7$ | R |
|---|---|---|---|---|---|---|---|---|
| A3-1 | —H | —H | —H | —H | —H | $—C_2H_5$ | $—C_2H_5$ | $—C_4H_9$ |
| A3-2 | —H | —H | —H | —H | —H | $—C_2H_5$ | $—C_2H_5$ | $—C_6H_{13}$ |
| A3-3 | —H | —H | —H | —H | —H | $—C_2H_5$ | $—C_2H_5$ | $—C_7H_{15}$ |
| A3-4 | —H | —H | —H | —H | —H | $—C_2H_5$ | $—C_2H_5$ | $—OC_4H_9$ |
| A3-5 | —H | —H | —H | —H | —H | $—C_2H_5$ | $—C_2H_5$ | $—CF_3$ |
| A3-6 | —H | —H | —H | —H | —H | $—C_2H_5$ | $—C_2H_5$ | —OH |
| A3-7 | —H | —H | —H | —H | —H | $—C_2H_5$ | $—C_2H_5$ | —CN |
| A3-8 | —H | —H | —H | —H | —H | $—C_2H_5$ | $—C_2H_5$ | $—NO_2$ |
| A3-9 | —H | —H | —H | —H | —H | $—C_2H_5$ | $—C_2H_5$ | —F |
| A3-10 | —H | —H | —H | —H | —H | $—C_2H_5$ | $—C_2H_5$ | —Br |
| A3-11 | —H | —H | —H | —H | —H | $—C_2H_5$ | $—C_2H_5$ | —I |
| A3-12 | —H | —H | —H | —H | —H | $—CH_3$ | —H | $—C_4H_9$ |
| A3-13 | —H | —H | —H | —H | —H | $—CH_3$ | $—CH_3$ | $—C_4H_9$ |
| A3-14 | —H | —H | —H | —H | —H | $—CH_3$ | $—C_6H_{13}$ | $—C_4H_9$ |
| A3-15 | —H | —H | —H | —H | —H | $—CH_3$ | $—CH_2CH_2OH$ | $—C_4H_9$ |
| A3-16 | —H | —H | —H | —H | —H | $—CH_3$ | $—CH_2CH_2OH_3$ | $—C_4H_9$ |
| A3-17 | —H | —H | —H | —H | —H | $—CH_3$ | $—CH_2CH_2OCOCH{=}CH_2$ | $—C_4H_9$ |
| A3-18 | —H | —H | —H | —H | —H | $—CH_3$ | $—CH_2CH_2CN$ | $—C_4H_9$ |
| A3-19 | —H | —H | —H | —H | —H | $—CH_2CH_2OCOCH{=}CH_2$ | $—CH_2CH_2OCOCH{=}CH_2$ | $—C_4H_9$ |
| A3-20 | $—CH_3$ | —H | —H | —H | —H | $—C_2H_5$ | $—C_2H_5$ | $—C_4H_9$ |
| A3-21 | —F | —H | —H | —H | —H | $—C_2H_5$ | $—C_2H_5$ | $—C_4H_9$ |
| A3-22 | —Cl | —H | —H | —H | —H | $—C_2H_5$ | $—C_2H_5$ | $—C_4H_9$ |
| A3-23 | —OH | —H | —H | —H | —H | $—C_2H_5$ | $—C_2H_5$ | $—C_4H_9$ |
| A3-24 | $—OCH_3$ | —H | —H | —H | —H | $—C_2H_5$ | $—C_2H_5$ | $—C_4H_9$ |
| A3-25 | —H | $—OCH_3$ | $—OCH_3$ | —H | —H | $—C_2H_5$ | $—C_2H_5$ | $—C_4H_9$ |
| A3-26 | —H | —H | —H | —H | $—CH_3$ | $—C_2H_5$ | $—C_2H_5$ | $—C_4H_9$ |

(A3-27)

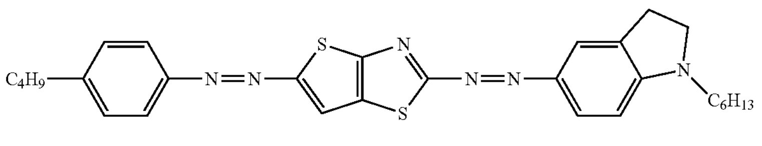

(A3-28)

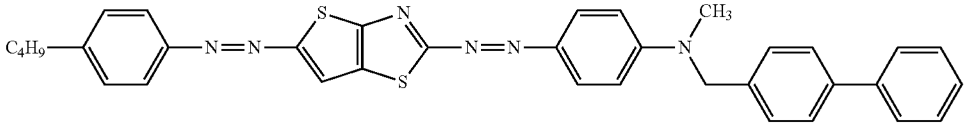

-continued
(A3-29)
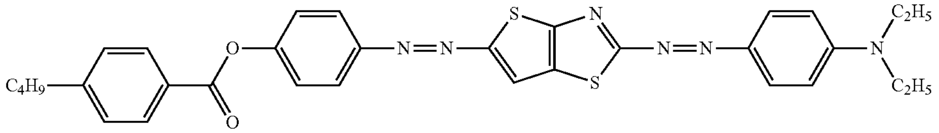
(A3-30)
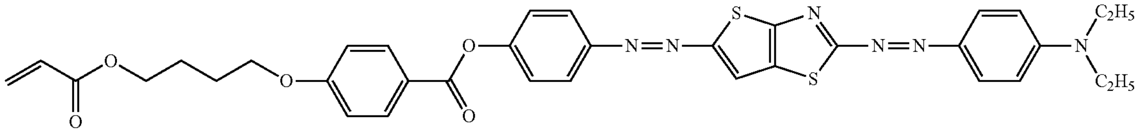
(A3-31)
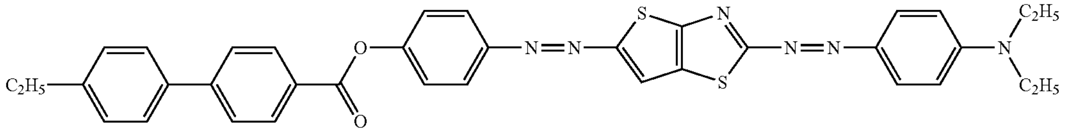
(A3-32)
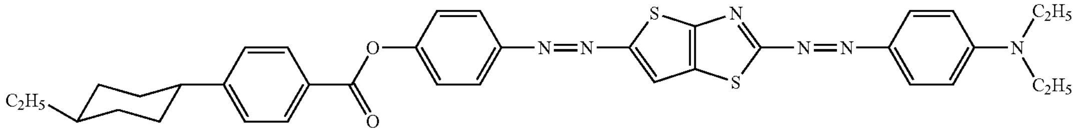
(A3-33)
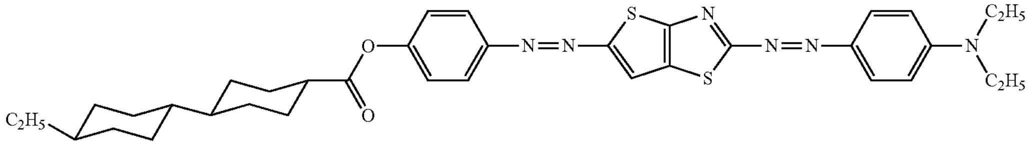
(A3-34)
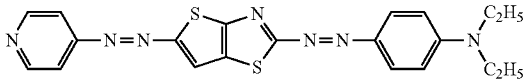
(A3-35)
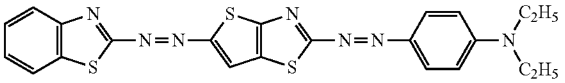
(A3-36)
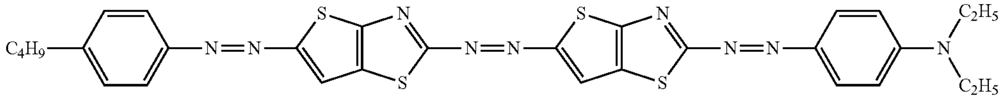
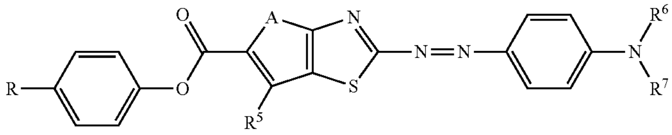
| No. | A | $R^5$ | $R^6$ | $R^7$ | R |
|---|---|---|---|---|---|
| A3-37 | S | —H | —$C_2H_5$ | —$C_2H_5$ | —$C_4H_9$ |
| A3-38 | S | —H | —$C_2H_5$ | —$C_2H_5$ | —$C_7H_{15}$ |
| A3-39 | S | —H | —$C_2H_5$ | —$C_2H_5$ | —CN |
| A3-40 | S | —H | —$C_2H_5$ | —$C_2H_5$ | —Br |
| A3-41 | S | —$CH_3$ | —$C_2H_5$ | —$C_2H_5$ | —$C_4H_9$ |
-continued
| No. | A | $R^5$ | $R^6$ | $R^7$ | R |
|---|---|---|---|---|---|
| A3-42 | S | —H | —$CH_3$ | —$CH_3$ | —$C_4H_9$ |
| A3-43 | O | —H | —$C_2H_5$ | —$C_2H_5$ | —$C_4H_9$ |
(A3-44)
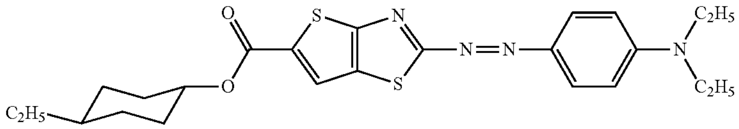

-continued (A3-45)

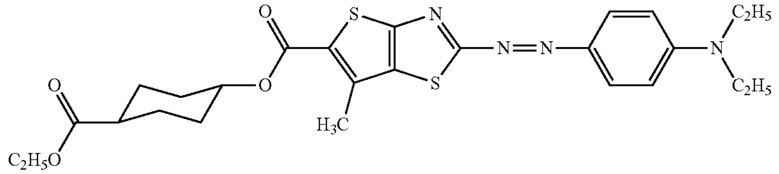

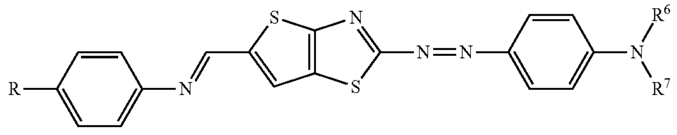

| No. | $R^6$ | $R^7$ | R |
|---|---|---|---|
| A3-46 | $—C_2H_5$ | $—C_2H_5$ | $—C_4H_9$ |
| A3-47 | $—C_2H_5$ | $—C_2H_5$ | $—OC_4H_9$ |
| A3-48 | $—C_2H_5$ | $—C_2H_5$ | $—CF_3$ |
| A3-49 | $—C_2H_5$ | $—C_2H_5$ | —F |
| A3-50 | $—CH_3$ | $—CH_3$ | $—C_4H_9$ |

(A3-51)

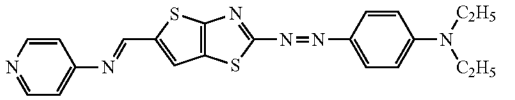

(A3-52)

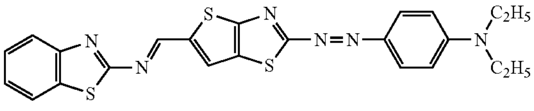

(A3-53)

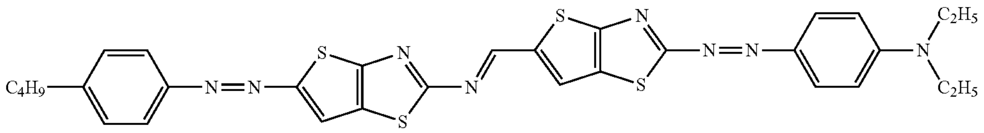

Formula (IV)

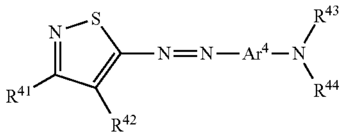

In the formula, $R^{41}$ and $R^{42}$ each represent a hydrogen atom or a substituent, and may be mutually linked to form a ring; $Ar^4$ represents an optionally substituted divalent aromatic hydrocarbon group or aromatic heterocyclic group; $R^{43}$ and $R^{44}$ each represent a hydrogen atom or an optionally substituted alkyl group, and may be mutually linked to form a hetero ring.

Examples of the substituent each represented by $R^{41}$ and $R^{42}$ in the formula (IV) are the same as examples of the substituent each represented by $R^{11}$ to $R^{14}$ in the above-described formula (I). $R^{41}$ and $R^{42}$ include preferably a hydrogen atom, an alkyl group, an alkoxy group, a halogen atom, a cyano group, a nitro group and a sulfo group, more preferably a hydrogen atom, an alkyl group, a halogen atom, a cyano group and a nitro group, further preferably a hydrogen atom, an alkyl group and a cyano group and more further preferably a hydrogen atom, a methyl group and a cyano group.

It is also preferable that $R^{41}$ and $R^{42}$ are mutually linked to form a ring. Particularly, it is preferable to form an aromatic hydrocarbon group or an aromatic heterocyclic group. As the aromatic heterocyclic group, groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring and the like.

The cyclic group formed by mutually linking $R^{41}$ and $R^{42}$ is preferably a benzene ring, a naphthalene ring, a pyridine ring, a pyrazine ring, a pyrimidine ring or a pyridazine ring, more preferably a benzene ring or a pyridine ring and most preferably a pyridine ring.

The cyclic group formed by mutually linking $R^{41-}$ and $R^{42}$ may have a substituent, and the range thereof is the same as the range of the group represented by $R^1$ and $R^2$, and also the preferable range thereof is the same as for the group represented by $R^1$ and $R^2$.

Examples of the compound represented by the above-described formula (IV) include compounds represented by the following formula (IV').

Formula (IV')

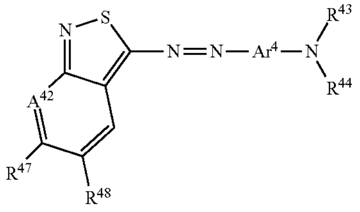

In the formula, the same symbols as in the formula (IV) have the same meanings, and also the preferable range thereof is the same. $A^{42}$ represents N or CH, and $R^{47}$ and $R^{48}$ each represent a hydrogen atom or a substituent. It is preferable that one of $R^{47}$ and $R^{48}$ is a substituent, and it is also preferable that $R^{47}$ and $R^{48}$ both represent a substituent. Preferable examples of the substituent are the same as examples of the substituent represented by $R^{41}$ and $R^{42}$, that is, preferable are an alkyl group, an alkoxy group, a halogen atom, a cyano group, a nitro group and a sulfo group, more preferable are an alkyl group, a halogen atom, a cyano group and a nitro group, further preferable are an alkyl group and a cyano group and most preferable are a methyl group and a cyano group. For example, compounds in which one of $R^{47}$ and $R^{48}$ is an alkyl group having the number of carbon atoms of 1 to 4 and the other is a cyano group are also preferable.

As the aromatic heterocyclic group represented by $Ar^4$ in the formula (IV'), groups derived from monocyclic or bicyclic hetero rings are preferable. The atoms other than carbon, constituting the aromatic heterocyclic group, include a nitrogen atom, a sulfur atom and an oxygen atom. When the aromatic heterocyclic group has two or more ring constituent atoms other than carbon, these may be the same or different. The aromatic heterocyclic group includes, specifically, a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring and the like.

The group represented by $Ar^4$ is preferably a benzene ring, a naphthalene ring, a pyridine ring, a pyrazine ring, a pyrimidine ring, a pyridazine ring, a quinoline ring or a thiophene ring, more preferably a benzene ring, a naphthalene ring, a pyridine ring or a thiophene ring and most preferably a benzene ring.

$Ar^4$ may have a substituent, and the range thereof is the same as for the group represented by $R^{41}$ and $R^{42}$ described above. The substituent optionally carried on $Ar^4$ is preferably an alkyl group, an alkoxy group or a halogen atom, more preferably a hydrogen atom, an alkyl group or an alkoxy group, more further preferably a methyl group. It is also preferable that $Ar^4$ has no substituent.

It is preferable that a linkage of $Ar^4$ and an amino group is parallel to a linkage of $Ar^4$ and an azo group, since linearity of a molecule is enhanced and a larger molecular length and larger aspect ratio are obtained in this condition. For example, when $Ar^4$ contains a 6-membered ring linked to an azo group and amino group, it is preferable that an amino group is linked to 4-position with respect to an azo group, and when $Ar^4$ contains a 5-membered ring linked to an azo group and amino group, it is preferable that an amino group is linked to 3- or 4-position with respect to an azo group.

The range of the alkyl group represented by $R^{43}$ and $R^{44}$ in the formula (IV') is the same as for the alkyl group represented by $R^{41}$ and $R^{42}$ described above. The alkyl group may have a substituent, and examples of the substituent are the same as examples of the substituent represented by $R^{41}$ and $R^{42}$. When $R^{43}$ and $R^{44}$ represent an optionally substituted alkyl group, these may be mutually linked to form a hetero ring. If possible, these may be linked to the substituent carried on $Ar^4$ to form a ring.

It is preferable that $R^{43}$ and $R^{44}$ are mutually linked to form a ring. A 6-membered ring or a 5-membered ring is preferable and a 6-membered ring is more preferable. The cyclic group may have an atom other than carbon as the constituent atom, together with carbon. The constituent atom other than carbon includes a nitrogen atom, a sulfur atom and an oxygen atom. When the cyclic group has two or more ring constituent atoms other than carbon, these may be the same or different.

The cyclic group composed of $R^{43}$ and $R^{44}$ includes, specifically, a 3-pyrroline ring, a pyrrolidine ring, a 3-imidazoline ring, an imidazolidine ring, a 4-oxazoline ring, an oxazolidine ring, a 4-thiazoline ring, a thiazolidine ring, a piperidine ring, a piperazine ring, a morpholine ring, a thiomorpholine ring, an azepan ring, an azocan ring and the like.

The cyclic group composed of $R^{43}$ and $R^{44}$ is preferably a pyrrolidine ring, a piperidine ring, a piperazine ring or a morpholine ring, more preferably a piperidine ring or a piperazine ring and most preferably a piperazine ring.

The cyclic group composed of $R^{43}$ and $R^{44}$ may have a substituent, and the range thereof is the same as for the group represented by $R^{41}$ and $R^{42}$. It is preferable that the cyclic group has one rigid linear substituent and a linkage of the cyclic group and the substituent is parallel to a linkage of the cyclic group and $Ar^4$, since linearity of a molecule is enhanced and a larger molecular length and larger aspect ratio are obtained in this condition.

Among dichroic dyes represented by the formula (IV), particularly preferable are dichroic dyes represented by the following formula (IVa).

(Iva)

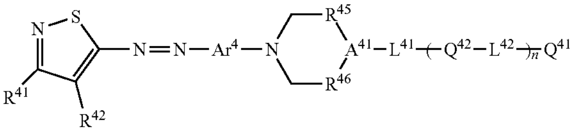

In the formula, $R^{41}$ and $R^{42}$ each represent a hydrogen atom or a substituent, and may be mutually linked to form a ring; $Ar^4$ represents an optionally substituted divalent aromatic hydrocarbon group or aromatic heterocyclic group; $A^{41}$ represents a carbon atom or a nitrogen atom; $L^{41}$, $L^{42}$, $R^{45}$ and $R^{46}$ represent a single bond or a divalent linking group; $Q^{41}$ represents an optionally substituted cyclic hydrocarbon group or heterocyclic group; $Q^{42}$ represents an optionally substituted divalent cyclic hydrocarbon group or heterocyclic group; n represents an integer of 0 to 3, and when n is 2 or more, a plurality of $L^{42}$s and a plurality of $Q^{42}$s may each be mutually the same or different.

The range of the group represented by $R^{41}$ and $R^{42}$ in the formula (IVa) is the same as for $R^{41}$ and $R^{42}$ in the formula (IVa), and also the preferable range thereof is the same as in the formula (IVa).

The range of the divalent aromatic hydrocarbon group or the aromatic heterocyclic group represented by $Ar^4$ in the formula (IVa) is the same as for $Ar^4$ in the formula (IV), and also the preferable range thereof is the same as in the formula (IV).

In the formula (IVa), $A^{41}$ is preferably a nitrogen atom.

The linking group represented by $L^{41}$, $L^{42}$, $R^{45}$ and $R^{46}$ in the formula (IVa) includes alkylene groups (preferably having 1 to 20 carbons, more preferably having 1 to 10 carbons and particularly preferably having 1 to 6 carbons, and examples thereof include a methylene group, an ethylene group, a propylene group, a butylene group, a pentylene group, a cyclohexane-1,4-diyl group and the like), alkenylene groups (preferably having 2 to 20 carbons, more preferably having 2 to 10 carbons and particularly preferably having 2 to 6 carbons, and examples thereof include an ethenylene group and the like), alkynylene groups (preferably having 2 to 20 carbons, more preferably having 2 to 10 carbons and particularly preferably having 2 to 6 carbons, and examples thereof include an ethynylene group and the like), alkyleneoxy groups (preferably having 1 to 20 carbons, more preferably having 1 to 10 carbons and particularly preferably having 1 to 6 carbons, and examples thereof include a methyleneoxy group and the like) , an amide group, an ether group, an acyloxy group (—C(═O)O—), an oxycarbonyl group (—OC(═O)—), an imino group (—CH═N— or —N═CH—), a sulfoamide group, a sulfonate group, a ureide group, a sulfonyl group, a sulfinyl group, a thioether group, a carbonyl group, an —NR— group (here, R represents a hydrogen atom, an alkyl group or an aryl group), an azo group, an azoxy group, or divalent linking groups having 0 to 60 carbons constituted of two or more of them in combination.

The linking group represented by $L^{41}$ includes preferably a single bond, an alkylene group, an alkenylene group, an alkyleneoxy group, an oxycarbonyl group, an acyl group and a carbamoyl group, more preferably a single bond and an alkylene group and further preferably a single bond and an ethylene group.

The linking group represented by $L^{42}$ includes preferably a single bond, an alkylene group, an alkenylene group, an oxycarbonyl group, an acyl group, an acyloxy group, a carbamoyl group, an imino group, an azo group and an azoxy group, more preferably a single bond, an oxycarbonyl group, an acyloxy group, an imino group, an azo group and an azoxy group and further preferably a single bond, an oxycarbonyl group and an acyloxy group.

The linking group represented by $R^{45}$ and $R^{46}$ includes preferably a single bond, an alkylene group, an alkenylene group, an alkyleneoxy group and an acyl group, more preferably a single bond and an alkylene group and further preferably a single bond and a methylene group.

The number of constituent atoms of the ring formed of a nitrogen atom, a methylene group, $R^{45}$, $R^{46}$ and $A^{41}$ in the formula (IVa) is determined by $R^{45}$ and $R^{46}$, and for example, when $R^{45}$ and $R^{46}$ both represent a single bond, the ring can be a 4-membered ring; when one of them is a single bond and the other is a methylene group, it can be a 5-membered ring; and further, when $R^{45}$ and $R^{46}$ both represent a methylene group, it can be a 6-membered ring.

In the formula (IVa), the ring formed of a nitrogen atom, a methylene group, $R^{45}$, $R^{46}$ and $A^{41}$ is preferably a 6-membered ring or a 5-membered ring and more preferably a 6-membered ring.

The group represented by $Q^{41}$ in the formula (IVa) includes preferably an aromatic hydrocarbon group (preferably having 1 to 20 carbons and more preferably having 1 to 10 carbons, and examples thereof include a phenyl group, a naphthyl group and the like), an aromatic heterocyclic group and a cyclohexane ring group.

The aromatic heterocyclic group represented by $Q^{41}$ is preferably a group derived from a monocyclic or bicyclic hetero ring. The atom other than carbon constituting the aromatic heterocyclic group includes a nitrogen atom, a sulfur atom and an oxygen atom. When the aromatic heterocyclic group has two or more ring constituent atoms other than carbon, these may be the same or different. The aromatic heterocyclic group includes specifically a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring and the like.

The group represented by $Q^{41}$ includes preferably a benzene ring, a naphthalene ring, a pyridine ring, a pyrazine ring, a pyrimidine ring, a pyridazine ring, a thiazole ring, a benzothiazole ring, a thiadiazole ring, a quinoline ring, a thienothiazole ring and a cyclohexane ring, more preferably a benzene ring, a naphthalene ring, a pyridine ring, a thiazole ring, a benzothiazole ring, a thiadiazole ring and a cyclohexane ring and most preferably a benzene ring, a pyridine ring and a cyclohexane ring.

$Q^{41}$ may have a substituent, and the range thereof is the same as the range of the group represented by $R^{41}$ and $R^{42}$ described above.

The substituent optionally carried on $Q^{41}$ includes preferably an alkyl group optionally having a substituent, an alkenyl group optionally having a substituent, an alkynyl group optionally having a substituent, an aryl group optionally having a substituent, an alkoxy group optionally having a substituent, an oxycarbonyl group optionally having a substituent, an acyloxy group optionally having a substituent, an acylamino group optionally having a substituent, an amino group optionally having a substituent, an alkoxycarbonylamino group optionally having a substituent, a sulfonylamino group optionally having a substituent, a sulfamoyl group optionally having a substituent, a carbamoyl group optionally having a substituent, an alkylthio group optionally having a substituent, a sulfonyl group optionally having a substituent, a ureide group optionally having a substituent, a nitro group, a hydroxy group, a cyano group, an imino group, an azo group and a halogen atom, more preferably an alkyl group optionally having a substituent, an alkenyl group optionally having a substituent, an aryl group optionally having a substituent, an alkoxy group optionally having a substituent, an oxycarbonyl group optionally having a substituent, an acyloxy group optionally having a substituent, a nitro group, an imino group and an azo group. The preferable range of the number of carbon atoms of one having carbon atoms among the above-described substituents is the same as the preferable range of the number of carbon atoms of the group represented by $R^{41}$ and $R^{42}$ described above.

It is preferable that $Q^{41}$ has one substituent and a linkage of $Q^{41}$ and the substituent is parallel to a linkage of $Q^{41}$ *and* $L^{41}$ or$L^{42}$, since linearity of a molecule is enhanced and a larger molecular length and larger aspect ratio are obtained under this condition. Particularly when n=0, it is preferable that $Q^{41}$ has a substituent at the above-described position.

In the formula (IVa), $Q^{42}$ represents an optionally substituted divalent cyclic hydrocarbon group or heterocyclic group.

The divalent cyclic hydrocarbon group represented by $Q^{42}$ may be aromatic or non-aromatic. Preferable examples of the divalent cyclic hydrocarbon group include aromatic hydrocarbon groups (preferably having 1 to 20 carbons and more preferably having 1 to 10 carbons, and examples thereof include a phenyl group, a naphthyl group and the like) and a cyclohexane ring group.

The divalent cyclic heterocyclic group represented by $Q^{42}$ may also be aromatic or non-aromatic. The heterocyclic group is preferably a group derived from a monocyclic or bicyclic hetero ring. The atom other than carbon constituting the heterocyclic group includes a nitrogen atom, a sulfur atom and an oxygen atom. When the heterocyclic group has two or more ring constituent atoms other than carbon, these may be the same or different. The heterocyclic group includes specifically a pyridine ring, a pyrazine ring, a pyrimidine ring, a pyridazine ring, a quinoline ring, a thiophene ring, a thiazole ring, a benzothiazole ring, a thiadiazole ring, a quinolone ring, a naphthalimide ring, a thienothiazole ring, a 3-pyrroline ring, a pyrrolidine ring, a 3-imidazoline ring, an imidazolidine ring, a 4-oxazoline ring, an oxazolidine ring, a 4-thiazoline ring, a thiazolidine ring, a piperidine ring, a piperazine ring, a morpholine ring, a thiomorpholine ring, an azepan ring, an azocan ring and the like.

The group represented by $Q^{42}$ is preferably a benzene ring, a naphthalene ring, a pyridine ring, a pyrazine ring, a pyrimidine ring, a pyridazine ring, a piperidine ring, a piperazine ring, a quinoline ring, a thiophene ring, a thiazole ring, a benzothiazole ring, a thiadiazole ring, a quinolone ring, a naphthalimide ring, a thienothiazole ring or a cyclohexane ring, more preferably a benzene ring, a naphthalene ring, a pyridine ring, a piperidine ring, a piperazine ring, a thiazole ring, a thiadiazole ring or a cyclohexane ring and more further preferably a benzene ring, a cyclohexane ring or a piperazine ring.

$Q^{42}$ may have substituent, and the range thereof is the same as for the group represented by $R^{41}$ and $R^{42}$ described above.

The range of the substituent optionally carried on $Q^{42}$ is the same as for the substituent optionally carried on $Ar^4$ described above, and also the preferable range thereof is the same as for the substituent optionally carried on $Ar^4$.

It is preferable that linkages of $Q^{42}$ and $L^{41}$ and $L^{42}$ or two $L^{42}$s are parallel, since linearity of a molecule is enhanced and a larger molecular length and larger aspect ratio are obtained under this condition.

In the formula (IVa), n represents an integer of 0 to 3, preferably 0 to 2, more preferably 0 or 1 and most preferably 1.

Among dichroic dyes represented by the formula (IVa), dichroic dyes represented by the following formula (IVb) are particularly preferable.

(Ivb)

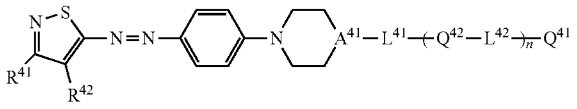

In the formula, $R^{41}$ and $R^{42}$ each represent a hydrogen atom or a substituent; $A^{41}$ represents a carbon atom or a nitrogen atom; $L^{41}$ and $L^{42}$ each represent a single bond or a divalent linking group; $Q^{41}$ represents an optionally substituted cyclic hydrocarbon group or optionally substituted heterocyclic group; $Q^{42}$ represents an optionally substituted divalent cyclic hydrocarbon group or heterocyclic group; n represents an integer of 0 to 3, and when n is 2 or more, a plurality of $L^{42}$s and a plurality of $Q^{42}$s may each be mutually the same or different.

The range of the group represented by $R^{41}$, $R^{42}$, $L^{41}$, $L^{42}$, $Q^{41}$ and $Q^{42}$ in the formula (IVb) is the same as for $R^{41}$, $R^{42}$, $L^{41}$, $L^{42}$, $Q^{41}$ and $Q^{42}$ in the formula (IV), and also the preferable range thereof is the same as in the formula (IV).

In the formula (IVb), $A^{41}$ is preferably a nitrogen atom.

Specific examples of the compound represented by the formula (IV) include, but are not limited to, the following specific examples.

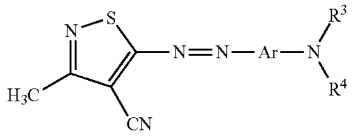

| No . | Ar | $R^3$ | $R^4$ |
|---|---|---|---|
| A4-1 | 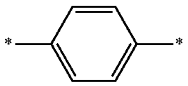 [SMILES: *c1ccc(*)cc1] | $—CH_3$ | $—CH_2Ph$ |
| A4-2 | ↑ | ↑ | $—C_{12}H_{25}$ |
| A4-3 | ↑ | ↑ | $—(CH_2CH_2O)_3CH_3$ |
| A4-4 | ↑ | ↑ | $—C_2CH_2OCH_2Ph$ |
| A4-5 | ↑ | —H | $—CH_2Ph$ |
| A4 6 | ↑ | $C_2H_5$ | ↑ |
| A4-7 | ↑ | | 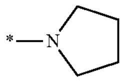 |
| A4-8 | ↑ | | 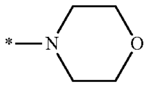 |
| A4-9 | 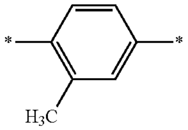 [SMILES: *c1ccc(*)c(C)c1] | $—CH_3$ | $—CH_2Ph$ |
| A4-10 | 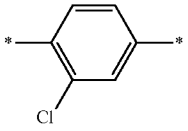 [SMILES: *c1ccc(*)c(Cl)c1] | ↑ | ↑ |
| A4-11 | 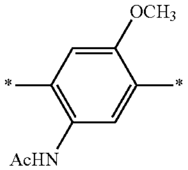 [SMILES: *c1cc(OC)c(*)cc1NC(C)=O] | ↑ | ↑ |
| A4-12 | 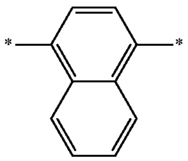 [SMILES: *c1ccc(*)c2ccccc12] | ↑ | ↑ |
| A4-13 | 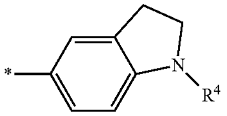 | | ↑ |

-continued
| No . | Ar | $R^3$ | $R^4$ |
|---|---|---|---|
| A4-14 | 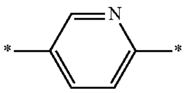 | —$CH_3$ | ↑ |
| A4-15 | 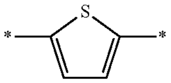 [SMILES: *c1ccc(*)s1] | ↑ | —$CH_2CH_2OCH_2Ph$ |
| A4-16 | ↑ | | 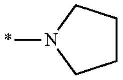 [SMILES: *N1CCCC1] |
| A4-17 | 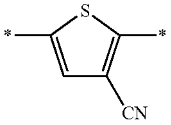 [SMILES: *c1cc(C#N)c(*)s1] | | ↑ |
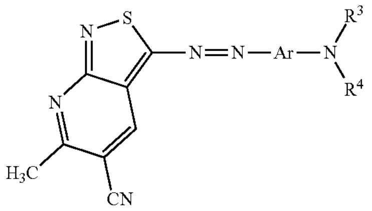
| No. | Ar | $R^3$ | $R^4$ |
|---|---|---|---|
| A4-18 |  | —$CH_3$ | —$CH_2Ph$ |
| A4-19 | ↑ | | 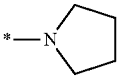 [SMILES: *N1CCCC1] |
| A4-20 | ↑ | | 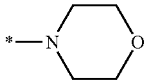 [SMILES: *N1CCOCC1] |
| A4-21 | 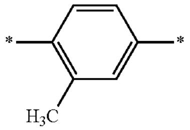 | —$C_2H_5$ | —$C_2H_5$ |
| A4-22 | 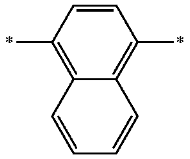 [SMILES: *c1ccc(*)c2ccccc12] | ↑ | ↑ |
| A4-23 | 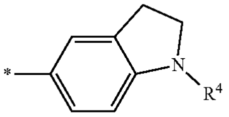 | | —$CH_2Ph$ |
-continued
| No. | Ar | $R^3$ | $R^4$ |
|---|---|---|---|
| A4-24 | 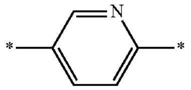 | —$CH_3$ | ↑ |
| A4-25 | 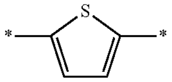 [SMILES: *c1ccc(*)s1] | | 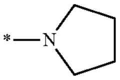 |
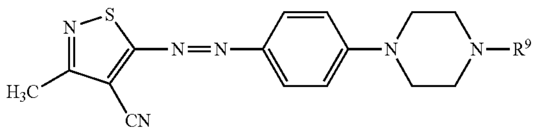
| No. | $R^9$ |
|---|---|
| A4-26 | —$C_5H_{11}$ |
| A4-27 | —$C_{12}H_{25}$ |
| A4-28 | —$CH_2CH(C_2H_5)C_4H_9$ |
| A4-29 | —$(CH_2CH_2O)_3CH_3$ |
| A4-30 | —$COOC_8H_{17}$ |
| A4-31 | —$C({=}O)C_{11}H_{23}$ |
| A4-32 | $CONHC_8H_{17}$ |
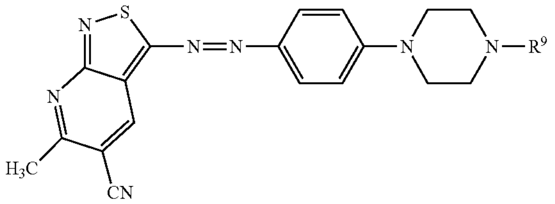
| No. | $R^9$ |
|---|---|
| A4-33 | —$C_5H_{11}$ |
| A4-34 | —$C_{12}H_{25}$ |
| A4-35 | —$CH_2CH(C_2H_5)C_4H_9$ |
| A4-36 | —$(CH_2CH_2O)_3CH_3$ |
| A4-37 | —$COOC_8H_{17}$ |
| A4-38 | —$C({=}O)C_{12}H_{25}$ |
| A4-39 | $CONHC_8H_{17}$ |
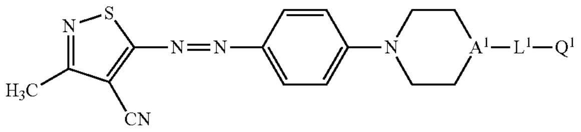
| No. | $A^1$ | $L^1$ | $Q^1$ |
|---|---|---|---|
| A4-40 | >CH— | — | —Ph |
| A4-41 | >N— | ↑ | ↑ |

-continued
| No. | $A^1$ | $L^1$ | $Q^1$ |
|---|---|---|---|
| A4-42 | ↑ | ↑ | 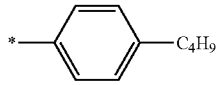 |
| A4-43 | ↑ | ↑ | 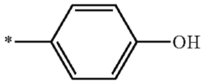 |
| A4-44 | ↑ | ↑ | 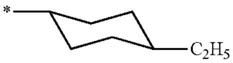 |
| A4-45 | ↑ | —COO— | 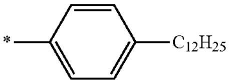 |
| A4-46 | ↑ | $—COOCH_2—$ | —Ph |
| A4-47 | ↑ | —CONH— | 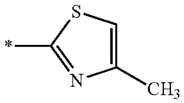 [SMILES: *c1nc(C)cs1] |
| A4-48 | ↑ | ↑ | 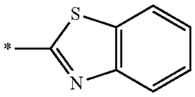 [SMILES: *c1nc2ccccc2s1] |
| A4-49 | ↑ | —CO— | 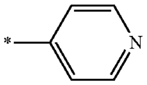 [SMILES: *c1ccncc1] |
| A4-50 | ↑ | ↑ | 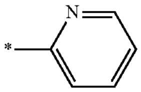 |
| A4-51 | ↑ | $—CH_2CH_2—$ | —Ph |
| A4-52 | ↑ | $—CH_2CH_2O—$ | 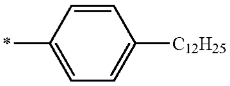 |
| A4-53 | ↑ | $—CH_2CH_2OCO—$ | 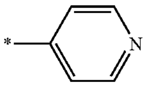 |
| A4-54 | ↑ | ↑ | 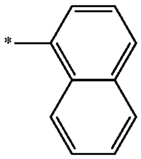 |
| A4-55 | ↑ | ↑ | 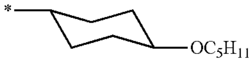 |
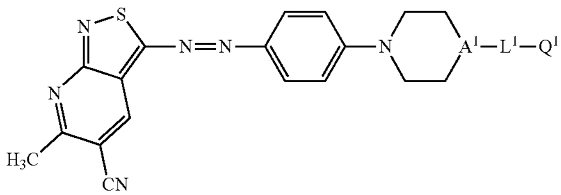
| No. | $A^1$ | $L^1$ | $Q^1$ |
|---|---|---|---|
| A4-56 | >CH— | — | —Ph |
| A4-57 | >N— | ↑ | ↑ |
| A4-58 | ↑ | ↑ | 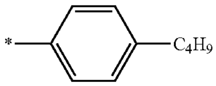 |
| A4-59 | ↑ | ↑ | 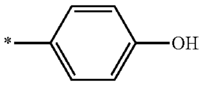 [SMILES: *c1ccc(O)cc1] |
| A4-60 | ↑ | ↑ | 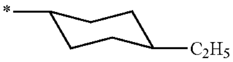 |
| A4-61 | ↑ | —COO— | 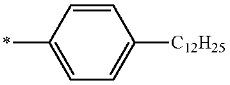 |
| A4-62 | ↑ | $—COOCH_2—$ | —Ph |
| A4-63 | ↑ | —CONH— | 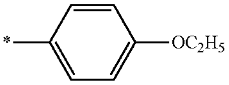 |
| A4-64 | ↑ | ↑ | 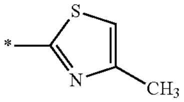 |
| A4-65 | ↑ | ↑ | 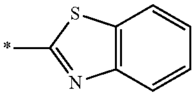 [SMILES: *c1nc2ccccc2s1] |
| A4-66 | ↑ | —CO— | 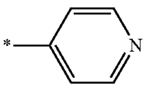 [SMILES: *c1ccncc1] |
| A4-67 | ↑ | ↑ | 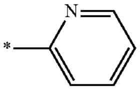 |
| A4-68 | ↑ | $—CH_2CH_2—$ | —Ph |
| A4-69 | ↑ | $—CH_2CH_2O—$ | 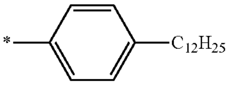 |

-continued
| No. | $A^1$ | $L^1$ | $Q^1$ |
|---|---|---|---|
| A4-70 | ↑ | $—CH_2CH_2OCO—$ | 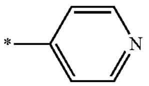 [SMILES: *c1ccncc1] |
| A4-71 | ↑ | ↑ | 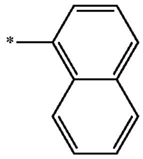 |
-continued
| No. | $A^1$ | $L^1$ | $Q^1$ |
|---|---|---|---|
| A4-72 | ↑ | ↑ | 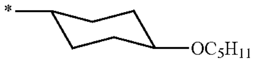 |
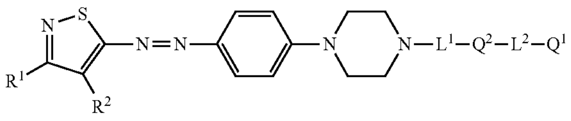
| No. | $R^1$ | $R^2$ | $L^1$ | $Q^2$ | $L^2$ | $Q^1$ |
|---|---|---|---|---|---|---|
| A4-73 | $—CH_3$ | —CN | — | 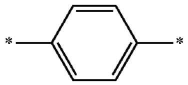 [SMILES: *c1ccc(*)cc1] | — | —Ph |
| A4-74 | ↑ | ↑ | ↑ | ↑ | ↑ | 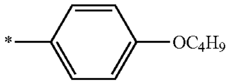 |
| A4-75 | ↑ | ↑ | ↑ | ↑ | —COO— | 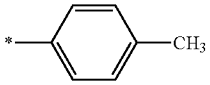 [SMILES: *c1ccc(C)cc1] |
| A4-76 | ↑ | ↑ | ↑ | ↑ | ↑ | 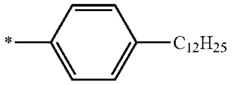 |
| A4-77 | ↑ | ↑ | ↑ | ↑ | ↑ | 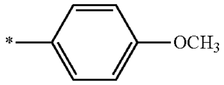 [SMILES: *c1ccc(OC)cc1] |
| A4-78 | ↑ | ↑ | ↑ | ↑ | $—COOCH_2—$ | —Ph |
| A4-79 | ↑ | ↑ | ↑ | ↑ | —CONH— | 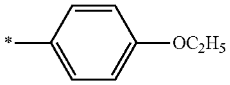 |
| A4-80 | ↑ | ↑ | ↑ | ↑ | ↑ | 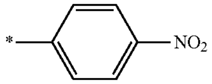 [SMILES: *c1ccc([N+](=O)[O-])cc1] |
| A4-81 | ↑ | ↑ | ↑ | ↑ | ↑ | 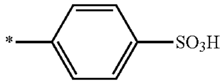 |
| A4-82 | ↑ | ↑ | ↑ | ↑ | —OCO— | 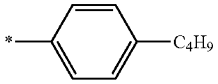 |
| A4-83 | ↑ | ↑ | ↑ | ↑ | ↑ | 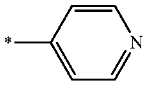 |
| A4-84 | ↑ | ↑ | ↑ | ↑ | —NHCO— | 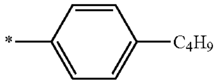 |

-continued
| No. | $R^1$ | $R^2$ | $L^1$ | $Q^2$ | $L^2$ | $Q^1$ |
|---|---|---|---|---|---|---|
| A4-85 | ↑ | ↑ | ↑ | 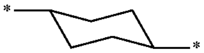 [SMILES: *C1CCC(*)CC1] | —OCO— | 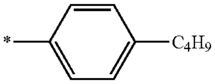 |
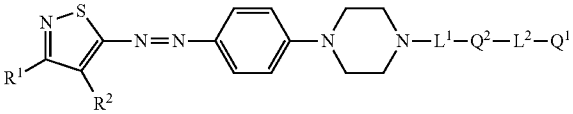
| No. | $R^1$ | $R^2$ | $L^1$ | $Q^2$ | $L^2$ | $Q^1$ |
|---|---|---|---|---|---|---|
| A4-86 | ↑ | ↑ | —COO— | 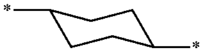 | —OCO— | 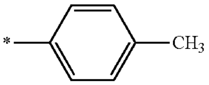 [SMILES: *c1ccc(C)cc1] |
| A4-87 | ↑ | ↑ | ↑ | ↑ | —COO— | 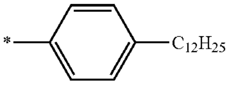 |
| A4-88 | ↑ | ↑ | —CO— | 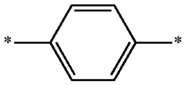 [SMILES: *c1ccc(*)cc1] | — | —Ph |
| A4-89 | ↑ | ↑ | ↑ | 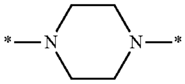 [SMILES: *N1CCN(*)CC1] | —COO— | 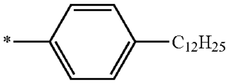 |
| A4-90 | ↑ | ↑ | $—CH_2CH_2—$ | 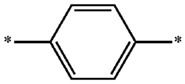 | —OCO— | 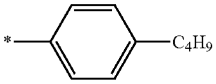 |
| A4-91 | ↑ | ↑ | ↑ | 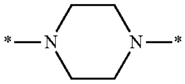 | — | —Ph |
| A4-92 | ↑ | ↑ | ↑ | ↑ | —COO— | 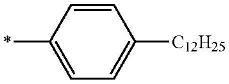 |
| A4-93 | ↑ | ↑ | ↑ | ↑ | —CO— | 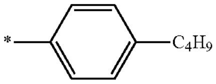 |
| A4-94 | ↑ | ↑ | ↑ | 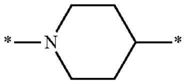 [SMILES: *C1CCN(*)CC1] | — | —Ph |
| A4-95 | ↑ | ↑ | $—CH_2CH_2O—$ | 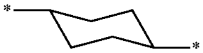 | —OCO— | 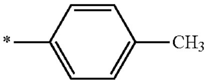 |
| A4-96 | ↑ | ↑ | $—CH_2CH_2OCO—$ | 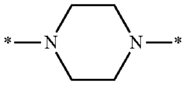 [SMILES: *N1CCN(*)CC1] | —COO— | 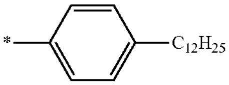 |
| A4-97 | ↑ | —H | ↑ | 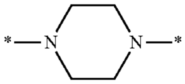 [SMILES: *N1CCN(*)CC1] | — | —Ph |

-continued
| No. | $R^1$ | $R^2$ | $L^1$ | $Q^2$ | $L^2$ | $Q^1$ |
|---|---|---|---|---|---|---|
| A4-98 | —H | ↑ | ↑ | ↑ | ↑ | ↑ |
| A4-99 | ↑ | —Cl | ↑ | ↑ | ↑ | ↑ |
| A4-100 | ↑ | $—SO_3H$ | ↑ | ↑ | ↑ | ↑ |
| A4-101 | ↑ | $—NO_2$ | ↑ | ↑ | ↑ | ↑ |
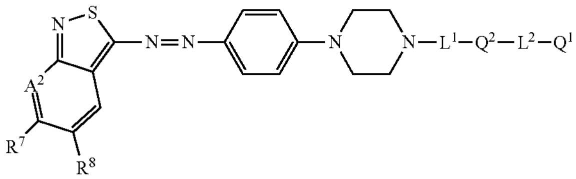
| No. | $A^2$ | $R^7$ | $R^8$ | $L^1$ | $Q^2$ | $L^2$ | $Q^1$ |
|---|---|---|---|---|---|---|---|
| A4-102 | —N═ | $—CH_2$ | —CN | — |  | — | —Ph |
| A4-103 | ↑ | ↑ | ↑ | ↑ | ↑ | ↑ | 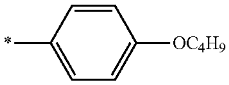 |
| A4-104 | ↑ | ↑ | ↑ | ↑ | ↑ | —COO— | 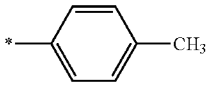 |
| A4-105 | ↑ | ↑ | ↑ | ↑ | ↑ | ↑ | 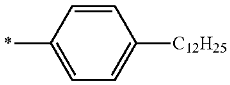 |
| A4-106 | ↑ | ↑ | ↑ | ↑ | ↑ | ↑ | 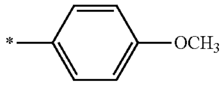 |
| A4-107 | ↑ | ↑ | ↑ | ↑ | ↑ | $—COOCH_2—$ | —Ph |
| A4-108 | ↑ | ↑ | ↑ | ↑ | ↑ | CONH | 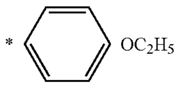 |
| A4-109 | ↑ | ↑ | ↑ | ↑ | ↑ | ↑ | 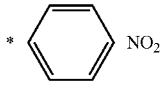 |
| A4-110 | ↑ | ↑ | ↑ | ↑ | ↑ | ↑ | 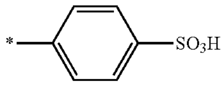 [SMILES: *c1ccc(S(=O)(=O)O)cc1] |
| A4-111 | ↑ | ↑ | ↑ | ↑ | ↑ | —OCO— | 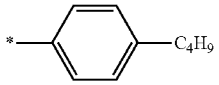 |
| A4-112 | ↑ | ↑ | ↑ | ↑ | ↑ | ↑ | 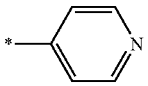 [SMILES: *c1ccncc1] |

-continued
| No. | $A^2$ | $R^7$ | $R^8$ | $L^1$ | $Q^2$ | $L^2$ | $Q^1$ |
|---|---|---|---|---|---|---|---|
| A4-113 | ↑ | ↑ | ↑ | ↑ | ↑ | —NHCO— | 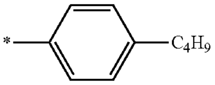 |
| A4-114 | ↑ | ↑ | ↑ | ↑ | 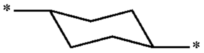 [SMILES: *C1CCC(*)CC1] | —OCO— | 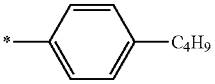 |
| A4-115 | ↑ | ↑ | ↑ | —COO— | 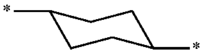 | —OCO— | 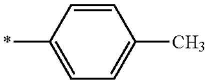 [SMILES: *c1ccc(C)cc1] |
| A4-116 | ↑ | ↑ | ↑ | ↑ | ↑ | —COO— | 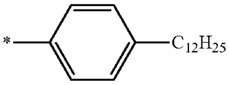 |
| A4-117 | ↑ | ↑ | ↑ | —CO— | 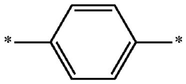 [SMILES: *c1ccc(*)cc1] | — | —Ph |
| A4-118 | ↑ | ↑ | ↑ | ↑ | 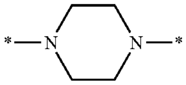 [SMILES: *N1CCN(*)CC1] | —COO— | 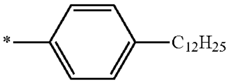 |
| A4-119 | ↑ | ↑ | ↑ | $—CH_2CH_2—$ |  | —OCO— | 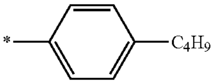 |
| A4-120 | ↑ | ↑ | ↑ | ↑ | 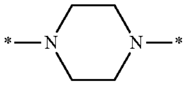 [SMILES: *N1CCN(*)CC1] | — | —Ph |
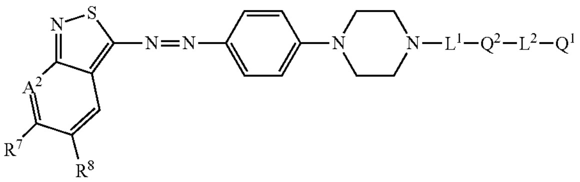
| No. | $A^2$ | $R^7$ | $R^8$ | $L^1$ | $Q^2$ | $L^2$ | $Q^1$ |
|---|---|---|---|---|---|---|---|
| A4-121 | ↑ | ↑ | ↑ | ↑ | ↑ | —COO— | 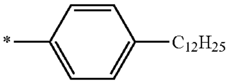 |
| A4-122 | ↑ | ↑ | ↑ | ↑ | ↑ | —CO— | 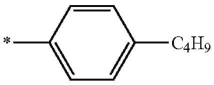 |
| A4-123 | ↑ | ↑ | ↑ | ↑ | 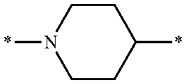 [SMILES: *C1CCN(*)CC1] | — | —Ph |
| A4-124 | ↑ | ↑ | ↑ | $—CH_2CH_2O—$ | 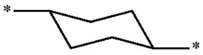 | —OCO— | 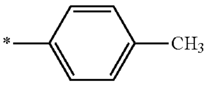 [SMILES: *c1ccc(C)cc1] |

-continued
| No. | $A^2$ | $R^7$ | $R^8$ | $L^1$ | $Q^2$ | $L^2$ | $Q^1$ |
|---|---|---|---|---|---|---|---|
| A4-125 | ↑ | ↑ | ↑ | —$CH_2CH_2OCO$— | 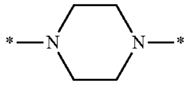 [SMILES: *N1CCN(*)CC1] | —COO— | 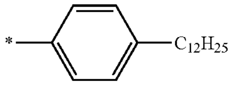 |
| A4-126 | ↑ | ↑ | —H | —$CH_2CH_2$— | 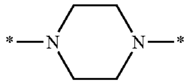 [SMILES: *N1CCN(*)CC1] | — | —Ph |
| A4-127 | ↑ | —H | ↑ | ↑ | ↑ | ↑ | ↑ |
| A4-128 | ↑ | ↑ | —Cl | ↑ | ↑ | ↑ | ↑ |
| A4-129 | ↑ | ↑ | —$SO_3H$ | ↑ | ↑ | ↑ | ↑ |
| A4-130 | ↑ | ↑ | —$NO_2$ | ↑ | ↑ | ↑ | ↑ |
| A4-131 | —CH═ | —$CH_3$ | —CN | ↑ | ↑ | ↑ | ↑ |
| A4-132 | ↑ | ↑ | —H | ↑ | ↑ | ↑ | ↑ |
| A4-133 | ↑ | —H | ↑ | ↑ | ↑ | ↑ | ↑ |
| A4-134 | ↑ | ↑ | —Cl | ↑ | ↑ | ↑ | ↑ |
| A4-135 | ↑ | ↑ | —$SO_3H$ | ↑ | ↑ | ↑ | ↑ |
| A4-136 | ↑ | ↑ | —$NO_2$ | ↑ | ↑ | ↑ | ↑ |
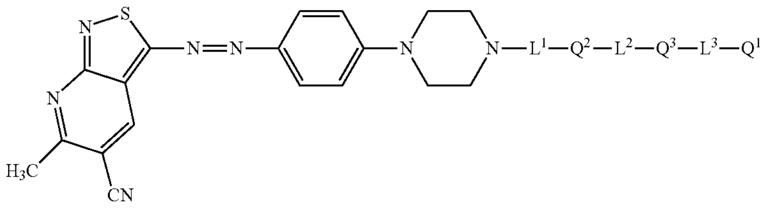
| No. | $L^1$ | $Q^2$ | $L^2$ | $Q^3$ | $L^3$ | $Q^1$ |
|---|---|---|---|---|---|---|
| A4-137 | — | 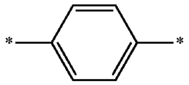 [SMILES: *c1ccc(*)cc1] | — | 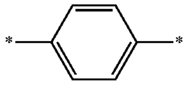 [SMILES: *c1ccc(*)cc1] | —COO— | 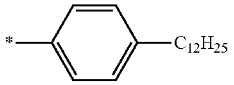 |
| A4-138 | ↑ | ↑ | —COO— | 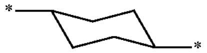 | —OCO— | 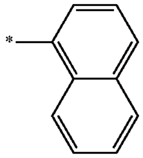 [SMILES: *c1cccc2ccccc12] |
| A4-139 | ↑ | ↑ | —OCO— | 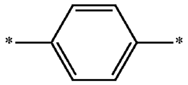 [SMILES: *c1ccc(*)cc1] | —CONH | 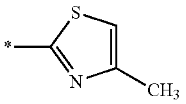 |
| A4-140 | —$CH_2CH_2$— | 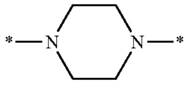 [SMILES: *N1CCN(*)CC1] | —COO— | 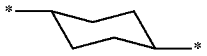 [SMILES: *C1CCC(*)CC1] | —OCO— | 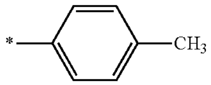 [SMILES: *c1ccc(C)cc1] |
| A4-141 | ↑ | ↑ | — | 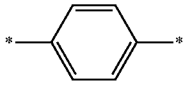 [SMILES: *c1ccc(*)cc1] | —N═N— | 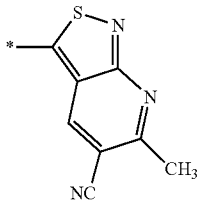 [SMILES: *c1snc2nc(C)c(C#N)cc12] |

-continued

| No. | $L^1$ | $Q^2$ | $L^2$ | $Q^3$ | $L^3$ | $Q^1$ |
|---|---|---|---|---|---|---|
| A4-142 | —COO— | 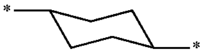 | —OCO— | 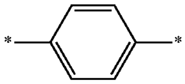 [SMILES: *c1ccc(*)cc1] | — | —Ph |

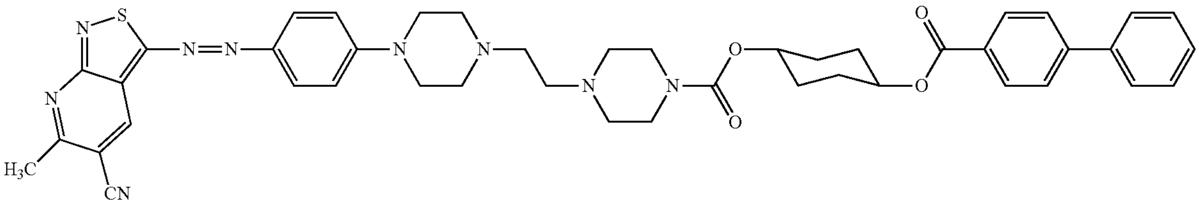

(A4-143)

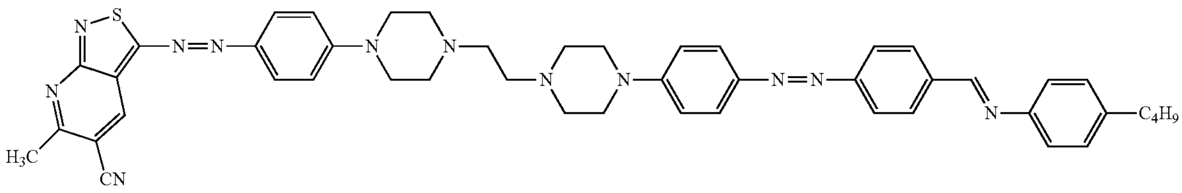

(A4-144)

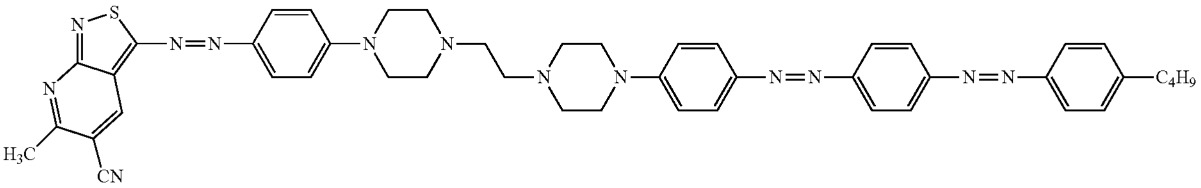

Compounds (azo dyes) described by the above-described formula (I), (II), (III) or (IV) can be synthesized by reference to methods described in "Dichroic Dyes for Liquid Crystal Display" (A. V. Ivashchenko ed., CRC, 1994), "Review on Synthetic Dyes (Sosetsu Gosei Senryo)" (Hiroshi Horiguchi ed., Sankyo Publishing, 1968) and literature cited in them.

Azo dyes represented by the above-described formula (I), (II), (III) or (IV) in the present invention can be synthesized easily according to methods described in the Journal of Materials Chemistry (1999), 9(11), 2755-2763 and the like.

The azo dye represented by the above-described formula (I), (II), (III) or (IV) is characterized by having a nature of easily realizing by itself liquid crystallinity, particularly nematic liquid crystallinity since the molecular shape is flat and has good linearity, has a rigid core part and a flexible side chain part, and a polar amino group is present at the molecular long axis end of the azo dye, as apparent from its molecular structure.

As described above, the dichroic dye composition containing at least one dichroic dye represented by the above-described (I), (II), (III) or (IV) has liquid crystallinity, in the present invention.

Further, the azo dye represented by the above-described formula (I), (II), (III) or (IV) also has a nature of easily forming an associated state of molecules by the action of strong intermolecular interaction because of high flatness of the molecule.

The dichroic dye composition containing the azo dye represented by the above-described formula (I), (II), (III) or (IV) according to the present invention is capable of realizing a high order molecular alignment via a lamination process such as, for example, application onto the surface of a rubbed polyvinyl alcohol alignment film since high absorbance is realized in a visible wider wavelength region due to association formation, and additionally, because the composition containing this dye has specifically nematic liquid crystallinity. Therefore, if the dichroic dye composition containing the azo dye represented by the above-described formula (I), (II), (III) or (IV) according to the present invention is used as a light absorption anisotropic film, a polarizing device having a high polarization property can be fabricated.

In the dichroic dye composition of the present invention, the dichroic ratio (D) calculated according to a method described in examples described later can be raised to 15 or more, and (D) is preferably 18 or more.

Regarding liquid crystallinity of the azo dye represented by the above-described formula (I), (II), (III) or (IV), a nematic liquid crystal phase is shown preferably at 10 to 300° C. and more preferably at 100 to 250° C.

It is preferable that the dichroic dye composition in the present invention contains at least one azo dye represented by the formula (I), (II), (III) or (IV). Though the combination of the azo dye is not particularly restricted, two or more azo dyes are preferably mixed in a combination giving a black color, for the polarizer to be produced to attain a high degree of polarization.

The azo dye represented by the formula (Ia) of the present invention is a magenta azo dye, the azo dye represented by the formulae (Ib) and (II) is a yellow or magenta azo dye and the azo dye represented by the formulae (III) and (IV) is a cyan azo dye.

It is preferable that at least one of two or more dichroic dyes contained in the above-described dichroic dye composition is an azo dye represented by the formula (Ia), (Ib) or (II).

It is preferable that the above-described dichroic dye composition contains an azo dye represented by the formula (III) or (IV).

It is preferable that the above-described dichroic dye composition contains at least one azo dye represented by the formula (Ia), (Ib) or (II) and at least one azo dye represented by the formula (III) or (IV).

The above-described dichroic dye composition may further contain a coloring material which is a dye other than the azo dye represented by the formula (I), (II), (III) or (IV) or the like within a range not deteriorating the effect of the present invention. It is preferable that also the dye other than the azo dye represented by the formula (I), (II), (III) or (IV) is selected from compounds showing liquid crystallinity. Examples of the dye which can be used together include azo dyes, cyanine dyes, azo metal complexes, phthalocyanine dyes, pyrylium dyes, thiopyrylium dyes, azulenium dyes, squarylium dyes, quinone dyes, triphenylmethane dyes, triarylmethane dyes and the like. Azo dyes or squarylium dyes are preferable. Particularly, those described in the "Dichroic Dyes for Liquid Crystal Display" (A. V. Ivashchenko ed., CRC, 1994) can also be used.

It is particularly preferable that the squarylium dye usable in the present invention is represented by the following formula (VI).

Formula (VI)

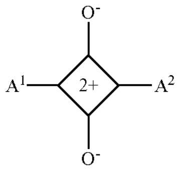

In the formula, $A^1$ and $A^2$ each represent independently a substituted or un-substituted hydrocarbon ring group or a heterocyclic group.

The hydrocarbon ring group is preferably a 5 to 20-membered monocyclic or condensed ring group. The hydrocarbon ring group may be aromatic ring or non-aromatic ring. The carbon atom constituting the hydrocarbon ring may be substituted with an atom other than a hydrogen atom. For example, at least one carbon atom constituting the hydrocarbon ring may be a carbon atom of C═O, C═S or C═NR (R represents a hydrogen atom or a $C_{1-10}$ alkyl group). At least one carbon atom constituting the hydrocarbon ring may have a substituent, and specific examples of the substituent can be selected from the substituent Group G described later. Examples of the above-described hydrocarbon ring group include, but are not limited to, the following groups.

A-1

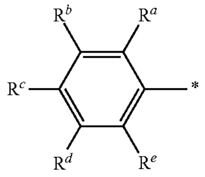

A-2

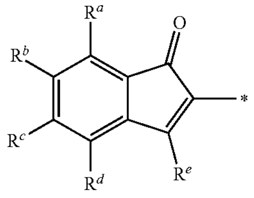

A-3

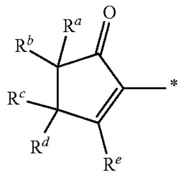

A-4

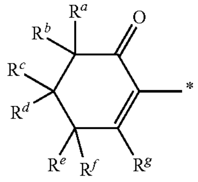

A-5

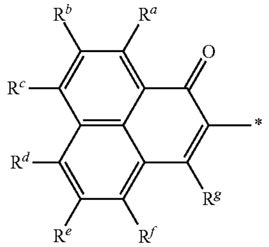

In the above-described formula, represents a site linking to a squarylium skeleton, and $R^a$ to $R^g$ each represent a hydrogen atom or a substituent, and if possible, these may be mutually linked to form a cyclic structure. The substituent can be selected from the substituent Group G described later.

Particularly, the following examples are preferable.

Groups represented by the formula A-1 in which $R^c$ represents —$N(R^{c1})(R^{c2})$ $R^{c1}$ and $R^{c2}$ each represent a hydrogen atom or a substituted or un-substituted alkyl group having 1 to 10 carbons and $R^b$ and $R^d$ represent a hydrogen atom, that is, groups represented by the following formula A-1a.

Groups represented by the formula A-2 in which $R^e$ represents a hydroxy group, that is, groups represented by the following formula A-2a.

Groups represented by the formula A-3 in which $R^e$ represents a hydroxy group and $R^c$ and $R^d$ represent a hydrogen atom, that is, groups represented by the following formula A-3a.

Groups represented by the formula A-4 in which $R^g$ represents a hydroxy group and $R^a$, $R^b$, $R^e$ and $R^f$ represent a hydrogen atom, that is, groups represented by the following formula A-4a.

Groups represented by the formula A-5 in which $R^g$ represents a hydroxy group, that is, groups represented by the following formula A-5a.

A-1a

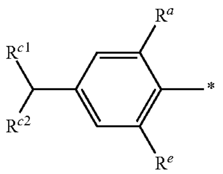

A-2a

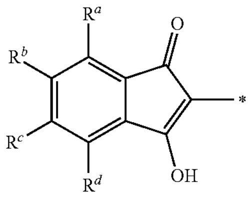

A-3a

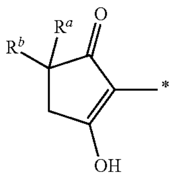

A-4a

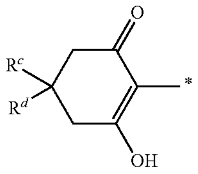

A-5a

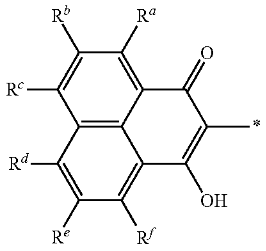

In the above-described formula A-1a, $R^{c1}$ and $R^{c2}$ each represent independently a hydrogen atom or a substituted or un-substituted alkyl group having 1 to 10 carbons; other symbols in the above-described formula have the same meaning as those in the above-described formulae A-1 to A-5, respectively. Examples of the substituent on the alkyl group include substituents in the substituent Group G described later, and also the preferable range thereof is the same as for the substituent Group G. When $R^{c1}$ and $R^{c2}$ represent a substituted or un-substituted alkyl group, these may be mutually linked to form a nitrogen-containing heterocyclic group. At least one of $R^{c1}$ and $R^{c2}$ may be linked to a carbon atom of a benzene ring in the formula A-1a to form a condensed ring. For example, the following formulae A-1b and A-1c may be used.

A-1b

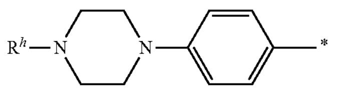

A-1c

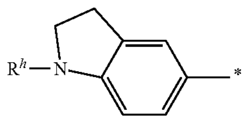

In the formula, represents a site linking to a squarylium skeleton, and $R^h$ represents a hydrogen atom or a substituent. Examples of the substituent include substituents in the substituent Group G described later. $R^h$ is preferably a substituent containing at least one benzene ring.

The heterocyclic group is preferably a 5 to 20-membered monocyclic or condensed ring group. The heterocyclic group has at least one of a nitrogen atom, a sulfur atom and an oxygen atom as a ring constituent atom. At least one carbon atom may be contained as a ring constituent atom, and a hetero atom or a carbon atom constituting a hetero ring may be substituted with an atom other than a hydrogen atom. For example, at least one sulfur atom constituting a hetero ring may be a sulfur atom of S═O or $S(O)_2$, and at least one carbon atom constituting a hetero ring may be a carbon atom of C═O, C═S or C═NR (R represents a hydrogen atom or a $C_{1-10}$ alkyl group). The heterocyclic group may be an aromatic ring or a non-aromatic ring. At least one hetero atom and/or carbon atom constituting a heterocyclic group may have a substituent, and specific examples of the substituent can be selected from the substituent Group G described later. Examples of the above-described heterocyclic group include, but are not limited to, the following groups.

A-6

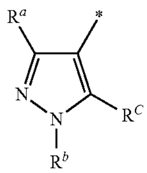

A-7

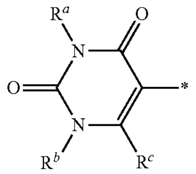

A-8

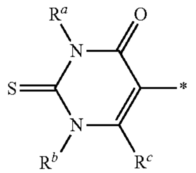

A-9

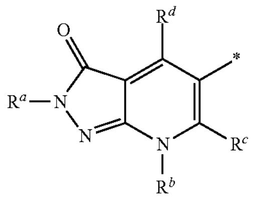

-continued
A-10
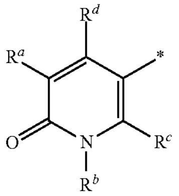
A-11
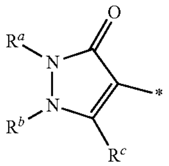
A-12
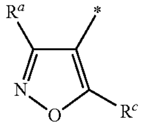
A-13
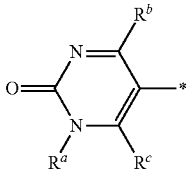
A-14
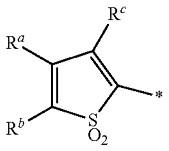
A-15
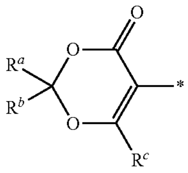
A-16
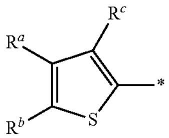
A-17
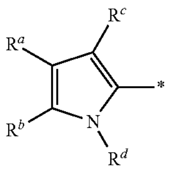
A-18
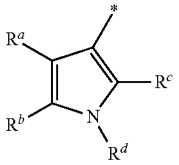
-continued
A-19
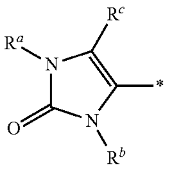
A-20
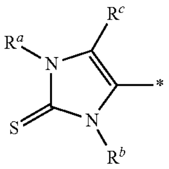
A-21
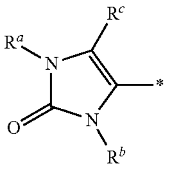
A-22
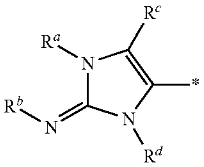
A-23
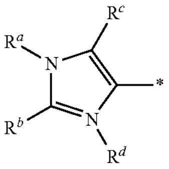
A-24
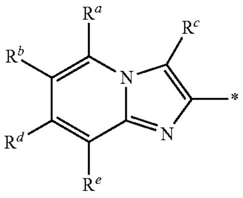
A-25
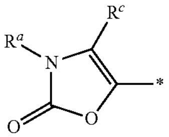
A-26
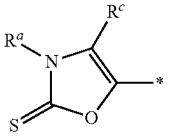
A-27
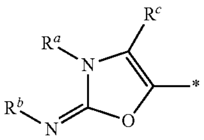

-continued

A-28

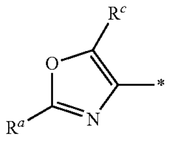

A-29

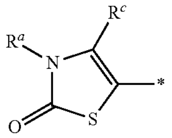

A-30

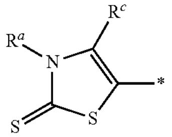

A-31

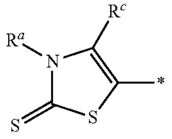

A-32

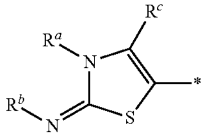

A-33

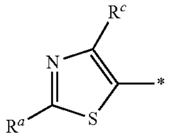

A-34

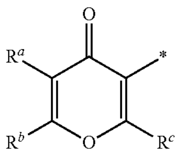

A-35

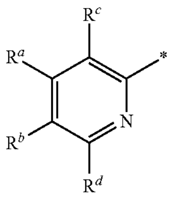

A-36

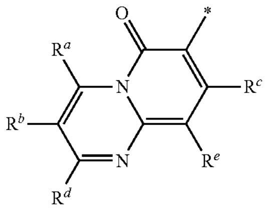

-continued

A-37

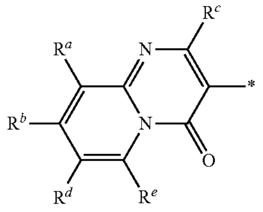

A-38

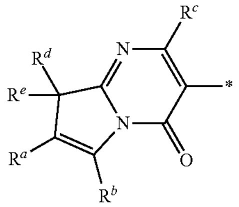

A-39

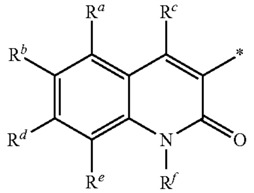

A-40

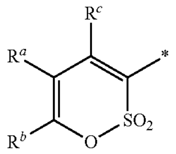

A-41

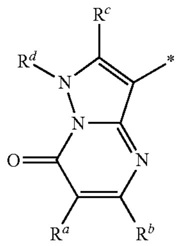

A-42

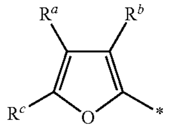

A-43

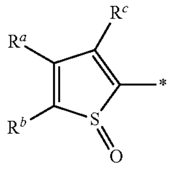

In the above-described formula, represents a site linking to a squarylium skeleton, $R^a$ to $R^f$ each represent a hydrogen atom or a substituent, and if possible, these may be mutually linked to form a cyclic structure. The substituent can be selected from the substituent Group G described later.

In the formulae A-6 to A-43, Rc represents preferably a hydroxy group (OH) or a hydrothioxy group (SH).

Hydrocarbon ring groups represented by A-1, A-2 and A-4 are preferable. A-1a, A-2a and A-4a are more preferable. Hydrocarbon ring groups represented by A-1 and A-2 are particularly preferable, and A-1a and A-2a are more preferable. Hydrocarbon ring groups represented by A-1a are further preferable, and among them, hydrocarbon ring groups represented by A-1a in which $R^a$ and $R^e$ represent a hydrogen atom or a hydroxyl group are preferable.

Heterocyclic groups represented by A-6, A-7, A-8, A-9, A-10, A-11, A-14, A-24, A-34, A-37 and A-39 are preferable. Heterocyclic groups represented by A-6, A-7, A-8, A-9, A-11, A-14, A-34 and A-39 are particularly preferable. In these formulae, Rc represents more preferably a hydroxy group (OH) or a hydrothioxy group (SH).

It is particularly preferable that at least one of $A^1$ and $A^2$ in the above-described formula (VI) is A-1 (more preferably A-1a).

The above-described hydrocarbon ring group and the heterocyclic group may have at least one substituent, and examples of the substituent include substituents in the substituent Group G as described below.

Substituent Group G:

substituted or un-substituted linear chain, branched chain or cyclic alkyl groups having 1 to 18 carbons (preferably having 1 to 8 carbons)(for example, methyl, ethyl, propyl, isopropyl, n-butyl, isobutyl, sec-butyl, t-butyl, cyclohexyl, methoxyethyl, ethoxycarbonylethyl, cyanoethyl, diethylaminoethyl, hydroxyethyl, chloroethyl, acetoxyethyl, trifluoromethyl and the like); substituted or un-substituted aralkyl groups having 7 to 18 carbons (preferably having 7 to 12 carbons)(for example, benzyl, carboxybenzyl and the like); substituted or un-substituted alkenyl groups having 2 to 18 carbons (preferably having 2 to 8 carbons) (for example, vinyl and the like); substituted or un-substituted alkynyl groups having 2 to 18 carbons (preferably having 2 to 8 carbons)(for example, ethynyl and the like); substituted or un-substituted aryl groups having 6 to 18 carbons (preferably having 6 to 10 carbons) (for example, phenyl, 4-methylphenyl, 4-methoxyphenyl, 4-carboxyphenyl, 3,5-dicarboxyphenyl and the like);

substituted or un-substituted acyl groups having 2 to 18 carbons (preferably having 2 to 8 carbons)(for example, acetyl, propionyl, butanoyl, chloroacetyl and the like); substituted or un-substituted alkyl or arylsulfonyl groups having 1 to 18 carbons (preferably having 1 to 8 carbons) (for example, methanesulfonyl, p-toluenesulfonyl and the like); alkylsulfinyl groups having 1 to 18 carbons (preferably having 1 to 8 carbons) (for example, methanesulfinyl, ethanesulfinyl, octanesulfinyl and the like); alkoxycarbonyl groups having 2 to 18 carbons (preferably having 2 to 8 carbons) (for example, methoxycarbonyl, ethoxycarbonyl and the like); aryloxycarbonyl groups having 7 to 18 carbons (preferably having 7 to 12 carbons)(for example, phenoxycarbonyl, 4-methylphenoxycarbonyl, 4-methoxyphenylcarbonyl and the like); substituted or un-substituted alkoxy groups having 1 to 18 carbons (preferably having 1 to 8 carbons) (for example, methoxy, ethoxy, n-butoxy, methoxyethoxy and the like); substituted or un-substituted aryloxy groups having 6 to 18 carbons (preferably having 6 to 10 carbons)(for example, phenoxy, 4-methoxyphenoxy and the like); alkylthio groups having 1 to 18 carbons (preferably having 1 to 8 carbons) (for example, methylthio, ethylthio and the like); arylthio groups having 6 to 10 carbons (for example, phenylthio and the like);

substituted or un-substituted acyloxy groups having 2 to 18 carbons (preferably having 2 to 8 carbons) (for example, acetoxy, ethylcarbonyloxy, cyclohexylcarbonyloxy, benzoyloxy, chloroacetyloxy and the like); substituted or un-substituted sulfonyloxy groups having 1 to 18 carbons (preferably having 1 to 8 carbons)(for example, methanesulfonyloxy and the like); substituted or un-substituted carbamoyloxy groups having 2 to 18 carbons (preferably having 2 to 8 carbons)(for example, methylcarbamoyloxy, diethylcarbamoyloxy and the like); an un-substituted amino group or substituted amino groups having 1 to 18 carbons (preferably having 1 to 8 carbons) (for example, methylamino, dimethylamino, diethylamino, anilino, methoxyphenylamino, chlorophenylamino, morpholino, piperidino, pyrrolidino, pyridylamino, methoxycarbonylamino, n-butoxycarbonylamino, phenoxycarbonylamino, methylcarbamoylamino, phenylcarbamoylamino, ethylthiocarbamoylamino, methylsulfamoylamino, phenylsulfamoylamino, acetylamino, ethylcarbonylamino, ethylthiocarbonylamino, cyclohexylcarbonylamino, benzoylamino, chloroacetylamino, methanesulfonylamino, benzenesulfonylamino and the like);

substituted or un-substituted carbamoyl groups having 1 to 18 carbons (preferably having 1 to 8 carbons) (for example, un-substituted carbamoyl, methylcarbamoyl, ethylcarbamoyl, n-butylcarbamoyl, t-butylcarbamoyl, dimethylcarbamoyl, morpholinocarbamoyl, pyrrolidinocarbamoyl and the like); an un-substituted sulfamoyl group, substituted sulfamoyl groups having 1 to 18 carbons (preferably having 1 to 8 carbons) (for example, methylsulfamoyl, phenylsulfamoyl and the like); halogen atoms (for example, fluorine, chlorine, bromine and the like); a hydroxyl group; a nitro group; a cyano group; a carboxyl group; hetero ring groups (for example, oxazole, benzoxazole, thiazole, benzothiazole, imidazole, benzoimidazole, indolenine, pyridine, sulfolane, furan, thiophene, pyrazole, pyrrole, chromane, coumarin and the like).

Examples of the dichroic squarylium dye represented by the formula (VI) include, but are not limited to, the following exemplary compounds.

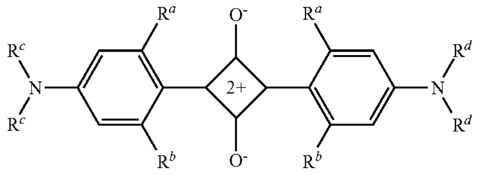

| No. | $R^a$ | $R^b$ | $R^c$ | $R^d$ |
|---|---|---|---|---|
| VI-1 | H | H | $CH_3$ | $CH_3$ |
| VI-2 | H | H | $C_2H_5$ | $C_2H_5$ |
| VI-3 | H | H | $CH_3$ | $C_2H_5$ |
| VI-4 | OH | H | $CH_3$ | $CH_3$ |
| VI-5 | OH | H | $C_2H_5$ | $C_2H_5$ |
| VI-6 | OH | H | $CH_3$ | C2H5 |
| VI-7 | OH | OH | $CH_3$ | $CH_3$ |
| VI-8 | OH | OH | $C_2H_5$ | $C_2H_5$ |
| VI-9 | OH | OH | $CH_3$ | $C_2H_5$ |
| VI-10 | OH | CH3 | $CH_3$ | $CH_3$ |

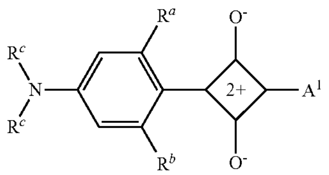

| No. | $R^a$ | $R^b$ | $R^c$ | A |
|---|---|---|---|---|
| VI-11 | H | H | $CH_3$ | 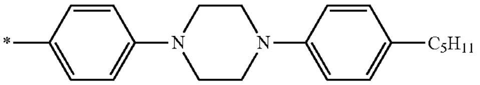 |
| VI-12 | H | H | $C_2H_5$ | 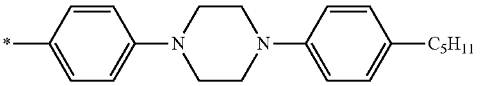 |
| VI-13 | OH | H | $C_2H_5$ | 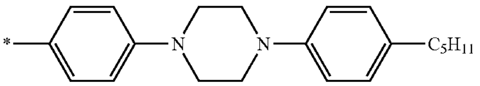 |
| VI-14 | OH | H | $C_2H_5$ | 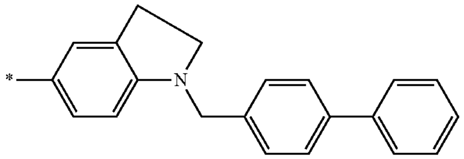 [SMILES: *c1ccc2c(c1)CCN2Cc1ccc(-c2ccccc2)cc1] |
| VI-15 | OH | H | $C_2H_5$ | 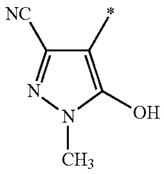 |
| VI-16 | OH | H | $C_2H_5$ | 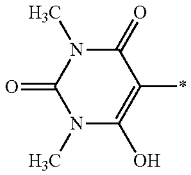 [SMILES: *c1c(O)n(C)c(=O)n(C)c1=O] |
| VI-17 | OH | H | $C_2H_5$ | 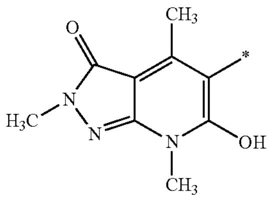 [SMILES: *c1c(C)c2c(=O)n(C)nc-2n(C)c1O] |
| VI-18 | OH | H | $C_2H_5$ | 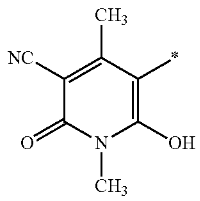 [SMILES: *c1c(C)c(C#N)c(=O)n(C)c1O] |
| VI-19 | OH | H | $C_2H_5$ | 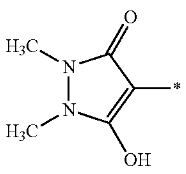 [SMILES: *c1c(O)n(C)n(C)c1=O] |
| VI-20 | OH | H | $C_2H_5$ | 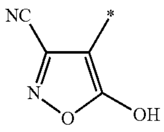 [SMILES: *c1c(C#N)noc1O] |

-continued

| No. | $R^a$ | $R^b$ | $R^c$ | A |
|---|---|---|---|---|
| VI-21 | OH | H | $C_2H_5$ | 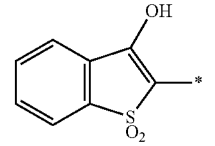 |
| VI-22 | OH | H | $C_2H_5$ | 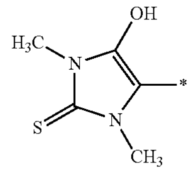 |
| VI-23 | OH | H | $C_2H_5$ | 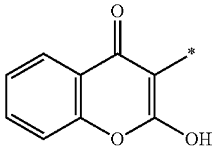 [SMILES: *c1c(O)oc2ccccc2c1=O] |
| VI-24 | OH | H | $C_2H_5$ | 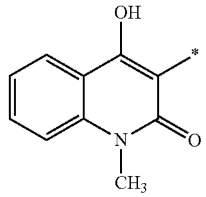 [SMILES: *c1c(O)c2ccccc2n(C)c1=O] |
| VI-25 | H | H | $C_2H_5$ | 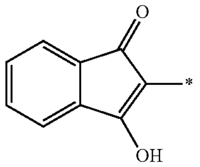 [SMILES: *C1=C(O)c2ccccc2C1=O] |
| VI-26 | H | H | $C_2H_5$ | 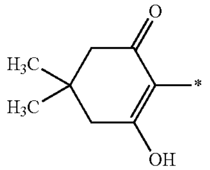 [SMILES: *C1=C(O)CC(C)(C)CC1=O] |

The dichroic squarylium dye represented by the above-described formula (VI) in the present invention can be easily synthesized according to methods described in the Journal of Chemical Society, Perkin Trans. 1 (2000), 599-603, Synthesis (2002), No.3, 413-417 and the like.

In the dichroic dye to be used in the present invention, the angle made by the transition moment and the molecular long axis is preferably 0° or more and 20° or less, more preferably 0° or more and 15° or less, further preferably 0° or more and 10° or less, particularly preferably 0° or more and 5° or less. Here, the molecular long axis means an axis linking two atoms at which the interatomic distance is maximum in a compound. The direction of the transition moment can be determined by molecular orbital calculation, and the angle made by the molecular long axis can also be calculated therefrom.

It is preferable that the dichroic dye to be used in the present invention has a rigid linear structure. Specifically, the molecular length is preferably 17 Å or more, more preferably 20 Å or more and further preferably 25 Å or more. The aspect ratio is preferably 1.7 or more, more preferably 2 or more and further preferably 2.5 or more. By this constitution, good uniaxial alignment is attained, and a light absorption anisotropic film and a polarizer showing high polarization performance can be obtained.

Here, the molecular length is a value obtained by adding van der Waals' radii of two atoms at both ends to the maximum interatomic distance in a compound. The aspect ratio means molecular length/molecular width, and the molecular width is a value obtained by adding van der Waals' radii of two atoms at both ends to the maximum interatomic distance when respective atoms are projected to a plane vertical to the molecular long axis.

The above-described dichroic dye composition contains at least one azo dye represented by the above-described formula (I), (II), (III) or (IV) as the main component. Specifically, the content of the azo dye represented by the above-described formula (I), (II), (III) or (IV) is preferably 80% by mass or more and particularly preferably 90% by mass or more with respect to the total content of all dyes to be contained. The upper limit thereof is 100% by mass, that is, it may be of course permissible that all dyes to be contained are azo dyes represented by the formula (I), (II), (III) or (IV).

It is also preferable that the above-described dichroic dye composition contains a squarylium dye represented by the above-described formula (VI). Specifically, the content of the squarylium dye represented by the above-described formula (VI) is preferably 5% by mass or more and particularly preferably 10% by mass or more with respect to the total content of all dyes to be contained.

The content of at least one dichroic dye represented by the formula (I), (II), (III), (IV) or (VI) is preferably 20% by mass or more and particularly preferably 30% by mass or more with respect to all solid components excluding a solvent contained in the above-described dichroic dye composition. Though the upper limit is not particularly restricted, the content of at least one dichroic dye represented by the formula (I), (II), (III), (IV) or (VI) is preferably 95% by mass or less and more preferably 90% by mass or less with respect to all solid components excluding a solvent contained in the above-described dichroic dye composition, in an embodiment containing other additives such as the following surfactant and the like, for obtaining the effects of them.

It is preferable that the dichroic dye composition in the present invention shows thermotropic liquid crystallinity, that is, the composition causes phase transition to liquid crystal by heat to show liquid crystallinity. A nematic liquid crystal phase is shown preferably at 10 to 300° C. and more preferably at 100 to 250° C. Particularly, it is preferable that a smectic liquid crystal phase A is shown in a lower temperature region than a nematic liquid crystal phase, and the preferable temperature range thereof is 10 to 200° C., more preferably 50 to 200° C.

The above-described dichroic dye composition may contain at least one additive, other than the above-described dichroic dye. The above-described dichroic dye composition may contain a non-liquid crystalline poly-functional monomer having a radical polymerizable group, a polymerization initiator, an agent for preventing "mura" by wind, a repelling inhibitor, an additive for controlling the tilt angle of an alignment film (the tilt angle of a liquid crystalline dye at the boundary of light absorption anisotropic film/alignment film), an additive for controlling the tilt angle of the air boundary (the tilt angle of a dye at the boundary of light absorption anisotropic film/air), sugars, a chemical having at least any of antifungal, antibacterial and bactericidal functions, and the like.

1-(2) Photo Alignment Film

The polarizing film of the present invention has a photo alignment film. The photo alignment film is used to regulate the alignment of the above-described dichroic dye composition. In the present invention, use of the photo alignment film is preferable since a step of removing powder and dust, etc., is unnecessary and more uniform alignment control is possible, as compared with use of a rubbed film as an alignment film.

The photo alignment film means an alignment film realizing alignment regulation force by light irradiation. The optical alignment material used in an alignment film formed by light irradiation is preferably an optically-aligning polymer having an optically reactive group. Here, "optically reactive group" means, for example, a functional group which is capable of aligning a molecule of a liquid crystalline compound disposed on the surface of an alignment film toward a predetermined direction, owing to a change in the chemical structure of the functional group or in the alignment of a molecule having the functional group caused by light irradiation from a single direction. Specifically mentioned are azobenzene derivatives, cinnamic acid derivatives, chalcone derivatives, stilbenes, styrylpyridine derivatives, α-hydrazono-β-keto esters, coumarin derivatives, benzylidenephthalimidines, retinoic acid derivatives, spiropyrans, spirooxazines, anthracene derivatives, benzophenone derivatives, polyimides and the like. Among them, preferable are coumarin derivatives, styrylpyridine derivatives, azobenzene derivatives, cinnamic acid derivatives and chalcone derivatives and further preferable are azobenzene derivatives, cinnamic acid derivatives and chalcone derivatives.

The optical alignment material may be a low molecular weight compound or a polymer. For the type of the above-described polymer may be any of polymers described in the "Revised, Chemistry of Polymer Synthesis" (Takayuki Ohtsu ed., published by Kagaku-Dojin Publishing Company, 1968), pp. 1 to 4, and examples thereof include polyolefins, polyesters, polyamides, polyimides, polyurethanes, polycarbonates, polysulfones, polycarbonates, polyethers, polyacetals, polyketones, polyphenylene oxides, polyphenylene sulfides, polyarylates, ethylene tetrafluorides (PTFE), polyvinylidene fluorides, cellulose derivatives and the like. Polyolefins are preferable.

The above-described optical alignment material is described in various literature references, and the like. In the alignment film of the present invention, for example, azo compounds described in JP-A2006-285197, JP-A2007-76839, JP-A2007-138138, JP-A2007-94071, JP-A2007-121721, JP-A2007-140465, JP-A2007-156439, JP-A2007-133184, JP-A2009-109831, JP No. 3883848 and JP No. 4151746, aromatic ester compounds described in JP-A2002-229039, maleimide and/or alkenyl-substituted nadimide compounds having an optically-aligning unit described in JP-A2002-265541 and JP-A2002-317013, photo-crosslinkable silane derivatives described in JP No. 4205195 and JP No. 4205198, photo-crosslinkable polyimides, polyamides or esters described in Japanese Translation of International Application No. 2003-520878, Japanese Translation of International Application No. 2004-529220 and JP No. 4162850 are listed as preferable examples. More preferable are azo compounds, photo-crosslinkable polyimides, polyamides or esters.

Particularly preferable as the above-described optical alignment material are low molecular weight azo compounds represented by the following formula (1) or polymers containing a repeating unit derived from at least one of the monomers represented by the following formula (2).

Formula (1)

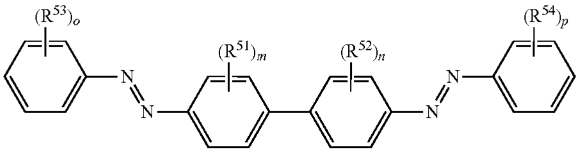

In the formula, $R^{51}$ to $R^{54}$ each represent independently a hydrogen atom or a substituent, provided that, at least one of the groups represented by $R^{51}$ to $R^{54}$ represents a carboxyl group or a sulfo group; m represents an integer of 1 to 4, n represents an integer of 1 to 4, o represents an integer of 1 to 5 and p represents an integer of 1 to 5, and when m, n, o and p represent an integer of 2 or more, a plurality of $R^{51}$s to $R^{54}$s may each be the same or different.

The substituent each represented by $R^{51}$ to $R^{54}$ in the above-described formula (1) includes the following groups.

Carboxyl groups (optionally forming a salt with an alkali metal, preferably a carboxyl group forming no salt or forming a sodium salt, more preferably a carboxyl group forming a sodium salt), sulfo groups (optionally forming a salt with an alkali metal, preferably a sulfo group forming no salt or forming a sodium salt, more preferably a sulfo group forming a sodium salt), alkyl groups (alkyl groups preferably having 1 to 20 carbons, more preferably having 1 to 12 carbons and particularly preferably having 1 to 8 carbons, and examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group and the like), alkenyl groups (alkenyl groups preferably having 2 to 20 carbons, more preferably having 2 to 12 carbons and particularly preferably having 2 to 8 carbons, and examples thereof include a vinyl group, an aryl group, a 2-butenyl group, a 3-pentenyl group and the like), alkynyl groups (alkynyl groups preferably having 2 to 20 carbons, more preferably having 2 to 12 carbons and particularly preferably having 2 to 8 carbons, and examples thereof include a propargyl group, a 3-pentynyl group and the like), aryl groups (aryl groups preferably having 6 to 30 carbons, more preferably having 6 to 20 carbons and particularly preferably having 6 to 12 carbons, and examples thereof include a phenyl group, a 2,6-diethylphenyl group, a 3,5-ditrifluoromethylphenyl group, a naphthyl group, a biphenyl group and the like), substituted or un-substituted amino groups (amino groups preferably having 0 to 20 carbons, more preferably having 0 to 10 carbons and particularly preferably having 0 to 6 carbons, and examples thereof include an un-substituted amino group, a methylamino group, a dimethylamino group, a diethylamino group, an anilino group and the like), alkoxy groups (preferably having 1 to 20 carbons, more preferably having 1 to 10 carbons and particularly preferably having 1 to 6 carbons, and examples thereof include a methoxy group, an ethoxy group, a butoxy group and the like), alkoxycarbonyl groups (preferably having 2 to 20 carbons, more preferably having 2 to 10 carbons and particularly preferably 2 to 6, and examples thereof include a methoxycarbonyl group, an ethoxycarbonyl group and the like), acyloxy groups (preferably having 2 to 20 carbons, more preferably having 2 to 10 carbons and particularly preferably 2 to 6, and examples thereof include an acetoxy group, a benzoyloxy group and the like), acylamino groups (preferably having 2 to 20 carbons, more preferably having 2 to 10 carbons and particularly preferably having 2 to 6 carbons, and examples thereof include an acetylamino group, a benzoylamino group and the like), alkoxycarbonylamino groups (preferably having 2 to 20 carbons, more preferably having 2 to 10 carbons and particularly preferably having 2 to 6 carbons, and examples thereof include a methoxycarbonylamino group and the like), aryloxycarbonylamino groups (preferably having 7 to 20 carbons, more preferably having 7 to 16 carbons and particularly preferably having 7 to 12 carbons, and examples thereof include a phenyloxycarbonylamino group and the like), sulfonylamino groups (preferably having 1 to 20 carbons, more preferably having 1 to 10 carbons and particularly preferably having 1 to 6 carbons, and examples thereof include a methanesulfonylamino group, a benzenesulfonylamino group and the like) , sulfamoyl groups (preferably having 0 to 20 carbons, more preferably having 0 to 10 carbons and particularly preferably having 0 to 6 carbons, and examples thereof inlude a sulfamoyl group, a methylsulfamoyl group, a dimethylsulfamoyl group, a phenylsulfamoyl group and the like), carbamoyl groups (preferably having 1 to 20 carbons, more preferably having 1 to 10 carbons and particularly preferably having 1 to 6 carbons, and examples thereof include an un-substituted carbamoyl group, a methylcarbamoyl group, a diethylcarbamoyl group, a phenylcarbamoyl group and the like), alkylthio groups (preferably having 1 to 20 carbons, more preferably having 1 to 10 carbons and particularly preferably having 1 to 6 carbons, and examples thereof include a methylthio group, an ethylthio group and the like), arylthio groups (preferably having 6 to 20 carbons, more preferably having 6 to 16 carbons and particularly preferably having 6 to 12 carbons, and examples thereof include a phenylthio group and the like), sulfonyl groups (preferably having 1 to 20 carbons, more preferably having 1 to 10 carbons and particularly preferably having 1 to 6 carbons, and examples thereof include a mesyl group, tosyl group and the like), sulfinyl groups (preferably having 1 to 20 carbons, more preferably having 1 to 10 carbons and particularly preferably having 1 to 6 carbons, and examples thereof include a methanesulfinyl group, a benzenesulfinyl group and the like), ureide groups (preferably having 1 to 20 carbons, more preferably having 1 to 10 carbons and particularly preferably having 1 to 6 carbons, and examples thereof include an un-substituted ureide group, a methylureide group, a phenylureide group and the like), phosphoric amide groups (preferably having 1 to 20 carbons, more preferably having 1 to 10 carbons and particularly preferably having 1 to 6 carbons, and examples thereof include a diethylphosphoric amide group, a phenylphosphoric amide group and the like), a hydroxy group, a mercapto group, halogen atoms (for example, a fluorine atom, a chlorine atom, a bromine atom, an iodine atom), a cyano group, a nitro group, a hydroxamic acid group, a sulfino group, a hydrazino group, an imino group, hetero ring groups (hetero ring groups preferably having 1 to 30 carbons and more preferably 1 to 12 carbons, for example, hetero ring groups having a hetero atom such as a nitrogen atom, an oxygen atom, a sulfur atom and the like, and examples thereof include an imidazolyl group, a pyridyl group, a quinolyl group, a furyl group, a piperidyl group, a morpholino group, a benzoxazolyl group, a benzimidazolyl group, a benzthiazolyl group and the like), silyl groups (silyl groups preferably having 3 to 40 carbons, more preferably having 3 to 30 carbons and particularly preferably having 3 to 24 carbons, and examples thereof include a trimethylsilyl group, a triphenylsilyl group and the like).

These substituents may be further substituted with these substituents. When two or more substituents are present, these may be the same or different. If possible, these may be mutually linked to form a ring.

The group represented by $R^{51}$ to $R^{54}$ may be a polymerizable group or a substituent containing a polymerizable group. It is preferable that a polymerizable group or a substituent containing a polymerizable group is present at the end of a molecule, that is, it is preferable that $R^{53}$ and/or $R^{54}$ is a polymerizable group or a substituent containing a polymerizable group, and particularly, it is preferable that a polymerizable group or a substituent containing a polymerizable group is $R^{53}$ and/or $R^{54}$ substituted at a para-position with respect to an azo group. Though the polymerizable group is not particularly restricted, the polymerization reaction is preferably addition polymerization (including ring-opening polymerization) or condensation polymerization. In other words, the polymerizable group is preferably a polymerizable group which is capable of causing an addition polymerization reaction or a condensation polymerization reaction. Examples of the polymerizable group are shown below.

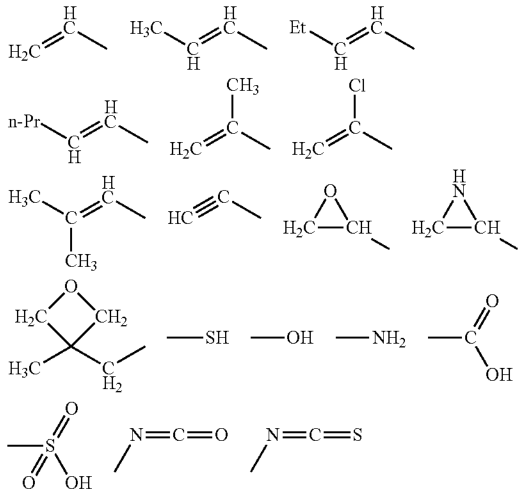

The polymerizable group is preferably a polymerizable group performing radical polymerization or cationic polymerization. As the radical polymerizable group, generally known radical polymerizable groups can be used, and (meth)acrylate groups are suitably mentioned. As the cationic polymerizable group, generally known cationic polymerizable groups can be used, and specifically, alicyclic ether groups, cyclic acetal groups, cyclic lactone groups, cyclic thioether groups, spiroortho ester groups, vinyloxy groups and the like are mentioned. Among them, alicyclic ether groups and vinyloxy groups are suitable, and an epoxy group, an oxetanyl group and a vinyloxy group are particularly preferable.

The group represented by $R^{51}$ to $R^{54}$ in the above-described formula (1) includes preferably a hydrogen atom, a carboxyl group, a sulfo group, a halogen atom, an alkyl group, an alkoxy group, a cyano group, a nitro group, an alkoxycarbonyl group and a carbamoyl group, more preferably a hydrogen atom, a carboxyl group, a sulfo group, a halogen atom, a halogenated methyl group, a halogenated methoxy group, a cyano group, a nitro group and a methoxycarbonyl group, particularly preferably a hydrogen atom, a carboxyl group, a sulfo group, a halogen atom, a cyano group and a nitro group.

At least one of the groups represented by $R^{51}$ to $R^{54}$ is a carboxyl group or a sulfo group. Though the substitution position of a carboxyl group or a sulfo group is not particularly restricted, it is preferable that at least one $R^{51}$ and/or at least one $R^{52}$ is a sulfo group and it is more preferable that at least one $R^{51}$ andat least one $R^{52}$ represent a sulfo group, from the standpoint of the action of optical activity.

From the same standpoint, it is preferable that at least one $R^{53}$ and/or at least one $R^{54}$ is a carboxyl group and it is more preferable that at least one $R^{53}$ and at least one $R^{54}$ represent a carboxyl group. It is further preferable that the carboxyl group is $R^{53}$ and $R^{54}$ substituted at meta-position with respect to an azo group.

In the above-described formula (1), m represents an integer of 1 to 4, n represents an integer of 1 to 4, o represents an integer of 1 to 5 and p represents an integer of 1 to 5. Preferably, m is an integer of 1 to 2, n is an integer of 1 to 2, o is an integer of 1 to 2 and p is an integer of 1 to 2.

Examples of the compound represented by the above-described formula (1) include, but are not limited to, the following compounds.

Specific examples of the compound represented by the above-described formula (II) include, but are not limited to, the following specific examples.

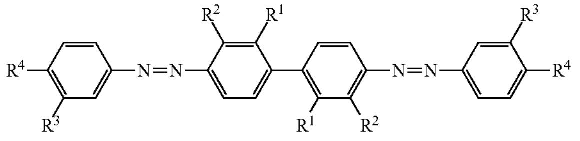

| No. | $R^1$ | $R^2$ | $R^3$ | $R^4$ |
|---|---|---|---|---|
| E-1 | $—SO_3Na$ | —H | —COOH | —OH |
| E-2 | —H | $—SO_3Na$ | —COOH | —OH |
| E-3 | $—SO_3Na$ | —H | —COONa | —OH |
| E-4 | —H | $—SO_3Na$ | —COONa | —OH |
| E-5 | $—CH_3$ | —H | —COONa | —OH |
| E-6 | —H | $—CH_3$ | —COONa | —OH |
| E-7 | —H | $—OCH_3$ | —COONa | —OH |
| E-8 | —H | $—OCF_3$ | —COONa | —OH |
| E-9 | —H | —Cl | —COONa | —OH |
| E-10 | —H | —CN | —COONa | —OH |
| E-11 | —H | $—NO_2$ | —COONa | —OH |
| E-12 | $—COOCH_3$ | —H | —COONa | —OH |
| E-13 | $—CONH_2$ | —H | —COONa | —OH |
| E-14 | $—SO_2NH_2$ | —H | —COONa | —OH |
| E-15 | $—SO_3Na$ | —H | —COONa | —OH |
| E-16 | $—SO_3Na$ | —H | $—CH_2OH$ | —OH |
| E-17 | —H | $—SO_3Na$ | $—CH_2OH$ | —OH |
| E-18 | $—SO_3Na$ | —H | —COOH | 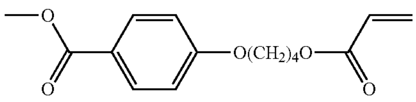 |

-continued

| No. | $R^1$ | $R^2$ | $R^3$ | $R^4$ |
|---|---|---|---|---|
| E-19 | —H | —$SO_3Na$ | —COOH | 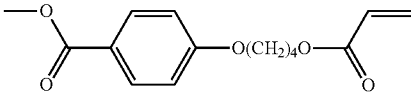 |
| E-20 | —$CH_3$ | —H | —COONa | 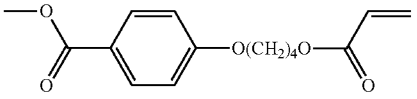 |
| E-21 | —H | —$CH_3$ | —COONa | 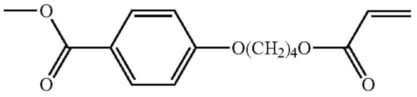 |
| E-22 | —$SO_3Na$ | —H | —$CF_3$ | 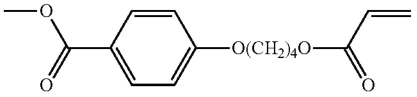 |
| E-23 | —H | —$SO_3Na$ | —$CF_3$ | 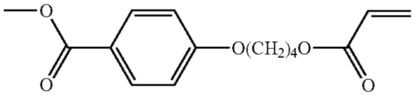 |
| E-24 | —$SO_3Na$ —H | —H | —COOH | 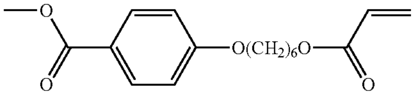 |
| E-25 | —$CH_3$ | —H | —COONa | 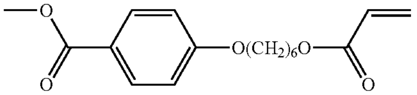 |
| E-26 | —$SO_3Na$ | —H | —$CF_3$ | 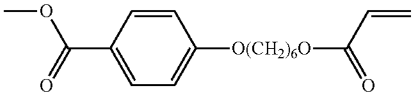 |

(E-27)

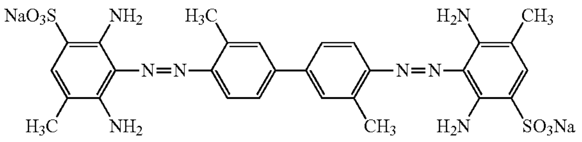

Other examples of the above-described optical alignment material include polymers containing a repeating unit derived from at least one of the monomers represented by the following formula (2), as described above.

Formula (2)

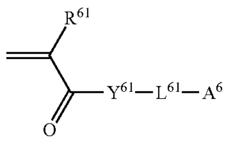

In the formula, $R^{61}$ represents a hydrogen atom or a methyl group, $L^{61}$ represents a single bond or a divalent linking group, and $A^6$ represents an optically reactive group.

$Y^{61}$ represents —$NR^a$— ($R^a$ represents an alkyl group having the number of carbon atoms of 1 to 5, or a hydrogen atom) or —O—.

In the above-described formula (2), $L^{61}$ represents a single bond or divalent linking group. In the case of a divalent linking group, divalent linking groups selected from the group consisting of an alkylene group, an alkenylene group, a divalent aromatic group, a divalent hetero ring residue, —CO—, —$NR^a$— ($R^a$ represents an alkyl group having the number of carbon atoms of 1 to 5, or a hydrogen atom), —O—, —S—, —SO—, —$SO_2$— and a combination thereof are preferable. The number of carbon atoms of the alkylene group is preferably 1 to 12. The number of carbon atoms of the alkenylene group is preferably 2 to 12. The number of carbon atoms of the arylene group is preferably 6 to 10. The alkylene group, the alkenylene group and the arylene group may be, if possible, substituted with an alkyl group, a halogen atom, cyano group, an alkoxy group, an acyloxy group and the like. $L^{61}$ in the formula (2) preferably contains a single bond, —O—, —CO—, —$NR^a$—($R^a$ represents an alkyl group having the number of carbon atoms of 1 to 5, or a hydrogen atom) or an alkylene group and particularly preferably contains a single bond, —O— or alkylene group.

Specific examples of the structure of $L^{61}$ include, but the present invention is not limited to, the following structures. A combination of the following specific examples is also preferable. In the specific examples, $L^{61}$ represents preferably L-1 to L-12 and more preferably L-1, L-2, L-4, L-7 to L-12.

L-1

— (Single bond)

L-2

$-(CH_2)_2O-$

L-3

$-(CH_2)_4O-$

L-4

$-(CH_2)_6O-$

L-5

$-(CH_2)_8O-$

L-6

$-(CH_2)_{10}O-$

L-7

$-(CH_2)_2OCO-$

L-8

$-(CH_2)_6OCO-$

L-9

$-(CH_2CH_2O)_2-$

L-10

$-(CH_2)_2CONH-$

L-11

$-(CH_2)_6CONH-$

L-12

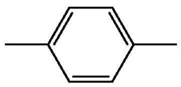

L-13

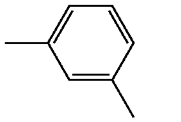

L-14

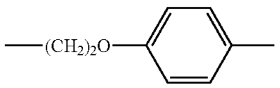

L-15

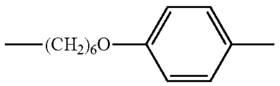

L-16

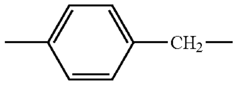

$A^6$ in the formula (2) is an optically reactive group, preferably a residue of a coumarin derivative, a styrylpyridine derivative, an azobenzene derivative, a cinnamic acid derivative or a chalcone derivative, further preferably a residue of an azobenzene derivative, a cinnamic acid derivative or a chalcone derivative. Particularly preferably a residue of an azobenzene derivative or a cinnamic acid derivative.

The above-described optically reactive group is preferably a residue of a cinnamic acid derivative represented by the following formula C-1.

Formula (C-1)

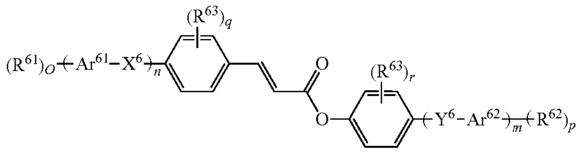

In the above-described formula (C-1), $Ar^{61}$ and $Ar^{62}$ each represent an aromatic ring having 6 to 10 carbons or hetero ring having 5 to 10 carbons optionally having a substituent. $Ar^{61}$ and $Ar^{62}$ each represent preferably a substituted or un-substituted benzene ring, a naphthalene ring, a furan ring or a thiophene ring and particularly preferably a substituted or un-substituted benzene ring. $X^6$ and $Y^6$ each represent a single bond or a divalent linking group. $X^6$ and $Y^6$ each represent preferably a single bond, or a divalent linking group selected from the group consisting of C═C, C≡C, COO, OCO, CONH, NHCO, OCOO, OCONH and NHCOO and more preferably represent a single bond. $R^{61}$ and $R^{62}$ each represent a substituent of $Ar^{61}$ and $Ar^{62}$. $R^{61}$ and $R^{62}$ each represent preferably an alkyl group, an alkoxyl group, an alkoxycarbonyl group, an alkoxycarbonyloxy group, an alkanoyl group, an alkanoyloxy group, a cyano group, a nitro group, a halogen group or the like and particularly preferably an alkoxyl group, an alkoxycarbonyl group, an alkoxycarbonyloxy group, an alkanoyloxy group, a cyano group or the like. It is also preferable that $R^{61}$ or $R^{62}$ has a polymerizable group.

Preferable examples of the polymerizable group include an acryloyloxy group, a metaacryloyloxy group, a vinyl group, a vinyloxy group, a glycidyl group, an oxetane group and the like. One of $R^{61}$ or $R^{62}$ is linked to $L^{61}$ to form a side chain type polymer. $R^{63}$ and $R^{64}$ each represent a substituent of a benzene ring, and include an alkyl group having 1 to 6 carbons, an alkoxyl group having 1 to 6 carbons, a halogen group and the like. n and m each represent independently an integer of 0 to 3, preferably 0 or 1, and it is particularly preferable that at least one of n and m is 1. o and p each represent independently an integer of 0 to 4. It is preferable that o and p each represent 0 to 2 and it is particularly preferable that o and p each represent 0 to 2 and o+p is 1 to 3. q and r each represent an integer of 0 to 4 and preferably 0 or 1.

As the above-described optically reactive group, a residue of an azobenzene derivative represented by the following formula C-2 is preferable.

Formula (C-2)

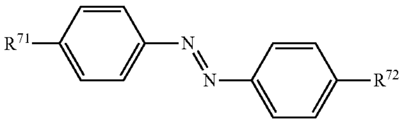

In the above-described formula (C-2), $R^{71}$ and $R^{72}$ have the same meaning as for the substituent represented by $R^{61}$ and $R^{62}$ in the above-described formula (C-1), and also the preferable range thereof is the same as in the formula (C-1).

Specific examples of the compound represented by the above-described formula (2) include, but are not limited, to the following specific examples.

C-1
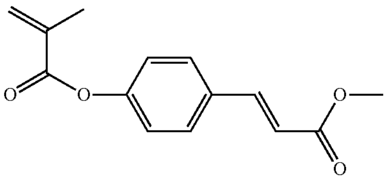
C-2
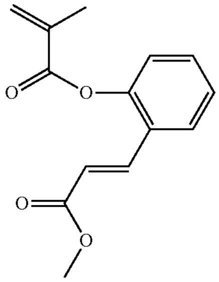
C-3
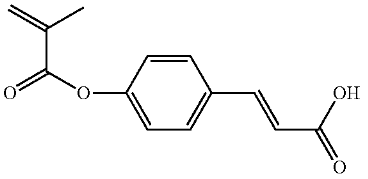
C-4
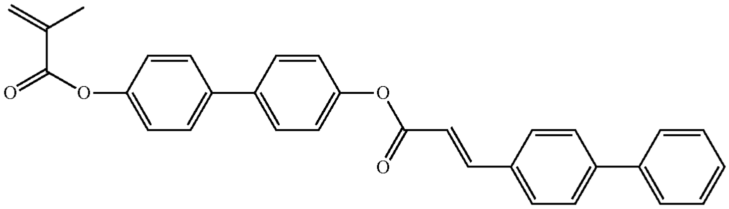
C-5
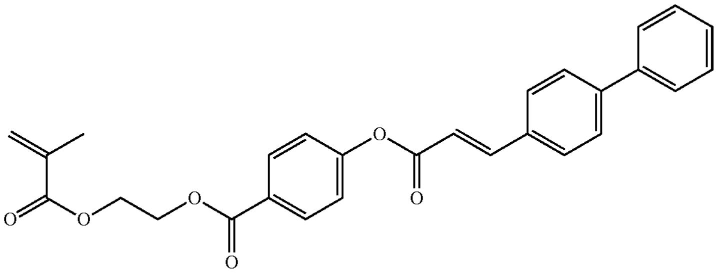
C-6
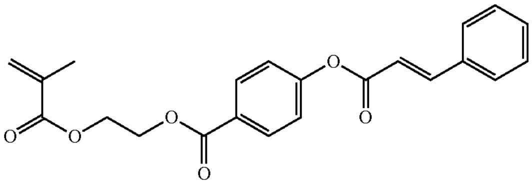
C-7
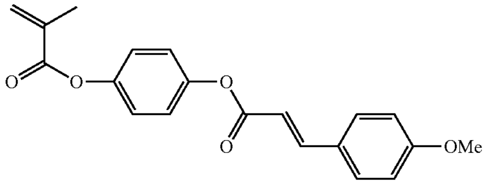
C-8
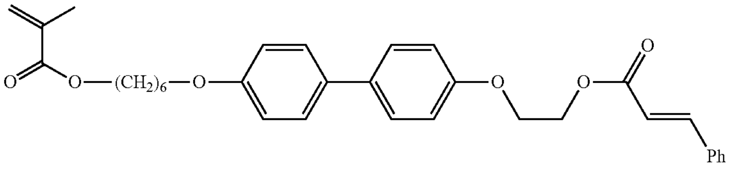
C-9
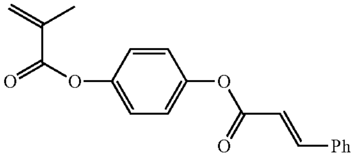
C-10
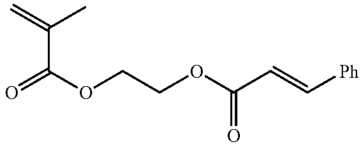

-continued
C-11
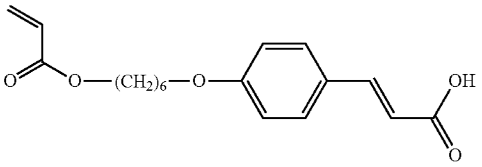
C-12
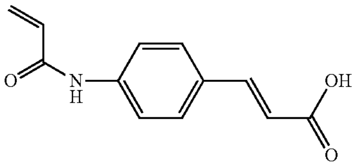
C-13
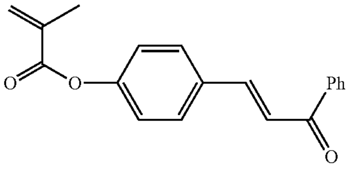
C-14
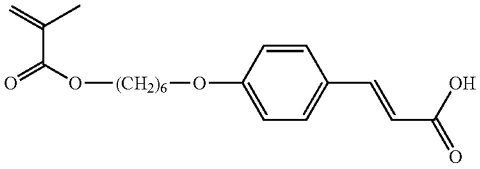
C-15
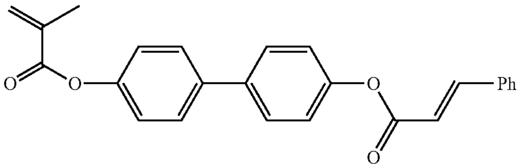
C-16
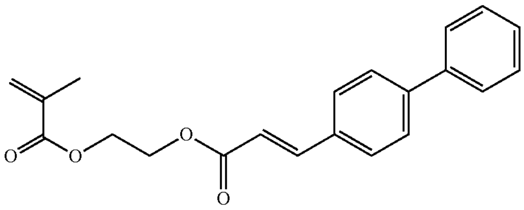
C-17
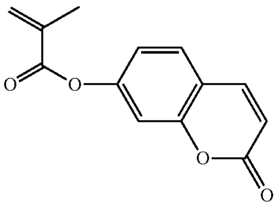
C-18
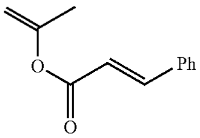
C-19
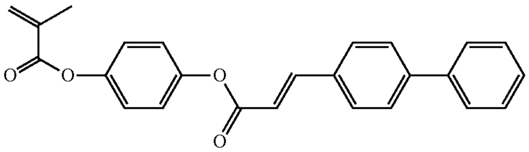
D-1
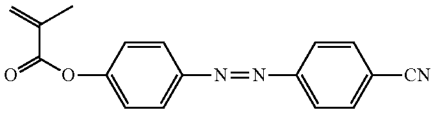
D-2
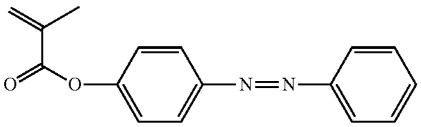
D-3
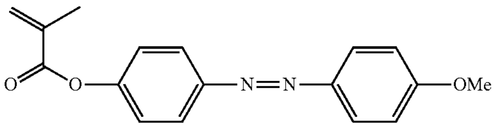
D-4
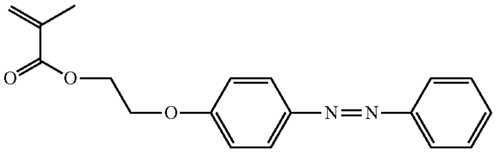
D-5
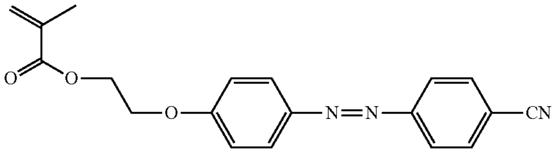
D-6
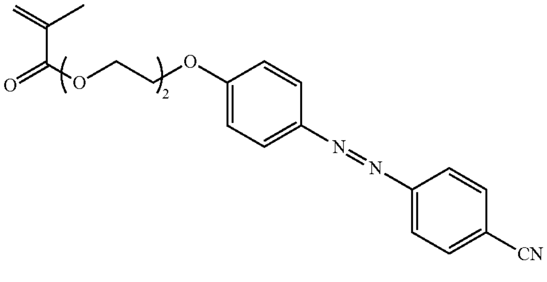

The above-described optical alignment material may be a polymer containing only one repeating unit, or may be a polymer containing two or more repeating units represented by the above-described formula (2). Further, one or two or more repeating units other than the above-described repeating units may also be contained. The repeating unit other than the above-described repeating units is not particularly restricted, and repeating units derived from usual radical polymerizable monomers are mentioned as preferable examples.

Specific examples of monomers which derive the other repeating units are listed below. The polymer used as the optical alignment material in the present invention may contain a repeating unit derived from one or two or more monomers selected from the monomer groups described below.

(Monomer Groups)
(1) Alkenes
  ethylene, propylene, 1-butene, isobutene, 1-hexene, 1-dodecene, 1-octadecene, 1-eicosene, hexafluoropropene, vinylidene fluoride, chlorotrifluoroethylene, 3,3,3-trifluoropropylene, tetrafluoroethylene, vinyl chloride, vinylidene chloride and the like;
(2) Dienes
  1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-a-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene and 2-cyano-1,3-butadiene, 1,4-divinylcyclohexane and the like;
(3) Derivatives of α,β-Unsaturated Carboxylic Acids
(3a) Alkyl Acrylates
  methyl acrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxypolyethylene glycol acrylate (the number of added moles of polyoxyethylene: n=2 to 100), 3-methoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate and the like;
(3b) Alkyl Methacrylates
  methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, aryl methacrylate, furfuryl methacrylate, tetrahydrofurfuryl methacrylate, cresyl methacrylate, naphthyl methacrylate, 2-methoxyethyl methacrylate, 3-methoxybutyl methacrylate, ω-methoxypolyethylene glycol methacrylate (the number of added moles of polyoxyethylene: n=2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimethoxysilylpropyl methacrylate, aryl methacrylate, 2-isocyanatoethyl methacrylate and the like;

(3c) Diesters of Unsaturated Polyvalent Carboxylic Acids
  dimethyl maleate, dibutyl maleate, dimethyl itaconate, dibutyl taconate, dibutyl crotonate, dihexyl crotonate, diethyl fumarate, dimethyl fumarate and the like;
(3d) Amides of α,β-Unsaturated Carboxylic Acids
  N,N-dimethylacrylamide, N,N-diethylacrylamide, N-n-propylacrylamide, N-tert-butylacrylamide, N-tert-octylmethacrylamide, N-cyclohexylacrylamide, N-phenylacrylamide, N-(2-acetoacetoxyethyl)acrylamide, N-benzylacrylamide, N-acryloylmorpholine, diacetoneacrylamide, N-methylmaleimide and the like;
(4) Unsaturated Nitriles
  acrylonitrile, methacrylonitrile and the like;
(5) Styrene and Derivatives Thereof
  styrene, vinyltoluene, ethylstyrene, p-tert-butylstyrene, methyl p-vinylbenzoate, α-methylstyrene, p-chloromethylstyrene, vinylnaphthalene, p-methoxystyrene, p-hydroxymethylstyrene, p-acetoxystyrene and the like;
(6) Vinyl Esters
  vinyl acetate, vinyl propionate, vinyl butyrate, vinyl isobutyrate, vinyl benzoate, vinyl salicylate, vinyl chloroacetate, vinyl methoxyacetate, vinyl phenylacetate and the like;
(7) Vinyl Ethers
  methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethyl hexyl vinyl ether, cyclohexyl vinyl ether, fluorobutyl vinyl ether, fluorobutoxy ethyl vinyl ether and the like;
(8) Other Polymerizable Monomers
  N-vinylpyrrolidone, methyl vinyl ketone, phenyl vinyl ketone, methoxy ethyl vinyl ketone, 2-vinyloxazoline, 2-isopropenyloxazoline and the like.

The content of the monomer represented by the above-described formula (2) in the optical alignment material in the present invention is preferably 50% by mass or more, more preferably 70% by mass or more and further preferably 80% by mass or more of the total content of the monomer constituting the optical alignment material.

The mass-average molecular weight of the optical alignment material having an optically reactive group in the present invention is preferably 1,000 to 1,000,000, more preferably 1,000 to 500,000 and further preferably 5,000 to 100,000. The above-described mass-average molecular weight can be measured as a polystyrene (PS)-reduced value using gel permeation chromatography (GPC).

When the optical alignment material having an optically reactive group is a polymer having a repeating unit derived from a monomer represented by the above-described formula (2), a method for producing the polymer is not particularly restricted. Use can be made of polymerization methods such as, for example, cationic polymerization and radical polymerization using a vinyl group, or anionic polymerization and the like, and among them, radical polymerization can be used widely and is particularly preferable. As the polymerization initiator for radical polymerization, known compounds such as radical thermal polymerization initiators, radical photopolymerization initiators and the like can be used, and particularly, it is preferable to use a radical thermal polymerization initiator. Here, the radical thermal polymerization initiator is a compound generating a radical by heating at the decomposition temperature or higher. Examples of such radical thermal polymerization initiators include diacyl peroxides (acetyl peroxide, benzoyl peroxide and the like), ketone peroxides (methyl ethyl ketone peroxide, cyclohexanone peroxide and the like), hydroperoxides (hydrogen peroxide, tert-butyl hydroperoxide, cumene hydroperoxide and the like), dialkyl peroxides (di-tert-butyl peroxide, dicumyl peroxide, dilauroyl peroxide and the like), peroxy esters (tert-butyl peroxy acetate, tert-butyl peroxy pivalate and the like), azo compounds (azobisisobutyronitrile, azobisisovaleronitrile and the like) and persulfates (ammonium persulfate, sodium persulfate, potassium persulfate and the like). Such radical thermal polymerization initiators can be used singly, or two or more of them can be used in combination.

The above-described radical polymerization method is not particularly restricted, and an emulsion polymerization method, a suspension polymerization method, a bulk polymerization method, a solution polymerization method and the like can be adopted. Solution polymerization which is a typical radical polymerization method will be described further specifically. Also for other polymerization methods, the outline is equivalent, and details thereof are described in, for example, the "Experimental Methods in Polymer Science (Kobunshi Kagaku Jikkenho)," The Society of Polymer Science, Japan, ed. (Kagaku-Dojin Publishing Company, 1981) and the like.

For effecting the above-described solution polymerization, organic solvents are used. These organic solvents can be arbitrarily selected in a range not deteriorating the object and the effect of the present invention. The organic solvents are usually organic compounds having a value of a boiling point under atmospheric pressure of 50 to 200° C., and organic solvents dissolving constituent components uniformly are desirable. Examples of preferable organic solvents include alcohols such as isopropanol, butanol and the like, ethers such as dibutyl ether, ethylene glycol dimethyl ether, tetrahydrofuran, dioxane and the like, ketones such as acetone, methyl ethyl ketone, methyl isobutyl ketone, cyclohexanone and the like, ester such as ethyl acetate, butyl acetate, amyl acetate, y-butyrolactone and the like, and aromatic hydrocarbons such as benzene, toluene, xylene and the like. These organic solvents can be used singly or two or more of them can be used in combination. Further, water-mixed organic solvents using the above-described organic solvent and water together can also be applied from the standpoint of solubility of monomers and the polymer generated.

Though the solution polymerization conditions are also not particularly restricted, it is desirable, for example, to perform heating in the temperature range of 50 to 200° C. for 10 minutes to 30 hours. Further, for preventing deactivation of generated radicals, it is desirable to conduct purging with an inert gas not only during solution polymerization but also before initiation of solution polymerization. As the inert gas, a nitrogen gas is usually suitably used.

For obtaining the optical alignment material having an optically reactive group in the present invention in a preferable molecular weight range, a radical polymerization method using a chain transfer agent is particularly effective. As the above-described chain transfer agent, any of mercaptans (for example, octylmercaptan, decylmercaptan, dodecylmercaptan, tert-dodecylmercaptan, octadecylmercaptan, thiophenol, p-nonylthiophenol and the like), polyhalogenated alkyls (for example, carbon tetrachloride, chloroform, 1,1,1-trichloroethane, 1,1,1-tribromooctane and the like) and low active monomers (α-methylstyrene, a-methylstyrene dimer and the like) can be used, and mercaptans having 4 to 16 carbons are preferable. The use amount of the chain transfer agents is significantly affected by the activity of the chain transfer agent, a combination of monomers, the polymerization condition and the like, and precise control thereof is necessary, and usually, the use amount is approximately 0.01 mol % to 50 mol %, preferably 0.05 mol % to 30 mol % and particularly preferably 0.08 mol % to 25 mol % with respect to the total number of moles of monomers used. The chain transfer agent may advantageously be present in the system simultaneously with the subject monomer of which degree of polymerization should be controlled during the polymerization process, and the addition method thereof is not particularly restricted. The chain transfer agent may be dissolved in a monomer and the solution may be added, or it is also possible to add the chain transfer agent separately from a monomer.

As other examples of the above-described optical alignment material, examples of the polymer containing a repeating unit derived from at least one of the monomers represented by the above-described formula (2) are shown below, but the optical alignment material is not limited to the examples below.

II-1

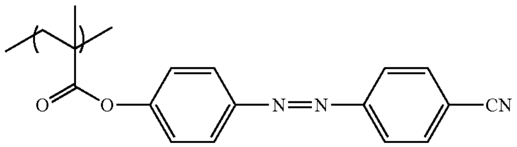

Mw.48000

II-2

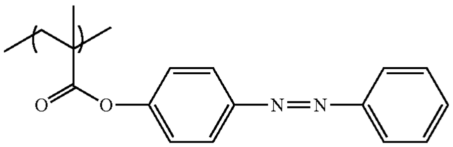

Mw.42000

II-3

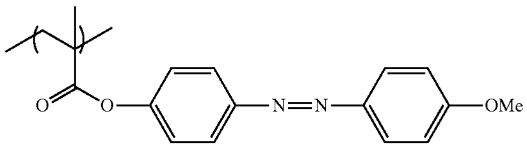

Mw.32000

II-4

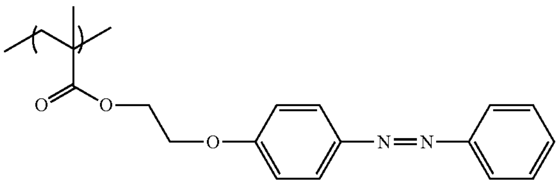

Mw.22000

-continued
II-5
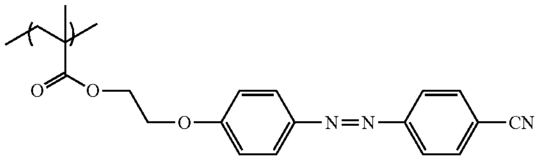
Mw.45000
II-6
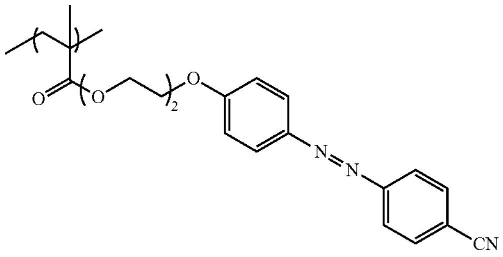
Mw.45000
II-7
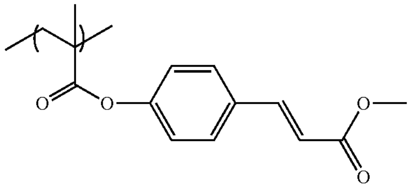
Mw.21000
II-8
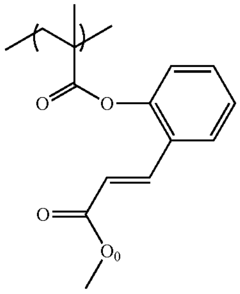
Mw.36000
II-9
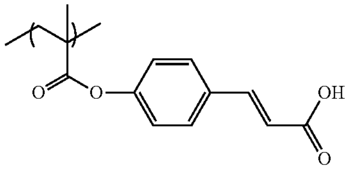
Mw.32000
II-10
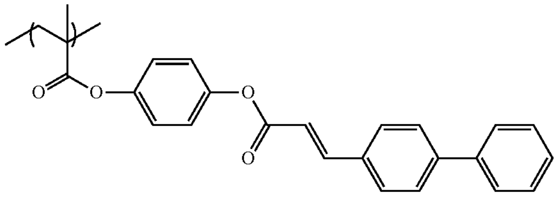
Mw.32000
II-11
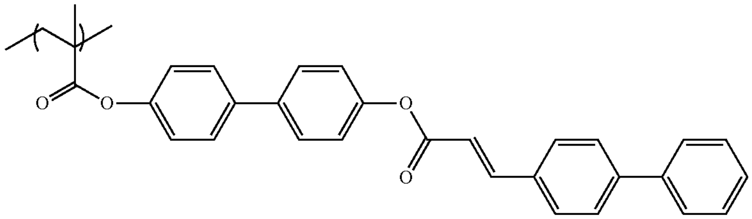
Mw.28000
II-12
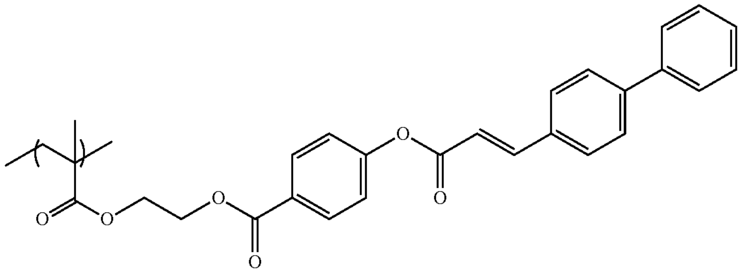
Mw.32000

-continued
II-13
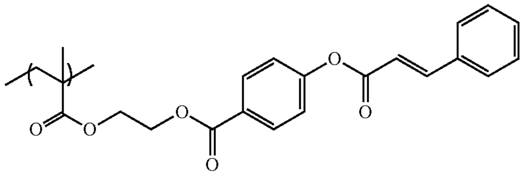
Mw.30000
II-14
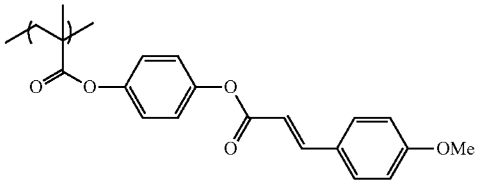
Mw.44000
II-15
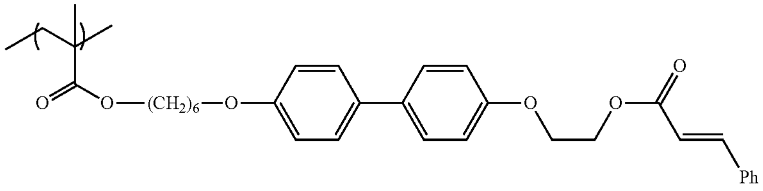
Mw.44000
II-16
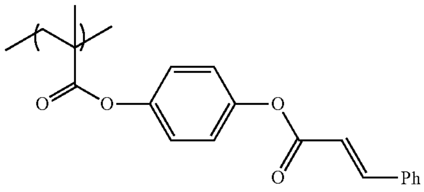
Mw.33000
II-17
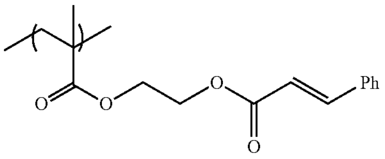
Mw.43000
II-18
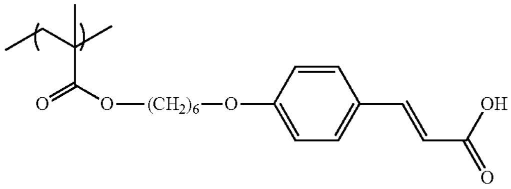
Mw.13000
II-19
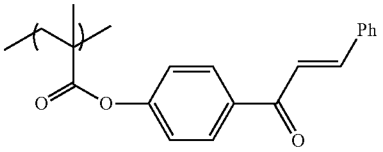
Mw.18000
II-20
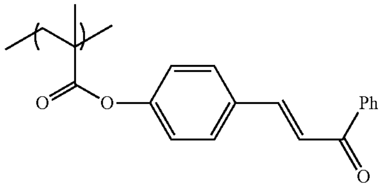
Mw.30000
II-21
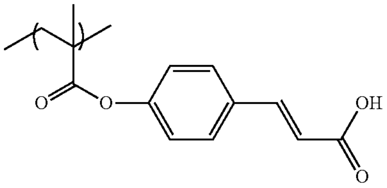
Mw.31000
II-22
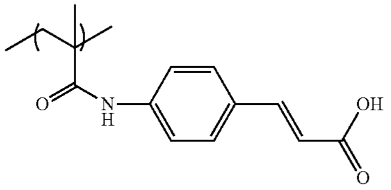
Mw.30000
II-23
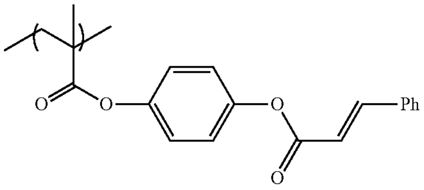
Mw.25000

-continued
II-24
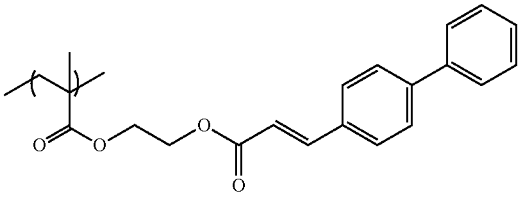
Mw.29000
II-25
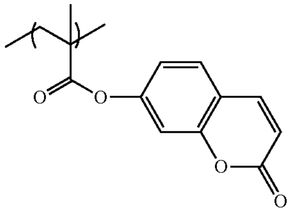
Mw.29000
II-26
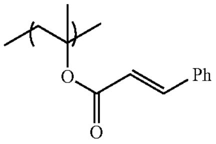
Mw.35000
II-27
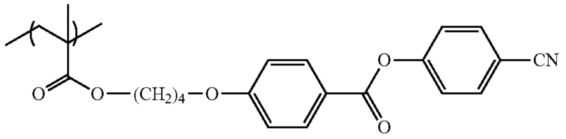
Mw.35000
II-28
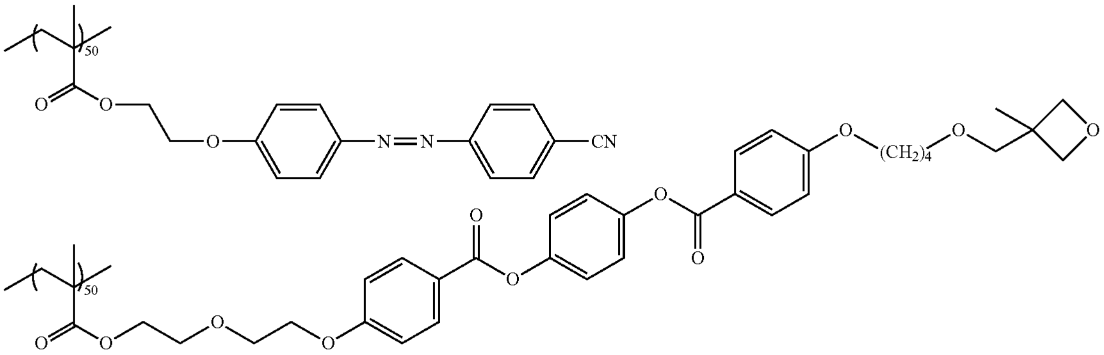
Mw. 28000
II-29
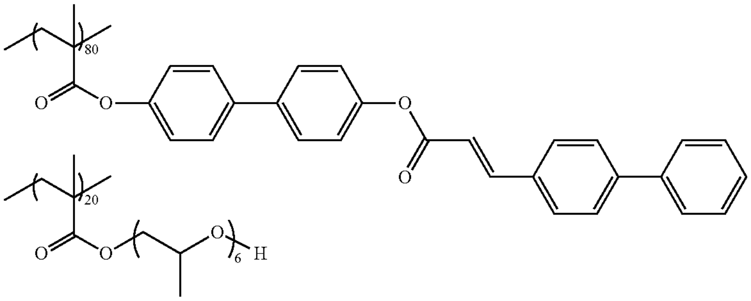
Mw. 32000
II-30
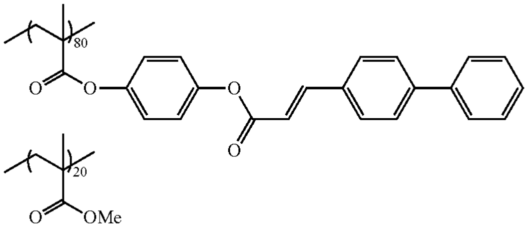
Mw. 32000
II-31
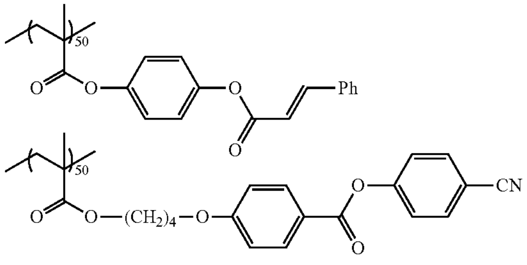
Mw. 30000

-continued

II-32

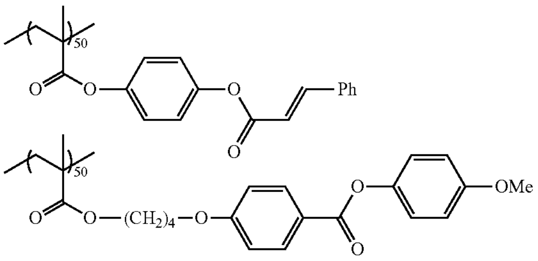

Mw. 18000

II-33

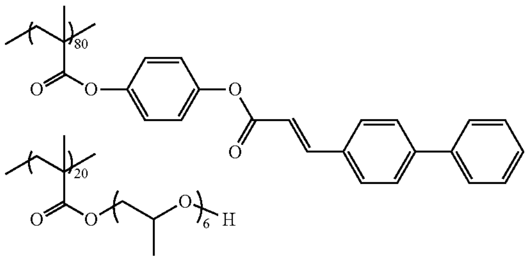

Mw.27000

II-34

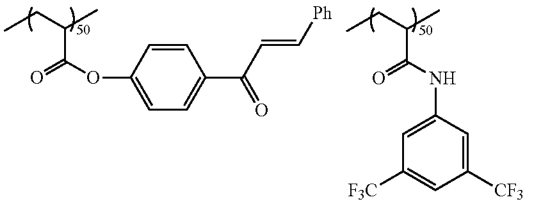

Mw.27000

II-35

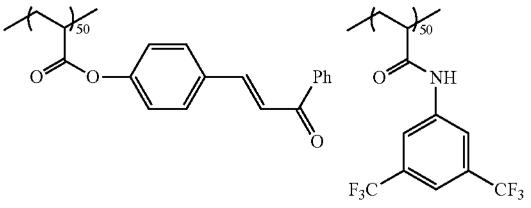

Mw.30000

II-36

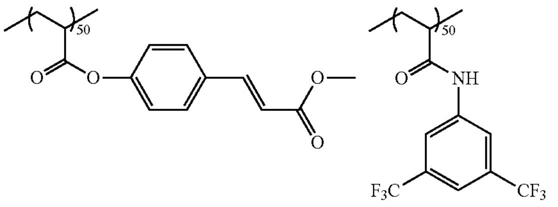

Mw.34000

II-37

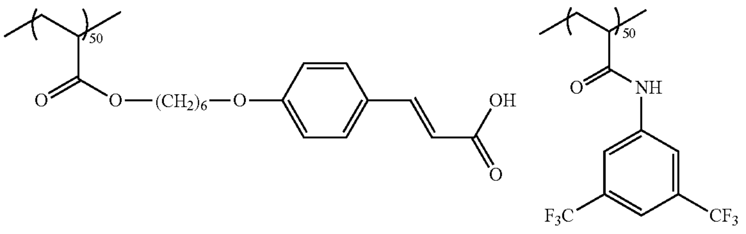

Mw.31000

II-38

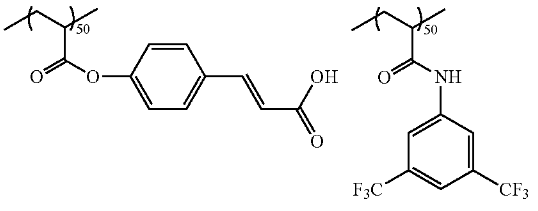

Mw.31000

II-39

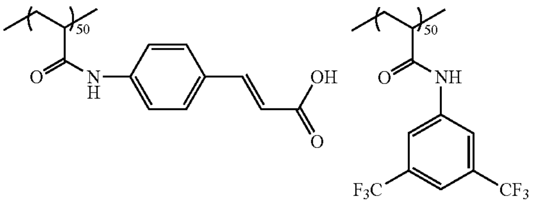

Mw.31000

1-(3) Substrate

The substrate in the polarizing film of the present invention can be selected from various materials depending on the application of the polarizing film. Examples thereof include alkali-free glass, soda glass, Pyrex (registered trademark) glass and quartz glass used in liquid crystal display devices, OLED devices and the like; photoelectric conversion device substrates used for solid-state image sensing devices and the like; silicon substrates; plastic substrates; and substrates obtained by forming a functional layer such as a transparent conductive film, a color filter film, an electrode, TFT and the like on these substrates. On these substrates, a black matrix isolating pixels may be formed, and a transparent resin layer may be provided for promotion of close adhesion, and the like. It is also preferable for the plastic substrate to carry a gas barrier layer and/or a solvent resistant layer on its surface.

The light transmittance values of the substrate used in the present invention are preferably 80% or more, that is, it is preferable that the substrate is transparent. As the plastic substrate, an optically isotropic polymer film is preferably used. For specific examples and preferable embodiments of the polymer, descriptions in JP-A2002-22942, paragraph number [0013] can be applied. Further, even conventionally known polymers tending to realize birefringence such as polycarbonates and polysulfones can be modified with molecules described in International Publication WO 00/26705 to lower its realizing property, and the resultant polymers can be used.

1-(4) Production Process of Polarizing Film

The polarizing film of the present invention can be produced, for example, by a process containing at least the following [1] to [3].

The polarizing film can be produced by a production process of a polarizing film, containing

[1] irradiating a photo alignment film formed on a substrate,

[2] coating a dichroic dye composition dissolved in an organic solvent on the photo alignment film, and

[3] aligning the coated film of the dichroic dye composition by heating at 50° C. or higher and 250° C. or lower to give a light absorption anisotropic film.

Production of Photo Alignment Film [1]:

The above-described photo alignment film can be produced by preparing a photo alignment film forming composition containing an optically aligning material of the above-described formula (1) or (2) as a coating solution, coating the coating solution on the surface of a substrate, and irradiating the coated film by a light, thereby optically aligning a compound having the above-described optically reactive group.

It is preferable for the above-described photo alignment film forming composition to contain the above-described optically-aligning material as the main component, and more specifically, the content thereof in all solid components excluding a solvent of the photo alignment film forming composition is preferably 50% by mass or more and particularly preferably 70% by mass or more from the standpoint of keeping an aligning property to the dichroic dye. The upper limit thereof is 100% by mass, that is, all solid components excluding a solvent of the photo alignment film forming composition may all of course be composed of the above-described optically-aligning material.

The above-described photo alignment film forming composition may contain at least one additive other than the above-described optically-aligning material. For example, the additive is added for the purpose of uniformly coating the above-described composition, thereby obtaining a photo alignment film of uniform film thickness. Examples of the additive include leveling agents, thixo agents, surfactants, ultraviolet absorbers, infrared absorbers, antioxidants, surface treating agents and the like, and these can be added in an approximate amount not extremely lowering the aligning ability of the nematic liquid crystalline azo dye to be used together.

It is preferable that the above-described photo alignment film forming composition is prepared in the form of a coating solution. Though the solvent to be used for preparing the coating solution is not particularly restricted, solvents dissolving the above-described optically active compounds are usually used. Examples thereof include alcohol solvents such as methanol, ethanol and the like, diol solvents such as ethylene glycol, propylene glycol, 1,3-butanediol and the like, ether solvents such as tetrahydrofuran, 2-methoxyethanol, 2-butoxyethanol, 2-(2-ethoxyethoxy)ethanol, 2-(2-butoxyethoxy)ethanol and the like, amide solvents such as 2-pyrrolidone, N-methylpyrrolidone, dimethylformamide, dimethylacetamide and the like, γ-butyrolactone, chlorobenzene, dimethyl sulfoxide, and the like. These can be used singly, or two or more of them can be mixed and used.

The composition is prepared in the form of a coating solution having a total solid concentration of preferably 0.2% by mass or more and more preferably approximately 0.5 to 10% by mass.

The above-described photo alignment film forming composition prepared in the form of a coating solution is coated on the surface to form a coated film. As the coating method, conventional known methods such as a spin coating method, a gravure printing method, a flexo printing method, an inkjet method, a die coating method, a cap coating method, dipping and the like can be carried out. Usually, since a solution diluted with an organic solvent is coated, the solution is dried after coating, to obtain a coated film for the photo alignment film.

Next, the coated film for the photo alignment film is irradiated with a light having anisotropy (hereinafter, abbreviated as a photoisomerization step) to generate a liquid crystal aligning ability, thereby giving a photo alignment film. The light having anisotropy used in the photoisomerization step includes polarized lights such as a linear polarized light, an elliptic polarized light and the like. Further, the surface of the coated film may be irradiated with an unpolarized light from a direction inclined to the surface.

The polarized light used in the photoisomerization step may be any of linear polarized lights and elliptic polarized lights, and it is preferable to use a linear polarized light having a high degree of polarization, for performing optical alignment efficiently. Further, a light from a light source can be allowed to pass through a polarization filter or a polarization prism such as a Glan-Thompson prism, a Glan-Taylor prism and the like, to obtain a linear polarized light.

On the other hand, in an embodiment of irradiating a film surface with an unpolarized light from an inclined direction in the photoisomerization step, the incident angle of the unpolarized light is preferably in the range of 10° to 80° to the substrate normal line, and in view of uniformity of irradiation energy at the irradiated surface, the resultant pre-tilt angle, alignment efficiency and the like, the incident angle is further preferably in the range of 20° to 60° and most preferably 45°.

The embodiment of irradiation with an unpolarized light from an inclined direction has advantages that a light irradiation apparatus does not need a polarization filter and the like, large irradiation intensity is obtained, and the irradiation time for optical alignment can be reduced.

The wavelength of the irradiation light is preferably in a wavelength region in which an optically active group of an optically active compound to be used shows absorption. For example, when the optically active group has an azobenzene structure, ultraviolet rays in the wavelength range of 330 to 500 nm in which strong absorption due to $\pi \rightarrow \pi^*$ transition of azobenzene is realized are particularly preferable.

The light source of the irradiation light includes a xenon lamp, a high pressure mercury lamp, an extra high pressure mercury lamp, a metal halide lamp, ultraviolet laser of KrF, ArF and the like. When the optically active group has an azobenzene structure, an extra high pressure mercury lamp generating particularly large emission intensity of an ultraviolet ray of 365 nm can be used effectively.

Also in an embodiment of using any of a polarized light and an unpolarized light in the above-described photoisomerization step, it is particularly preferable that the irradiation light is an approximately parallel light. If a photomask is used in irradiating a polarized light, a liquid crystal aligning ability can be generated along two or more different directions in the form of a pattern on a photo alignment film. Specifically, the above-described composition for photo alignment film is coated and dried, then, a photomask is covered on a substrate and the whole surface is irradiated with a polarized light or an unpolarized light, thereby giving a liquid crystal aligning ability to the exposed part in the form of a pattern. If necessary, this operation can be repeated several times to generate a liquid crystal aligning ability along several directions.

It is also possible to cool a photo alignment film after the above-described photoisomerization step. As the cooling method, the photo-isomerized coated film for the photo alignment film may only be cooled, and for example, the film is cooled together with a substrate by conventional known cooling apparatuses such as a cold plate, a chamber, a low temperature-controlled vessel and the like.

Regarding the cooling condition, the cooling time is 1 minute or more at a cooling temperature of 20° C., however, this is not the case under a cooling temperature of lower than 20° C. The cooling temperature may advantageously be not lower than the melting point of a solvent to be used, and usually, the cooling temperature is preferably in the range of -40° C. to 20° C. For obtaining a more stable photo alignment film having an improved liquid crystal aligning function, the cooling temperature is preferably 10° C. or lower and the cooling time is preferably 5 minutes or more. For further reducing the cooling time, the cooling temperature is preferably 5° C. or lower.

For preventing dew formation, cooling may be carried out under dry air or a nitrogen or argon atmosphere, or cooling may also be carried out while blowing dry air or nitrogen and the like onto a substrate.

As described above, a photo alignment film can be formed. The thickness of the photo alignment film to be formed is, in general, preferably approximately 0.01 to 10 μm and further preferably approximately 0.01 to 1 μm.

Coating Step [2]:

On the formed photo alignment film, a dichroic dye composition dissolved in an organic solvent is coated. It is preferable that the dichroic dye composition is prepared in the form of a coating solution. The solvent to be used for preparing the coating solution is preferably an organic solvent. Examples of usable organic solvents include amides (for example, N,N-dimethylformamide), sulfoxides (for example, dimethyl sulfoxide), hetero ring compounds (for example, pyridine), hydrocarbons (for example, benzene, toluene, hexane), alkyl halides (for example, chloroform, dichloromethane), esters (for example, methyl acetate, butyl acetate), ketones (for example, acetone, methyl ethyl ketone) and ethers (for example, tetrahydrofuran, 1,2-dimethoxyethane). Hydrocarbons, alkyl halides and ketones are preferable. Two or more organic solvents may be used together.

The method for preparing the coating solution of the above-described dichroic dye composition is not particularly restricted. The above-described at least one dichroic dye and the above-described at least one additive added if necessary (for example, a surfactant, a horizontal aligning agent and the like) are dissolved in a solvent to prepare the coating solution. In the coating solution, components may be incompletely dissolved, or dispersed and the like.

The above-described dichroic dye composition is prepared as a coating solution having a total solid concentration of preferably approximately 0.1 to 10% by mass and more preferably approximately 0.5 to 5% by mass. When a coating solution in this concentration range is prepared, a polarizing layer can be formed stably by a wet film-forming method.

The above-described dichroic dye composition prepared in the form of a coating solution is coated on the surface of a photo alignment film to forma coated film. As the coating method, conventional known methods such as a spin coating method, a gravure printing method, a flexo printing method, an inkjet method, a die coating method, a slit die coating method, a cap coating method, dipping and the like can be carried out. Usually, since a solution diluted with an organic solvent is coated, the solution is dried after coating, to obtain a coated film.

Light Absorption Anisotropic Film Forming Sstep [3]:

Next, the coated film of the above-described dichroic dye composition is aligned by heating at 50° C. or higher and 250° C. or lower, to form a light absorption anisotropic film. Solutes such as an organic solvent are evaporated from the coated film of the above-described dichroic dye composition, thereby aligning the above-described dichroic dye composition. Natural drying at room temperature is preferable. It is preferable to prevent disruption of alignment (to avoid thermal relaxation and the like) of the azo dye molecule formed by coating. It is also preferable to effect drying at lower temperature while evaporating a solvent by a decompression treatment.

Here, the decompression treatment means a procedure in which a substrate carrying a coated film is placed under pressure-reduced condition and a solvent is removed by evaporation. In this procedure, it is preferable that the substrate carrying a film is placed horizontally so that it does not flow from a higher position to the bottom position.

It is more desirable when the time until starting of the decompression treatment of the coated film after coating is shorter, and it is preferably 1 second or more and within 30 seconds.

As the method of the decompression treatment, it includes, for example, the following method. The coated film obtained by coating the coating solution is charged together with its substrate in a decompression treatment apparatus and subjected to a decompression treatment. Decompression treatment apparatuses as described in, for example, JP-A2006-201759, FIGS. 9 and 10 can be used. Details of the decompression treatment apparatus are described in JP-A2004-169975.

Regarding the condition of the decompression treatment, the pressure in the system in which the coated film is present is preferably $2\times10^4$ Pa or less, further preferably $1\times10^4$ Pa or less and particularly preferably $1\times10^3$ Pa or less. It is preferably 1 Pa or more and further preferably $1\times10^1$ Pa or more. Usually, it is preferable that the pressure finally reached in the system is as described above. When the pressure is above the upper limit, drying is impossible, thereby possibly causing disruption of alignment, and when below the lower limit, drying is too rapid, thereby possibly generating defects.

The decompression treatment time is preferably 5 seconds or more and within 180 seconds. When the decompression treatment time is above the upper limit, it is impossible to quickly dry the coated film before relaxation of alignment, thereby possibly causing disruption of alignment, and when below the lower limit, drying is impossible, thereby possibly causing disruption of alignment.

The temperature in the system in performing the decompression treatment is preferably 10° C. or higher and 60° C. or lower. When the temperature is above the upper limit, convection occurs in drying, thereby possibly generating ununiformity in the coated film, and when below the lower limit, drying is impossible, thereby possibly causing disruption of alignment.

When the above-described coated film is dried to align the dichroic dye composition, it may be heated for promoting alignment. The temperature is preferably 50° C. or higher and 250° C. or lower and further preferably 100° C. or higher and 250° C. or lower. It is particularly preferable that it is aligned by heating at the nematic liquid crystal phase temperature, then, cooled down to room temperature to cause vitrification. For lowering this alignment temperature, additives such as a plasticizer and the like may be used together in the dichroic dye composition.

For example, if the above-described dichroic dye composition is coated on the surface of the above-described photo alignment film, then, the molecule of at least one dichroic dye is aligned at the tilt angle of the alignment film at the boundary with the alignment film and aligned at the tilt angle of air boundary at the boundary with air. For producing a polarizing layer showing a high degree of polarization, it is preferable that the azo dye is horizontally aligned at all boundaries and the alignment is fixed.

In the present specification, "tilt angle" means an angle made by the long axis direction of the azo dye molecule and the boundary (alignment film boundary or air boundary). From the standpoint of polarization performance, the tilt angle at the alignment film side is preferably 0° to 10°, further preferably 0° to 5°, particularly preferably 0° to 2° and more further preferably 0° to 1°. The tilt angle at the air boundary side is preferably 0° to 10°, further preferably 0 to 5° and particularly preferably 0 to 2°.

For decreasing the tilt angle at the air boundary side of the molecule of the above-described dichroic dye down to the above-described range, it is preferable that the above-described composition contains a fluoro aliphatic group-containing compound, or a fluoro aliphatic group-containing copolymer containing at least one polymerization unit selected from the group consisting of a polymerization unit of a fluoro aliphatic group-containing monomer and a polymerization unit of an amide group-containing monomer. By aligning the dichroic dye molecule in the presence of at least one of them, the tilt angle at the air boundary side can be reduced to the above-described range.

Though the tilt angle at the alignment film side tends to be reduced by the action of the alignment film as compared with the tilt angle at the air boundary side, the above-described alignment film tilt controlling agent can be added into the above-described composition, to reduce the tilt angle at the alignment film side, thereby stably attaining a horizontal alignment of the azo dye molecule.

In an embodiment in which the above-described dichroic dye composition contains the above-described non-liquid crystalline radical polymerizable polyfunctional monomer, and a curing component such as the above-described polymerization initiator, it is preferable, after making the azo dye molecule into the desired alignment, to promote polymerization and curing by light irradiation (preferably, ultraviolet irradiation) or heating, or a combination of them. The value of light irradiation energy for polymerization and the like can refer to descriptions in JP-A2001-91741, paragraphs [0050] to [0051].

As described above, the light absorption anisotropic film can be formed. The thickness of the film is preferably 0.01 to 2 μm and further preferably 0.05 to 2 μm.

By fixing the alignment of the above-described dichroic dye composition, a device (polarizing device) can be formed having optical absorption anisotropy and having a function as a high feature polarizing film characterized by the period of diffraction peaks and the half-value width.

On the absorption anisotropic film formed, a protective layer, a sticky layer and a reflection preventing layer may be further formed.

For forming a liquid crystal device using the above-described anisotropic film, it may be recommended that a transparent electrode of ITO and the like is formed on a supporting medium (substrate) and an anisotropic dye film (polarizing film) is formed on the electrode, in the above-described steps (1) to (3).

1-(5) Other Functional Layers

It is preferable for the polarizing film of the present invention to have a color filter layer between a substrate and the above-described light absorption anisotropic film. In addition to the color filter layer, other functional layers such as a transparent conductive film, a color filter film, an electrode, TFT and the like may be contained. A black matrix isolating pixels may also be formed.

In the polarizing film of the present invention, a transparent resin curing layer may be present on the light absorption anisotropic film.

2. Display Device

The display device of the present invention has at least one polarizing film of the present invention. Its constitution and the like are not particularly restricted.

Specifically mentioned are transmission type, reflection type or semi-transmission type liquid crystal display devices of various modes such as TN, STN, VA, ECB, IPS, OCB, blue phase and the like, and OLED and the like. Particularly preferable are display devices having the polarizing film of the present invention disposed on the inner face side of a substrate (a so-called, in-cell polarizer) and further preferable are display devices having the polarizing film laminated on a color filter substrate. By such constitutions, lowering of contrast due to a scattering light generated as a result of depolarization by a color filter layer can be reduced.

EXAMPLES

The present invention will be described further in detail based on examples and referring to comparative examples below. Materials, use amounts, proportions, treatment contents, treatment procedures and the like shown in the following examples can be appropriately changed providing that they do not deviate from the essence of the present invention. Therefore, the scope of the present invention should not be interpreted in a limited way by specific examples shown below.

Measurements regarding the optical properties of a light absorption anisotropic film in the following examples were carried out as described below.

<Dichroic Ratio of Light Absorption Anisotropic Film>

The dichroic ratio was calculated according to the following formula, after measuring the absorbance of a light absorption anisotropic film by a spectral photometer having an iodine-based polarizing device disposed in the incidence optical system.

$$\text{Dichroic ratio}(D)=Az/Ay$$

Az: absorbance with respect to polarized light along absorption axis direction of light absorption anisotropic film Ay: absorbance with respect to polarized light along polarizing axis direction of light absorption anisotropic film <Depolarization Index of Polarizing Film>

A liquid crystal television was disassembled, and a back-light module was prepared and used as a light source. A luminance meter BM-5 manufactured by TOPCON Corporation was placed at a position distant by 70 cm from the light source along the perpendicular direction so that the luminance could be measured with a view field of 1°.

Measurement of the degree of polarization of the iodine-based polarizing device for measurement was conducted as described below. A polarizing device for measurement 1 and a polarizing device for measurement 2 were laminated in this order on the light source, each in a closely adhered manner. The luminance was measured in a case in which the relative orientation of the transmission axis of the polarizing device for measurement 1 and the transmission axis of the polarizing device for measurement 2 was 0°, that is, a case of parallel arrangement, and in a case in which the relative orientation was 90°, that is, a case of crossed arrangement, and the degree of polarization P was calculated according to the following formula.

[Numerical formula 1]

$$Cont = \frac{\text{luminance of parallel arrangement}}{\text{luminance of crossed arrangement}}$$

$$P = \sqrt{\frac{Cont - 1}{Cont + 1}}$$

Measurement of the degree of polarization P' of the polarizing film of the present invention was carried out in the same manner as for measurement of the degree of polarization of the polarizing device for measurement.

Measurement of the depolarization index DI' of the polarizing film of the present invention was carried out as described below. A polarizing device for measurement 1, a polarizing film and a polarizing device for measurement 2 were laminated in this order on the light source, each in closely adhered manner. The luminance was measured in a case in which the relative orientation of the transmission axis of the polarizing film and the polarizing device for measurement 2 was 0° with respect to the polarizing device for measurement 1, that is, a case of parallel arrangement, and in a case in which the relative orientation was 90°, that is, a case of crossed arrangement, and the depolarization index DI' was calculated according to the following formula. Here, P represents the degree of polarization of the polarizing device for measurement and P' represents the degree of polarization of the polarizing film.

[Numerical formula 2]

$$X = \frac{\text{luminance of parallel arrangement}}{\text{luminance of crossed arrangement}}$$

$$DI' = \frac{1 + 2PP' + P^2 + X(P^2 - 1)}{P^2(1 + X)}$$

<Periodic Structure of Light Absorption Anisotropic Film>

The period and the half-value width of a light absorption anisotropic film were determined by inplane measurement profiles and φ scan profiles using an X-ray diffractometer for thin film evaluation (manufactured by Rigaku Corporation, trade name: "ATX-G" inplane optical system). Both measurements were carried out at an incident angle of 0.18° using CuKα.

The relationship between the diffraction angle and the distance was converted according to $$d=\lambda/(2*\sin\theta)$$

(d; distance, Λ; incident X-ray wavelength (CuKα; 1.54 Å).

Example 1

To 1 part by mass of an optical alignment material E-1 having the following structure were added 49.5 parts by mass of N-methylpyrrolidone and 49.5 parts by mass of 2-butoxyethanol, and the resultant solution was filtrated under pressure through a 0.45 μm film filter. The resultant coating solution for photo alignment film was spin-coated on a glass substrate, and dried at 100° C. for 1 minute. The resultant coated film was irradiated with a linear polarized ultraviolet ray using a polarized ultraviolet exposing apparatus (illuminance: 140 mW, irradiation time: 35 seconds, irradiance amount: 5 J/cm²).

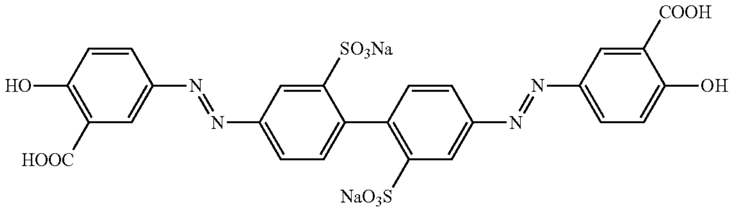

E-1

On the resultant glass substrate with the photo alignment film, a dichroic dye solution prepared by dissolving 1 part by mass of a magenta azo dye A-16 having the following structure (compound of the formula (I)) in 99 parts by mass of chloroform was spin-coated, to form a light absorption anisotropic film. As described above, a polarizing film was fabricated. The dichroic ratio, the degree of polarization and the depolarization index of the resultant polarizing film, and the periodic structures of the light absorption anisotropic film (period and half-value width) are shown in Table 1. This light absorption anisotropic film did not show the maximum value in the range of ±70° of the film normal line direction in a plane vertical to the alignment axis. The film thickness of the photo alignment film was 100 nm, and the film thickness of the light absorption anisotropic film was 170 nm.

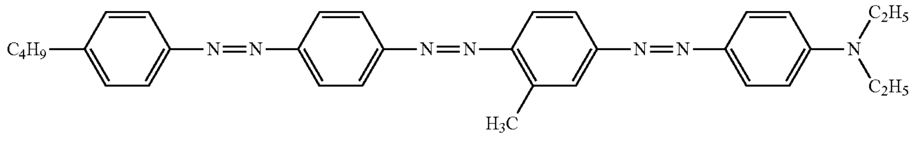

A-16

K 137° C. N 266° C. I (K: crystal phase, N: nematic phase, I: isotropic phase)

Example 2

To 2 parts by mass of an optical alignment material II-1 having the following structure was added 98 parts by mass 1,1,2-trichloroethane and the resultant solution was filtrated under pressure through a 0.45 μm film filter. The resultant coating solution for photo alignment film was spin-coated on a glass substrate, and dried at 100° C. for 1 minute. The resultant coated film was irradiated with a linear polarized ultraviolet ray using a polarized ultraviolet exposing apparatus (illuminance: 140 mW, irradiation time: 35 seconds, irradiance amount: 5 $J/cm^2$), then, heated at 230° C. for 5 minutes.

II-1

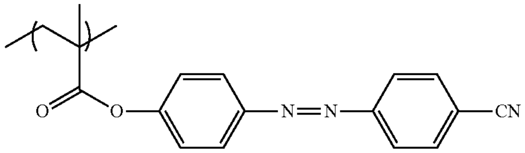

Mw.48000

On the resultant glass substrate with the photo alignment film, a dichroic dye solution prepared by dissolving 1 part by mass of a magenta azo dye C-9 having the following structure (compound of the formula (I)) in 99 parts by mass of chloroform was spin-coated, to form a light absorption anisotropic film. As described above, a polarizing film was fabricated. The dichroic ratio, the degree of polarization and the depolarization index of the resultant polarizing film, and the periodic structures of the light absorption anisotropic film (period and half-value width) are shown in Table 1. This light absorption anisotropic film did not show the maximum value in the range of ±70° of the film normal line direction in a plane vertical to the alignment axis. The film thickness of the photo alignment film was 100 nm, and the film thickness of the light absorption anisotropic film was 170 nm.

C-9

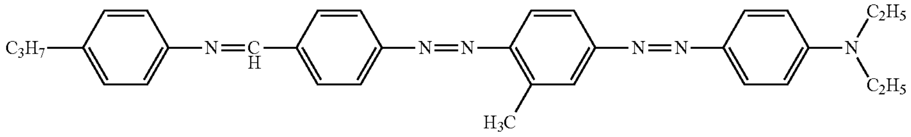

K 167° C. N 288° C. I

Example 3

To 1 part by mass an optical alignment material II-12 having the following structure was added 99 parts by mass of tetrahydrofuran, and the resultant solution was filtrated under pressure through a 0.45 pm film filter. The resultant coating solution for photo alignment film was spin-coated on a glass substrate, and dried at 100° C. for 1 minute. The resultant coated film was irradiated with a linear polarized ultraviolet ray using a polarized ultraviolet exposing apparatus (illuminance: 140 mW, irradiation time: 35 seconds, irradiance amount: 5 $J/cm^2$).

II-12

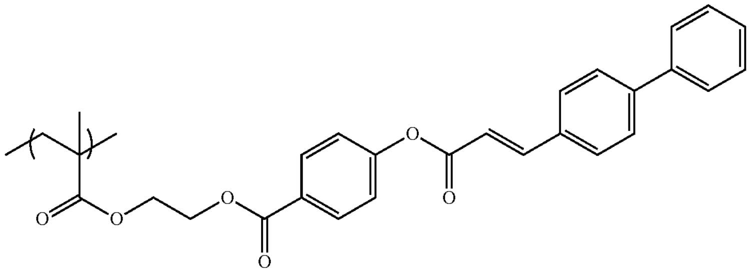

Mw.32000

On the resultant glass substrate with the photo alignment film, a dichroic dye solution prepared by dissolving 0.5 parts by mass of the above-described magenta azo dye A-16 (compound of the formula (I)) and 0.5 parts by mass of a magenta azo dye B-4 having the following structure (compound of formula (I)) in 99 parts by mass of chloroform was spin-coated, to form a light absorption anisotropic film. As described above, a polarizing film was fabricated. The dichroic ratio, the degree of polarization and the depolarization index of the resultant light absorption anisotropic film, and the periodic structures of the light absorption anisotropic film (period and half-value width) are shown in Table 1. This light absorption anisotropic film did not show the maximum value in the range of ±70° of the film normal line direction in a plane vertical to the alignment axis. The film thickness of the photo alignment film was 100 nm, and the film thickness of the light absorption anisotropic film was 170 nm.

B-4

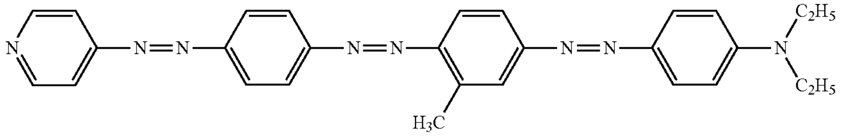

K 235° C. N 240° C. I

Example 4

To 1 part by mass an optical alignment material II-36 having the following structure was added 99 parts by mass of tetrahydrofuran, and the resultant solution was filtrated under pressure through a 0.45 μm film filter. The resultant coating solution for photo alignment film was spin-coated on a glass substrate, and dried at 100° C. for 1 minute. The resultant coated film was irradiated with a linear polarized ultraviolet ray using a polarized ultraviolet exposing apparatus (illuminance: 140 mW, irradiation time: 35 seconds, irradiance amount: 5 J/$cm^2$).

II-36

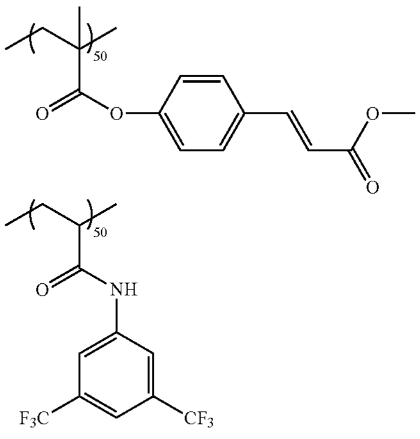

Mw.34000

On the resultant glass substrate with the photo alignment film, a dichroic dye solution prepared by dissolving 0.87 parts by mass of a yellow azo dye A2-3 having the following structure (compound of the formula (II)) and 0.13 parts by mass of a cyan squarylium dye VI-2 having the following structure in 99 parts by mass of chloroform was spin-coated, to form a light absorption anisotropic film. As described above, a polarizing film was fabricated. The dichroic ratio, the degree of polarization and the depolarization index of the resultant polarizing film, and the periodic structures of the light absorption anisotropic film (period and half-value width) are shown in Table 1. This light absorption anisotropic film did not show the maximum value in the range of ±70° of the film normal line direction in a plane vertical to the alignment axis. The film thickness of the photo alignment film was 100 nm, and the film thickness of the light absorption anisotropic film was 170 nm.

A2-3

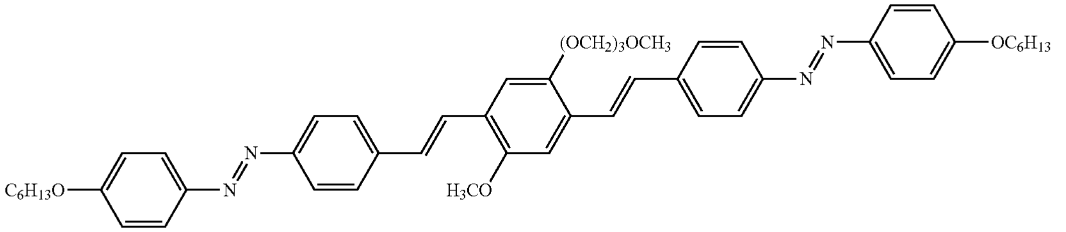

K 138° C. N 284° C. I

VI-2

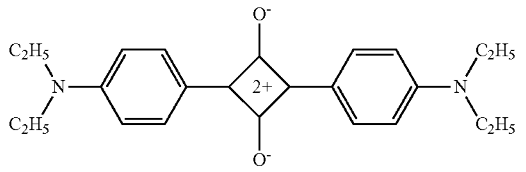

Example 5

A glass substrate with a photo alignment film was fabricated according to Example 2, using the above-described optical alignment material II-1.

On the resultant glass substrate with the photo alignment film, a dichroic dye solution prepared by dissolving 0.15 parts by mass of the above-described yellow azo dye A2-3 (compound of the formula (II)), 0.30 parts by mass of a magenta azo dye A-46 having the following structure (compound of the formula (I)), 0.15 parts by mass of a cyan azo dye A3-1 having the following structure (compound of the formula (III)) and 0.40 parts by mass of a cyan azo dye A4-120 having the following structure (compound of the formula (IV)) in 99 parts by mass of chloroform was spin-coated, and heated at 180° C. for 30 seconds, then, cooled to room temperature, to form a light absorption anisotropic film. As described above, a polarizing film was fabricated. The dichroic ratio, the degree of polarization and the depolarization index of the resultant polarizing film, and the periodic structures of the light absorption anisotropic film (period and half-value width) are shown in Table 1. This light absorption anisotropic film did not show the maximum value in the range of ±70° of the film normal line direction in a plane vertical to the alignment axis. The film thickness of the photo alignment film was 100 nm, and the film thickness of the light absorption anisotropic film was 170 nm.

A-46

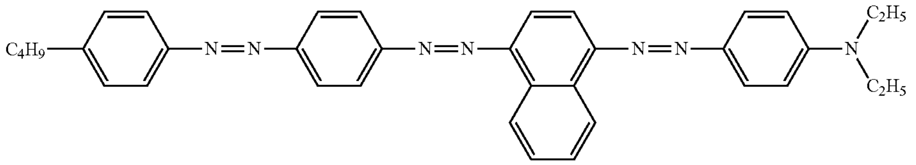

K 158° C. N 240° C. I

A3-1

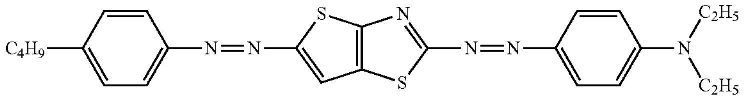

K 200° C. N 237° C. I

A4-120

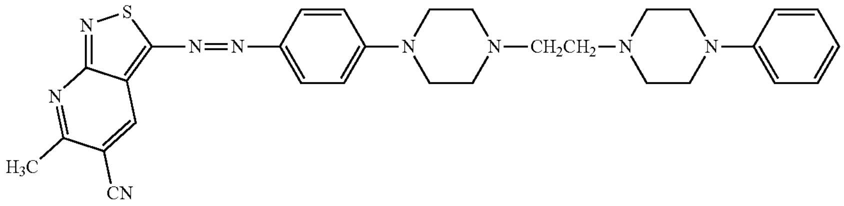

Example 6

A glass substrate with a photo alignment film was fabricated according to Example 2, using the above-described optical alignment material II-1.

On the resultant glass substrate with the photo alignment film, a dichroic dye solution prepared by dissolving 0.87 parts by mass of the above-described yellow azo dye A2-3 (compound of the formula (II)) and 0.13 parts by mass of a cyan squarylium dye VI-5 having the following structure in 99 parts by mass chloroform was spin-coated, to form a light absorption anisotropic film. As described above, a polarizing film was fabricated. The dichroic ratio, the degree of polarization and the depolarization index of the resultant light absorption anisotropic film, and the periodic structures of the light absorption anisotropic film (period and half-value width) are shown in Table 1. This light absorption anisotropic film did not show the maximum value in the range of ±70° of the film normal line direction in a plane vertical to the alignment axis. The film thickness of the photo alignment film was 100 nm, and the film thickness of the light absorption anisotropic film was 170 nm.

VI-5

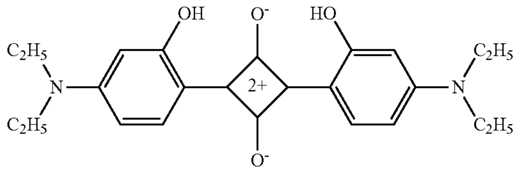

Comparative Example 1

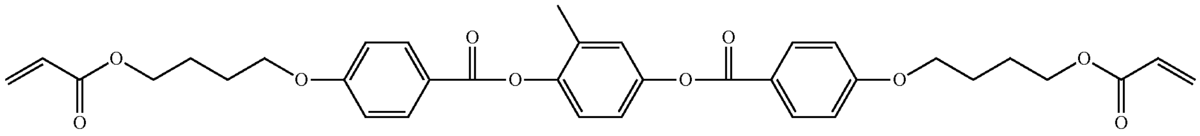 [SMILES: C=CC(=O)OCCCCOc1ccc(C(=O)Oc2ccc(OC(=O)c3ccc(OCCCCOC(=O)C=C)cc3)c(C)c2)cc1]

Rod-Shaped Liquid Crystal (B)

In 80 parts by mass of chloroform, 20 parts by mass of the above-described rod-shaped liquid crystal (B) was dissolved by stirring, to obtain a solution for light absorption anisotropic film. This solution was spin-coated on a glass substrate with a polyvinyl alcohol alignment film (manufactured by Nissan Chemical Industries, Ltd., trade name: PVA-103) on which a homogeneous alignment treatment had been performed by rubbing, and dried naturally to obtain a light absorption anisotropic film.

The resultant light absorption anisotropic film had a dichroic ratio of 6 and a depolarization index of $1.2*10^{-2}$. The X-ray diffraction patterns obtained from a direction vertical to the alignment axis of the film are shown in FIG. 1. One peak was detected in a direction vertical to the alignment axis. The period and the half-value width determined from the peak are shown in the table below. An X-ray diffraction pattern was not recognized in a direction parallel to the alignment axis of this film.

Comparative Example 2

A polarizing film was fabricated according to methods of examples described in JP-A2001-330726 (the above-described Patent Document 7).

Specifically, a 2% by mass toluene solution of polyvinyl cinnamate was coated on a glass substrate by a bar coater, dried at room temperature, then, a photo alignment film having a thickness of 100 nm was obtained. Using an extra high pressure mercury lamp as a light source, a linear polarized light was extracted through a polarization filter for ultraviolet, and the above-described resultant photo alignment film was irradiated with a polarized ultraviolet ray. On this aligned photo alignment film, a material obtained by dissolving a black dichroic dye S-428 (manufactured by Mitsui Toatsu Chemicals Inc.) in an amount of 2% by mass in an ultraviolet curing liquid crystal UCL-001-K1 (manufactured by DIC Corporation) was coated by a bar coater, then, cured by irradiating with an unpolarized ultraviolet ray.

The dichroic ratio, the degree of polarization, the depolarization index and the periodic structures (period and half-value width) of the resultant polarizing film are shown in Table 1. The film thickness of the light absorption anisotropic film was 2000 nm.

Comparative Example 3

To 91 parts by mass of water was added 9 parts by mass of a sodium salt of a dichroic dye compound described in Example 16 of JP-A2006-79030 shown in the following formula (A), dissolved by stirring, then, the solution was filtrated to obtain a dichroic dye composition coating solution. Next, on an alignment film which had been formed on a glass substrate and rubbed, the above-described coating solution was coated, and dried naturally to fabricate a polarizing film. As the alignment film, a polyimide alignment film was used. The dye of the following formula (A) was a lyotropic liquid crystalline dye not showing thermotropic liquid crystallinity.

The resultant polarizing film had a dichroic ratio of 9, a degree of polarization of 89 and a depolarization index of $1.1*10^{-3}$. The film thickness of the alignment film was 300 nm, and the film thickness of the light absorption anisotropic film was 450 nm. Regarding the plane smoothness of this film, irregularities of a period of several tens of nm were recognized in a direction parallel to the rubbing direction, that is, the film was inferior as compared with the examples.

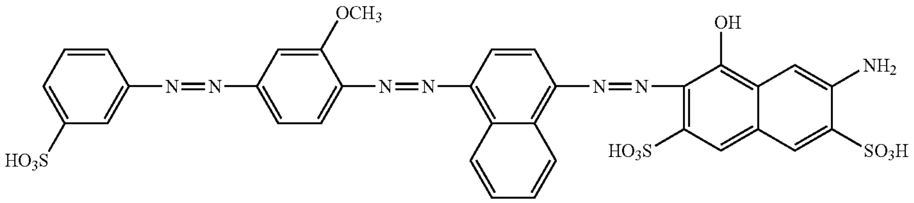 [SMILES: COc1cc(N=Nc2cccc(S(=O)(=O)O)c2)ccc1N=Nc1ccc(N=Nc2c(S(=O)(=O)O)cc3cc(S(=O)(=O)O)c(N)cc3c2O)c2ccccc12]

TABLE 1

| | Vertical to alignment axis | | Parallel to alignment axis | | | | |
|---|---|---|---|---|---|---|---|
| No. | period | half-value width | period | half-value width | dichroic ratio | degree of polarization | depolarization index |
| Example 1 | 4.81 Å | 0.18 Å | 3.97 Å | 0.095 Å | 44 | 96.1 | $1.75*10^{-4}$ |
| | 4.00 Å | 0.14 Å | | | | | |
| | 3.33 Å | 0.078 Å | | | | | |

TABLE 1-continued

| No. | Vertical to alignment axis period | Vertical to alignment axis half-value width | Parallel to alignment axis period | Parallel to alignment axis half-value width | dichroic ratio | degree of polarization | depolarization index |
|---|---|---|---|---|---|---|---|
| Example 2 | 4.81 Å | 0.30 Å | 3.97 Å | 0.095 Å | 48 | 86.7 | $4.13*10^{-4}$ |
| | 3.94 Å | — | 3.94 Å | 0.083 Å | | | |
| Example 3 | 4.81 Å | 0.19 Å | 6.73 Å | 0.25 Å | 45 | 85.2 | $8.99*10^{-4}$ |
| | 3.87 Å | 0.17 Å | 4.53 Å | 0.58 Å | | | |
| | | | 3.37 Å | 0.065 Å | | | |
| Example 4 | 5.04 Å | 0.49 Å | 14.87 Å | 1.81 Å | 42 | 58.3 | $2.63*10^{-4}$ |
| | 3.96 Å | — | | | | | |
| | 3.65 Å | — | | | | | |
| Example 5 | 4.39 Å | 0.65 Å | 30.87 Å | 5.03 Å | 26 | 96.1 | $1.75*10^{-4}$ |
| | | | 15.38 Å | 1.31 Å | | | |
| Example 6 | 5.04 Å | 0.49 Å | 14.87 Å | 1.81 Å | 39 | 54.3 | $2.90*10^{-4}$ |
| | 3.96 Å | — | | | | | |
| | 3.65 Å | — | | | | | |
| Comparative Example 1 | 4.55 Å | 1.46 Å | — | — | 6 | — | $1.20*10^{-2}$ |
| Comparative Example 2 | 4.51 Å | 1.67 Å | — | — | 15 | 83.3 | $1.01*10^{-3}$ |

The invention claimed is:

1. A polarizing film comprising a substrate, and an optical alignment film and an optical absorption anisotropic film laminated on the substrate in this order, wherein the optical absorption anisotropic film is obtained by fixing the alignment of a dichroic dye composition comprising two or more nematic liquid crystalline dichroic dyes, wherein the dichroic dyes have a molecular length of 17 Å or more and an aspect ratio of 1.7 or more;

in X-ray diffraction measurement thereof, diffraction peaks derived from periodic structure along a vertical direction to the alignment axis are present, the period indicated by at least one of the diffraction peaks is 3.0 to 15.0 Å and an intensity of the diffraction peak does not show a maximum value in the range of ±70° of the film normal line direction in a plane vertical to the alignment axis; and wherein said dichroic dye composition comprises two or more dichroic dyes which are selected from dichroic dyes represented by the following formula (II), the following formula (III), the following formula (IV) or the following formula (VI):

Formula (II)

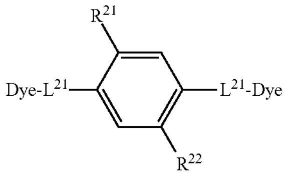

wherein, $R^{21}$ and $R^{22}$ each represent a hydrogen atom, an alkyl group, an alkoxy group or a substituent represented by $-L^{22}-Y$, provided that, at least one of them represents a group other than a hydrogen atom; $L^{22}$ represents an alkylene group, and one $CH_2$ group or non-adjacent two or more $CH_2$ groups present in the alkylene group may each be substituted with —O—, —COO—, —OCO—, —OCOO—, —NRCOO—, —OCONR—, —CO—, —S—, —$SO_2$—, —NR—, —$NRSO_2$— or —$SO_2NR$— and R represents a hydrogen atom or an alkyl group having 1 to 4 carbons; Y represents a hydrogen atom, a hydroxy group, an alkoxy group, a carboxyl group, a halogen atom or a polymerizable group; $L^{21}$s each represent a linking group selected from the group consisting of an azo group (—N═N—), a carbonyloxy group (—C(═O)O—), an oxycarbonyl group (—O—C(═O)—), an imino group (—N═CH—) and a vinylene group (—C═C—); Dye each represents an azo dye residue represented by the following formula (IIa);

(IIa)

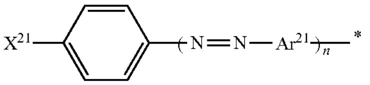

in the formula (IIa), * represents a linkage part to $L^{21}$; $X^{21}$ represents a hydroxy group, a substituted or un-substituted alkyl group, a substituted or un-substituted alkoxy group, an un-substituted amino group or a mono or dialkylamino group; $Ar^{21}$s each represent an aromatic hydrocarbon ring group optionally having a substituent or aromatic heterocyclic group optionally having a substituent; n represents an integer of 1 to 3, and when n is 2 or more, two $Ar^{21}$s may be mutually the same or different;

Formula (III)

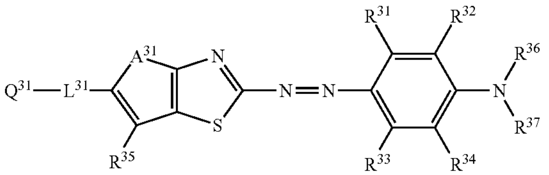

wherein, $R^{31}$ to $R^{35}$ each represent independently a hydrogen atom or a substituent; $R^{36}$ and $R^{37}$ each represent independently a hydrogen atom or an alkyl group optionally having a substituent; $Q^{31}$ represents an aromatic hydrocarbon group optionally having a substituent, aromatic heterocyclic group optionally having a substituent or cyclohexane ring group optionally having a substituent; $L^{31}$ represents a divalent linking group; $A^{31}$ represents an oxygen atom or a sulfur atom;

Formula (IV)

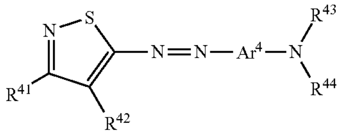

wherein, $R^{41}$ and $R^{42}$ each represent a hydrogen atom or a substituent, and may be mutually linked to form a ring; $Ar^4$ represents an optionally substituted divalent aromatic hydrocarbon group or an optionally substituted aromatic heterocyclic group; $R^{43}$ and $R^{44}$ each represent a hydrogen atom or an optionally substituted alkyl group, and may be mutually linked to form a hetero ring;

Formula (VI)

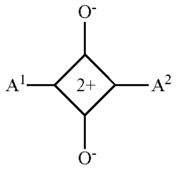

wherein, $A^1$ and $A^2$ each represent independently a substituted or un-substituted hydrocarbon ring group or a substituted or un-substituted hydrocarbon heterocyclic group.

2. The polarizing film according to claim 1, wherein at least one diffraction peak of said optical absorption anisotropic film is a diffraction peak derived from the periodic structure along the inplane direction.

3. The polarizing film according to claim 1, wherein said optical absorption anisotropic film shows diffraction peaks derived from the periodic structure along a direction parallel to the alignment axis in X-ray diffraction measurement thereof.

4. The polarizing film according to claim 3, wherein the period indicated by at least one of said diffraction peaks is 3.0 to 50.0 Å.

5. The polarizing film according to claim 1, wherein the half-value width of at least one of said diffraction peaks is 1.0 Å or less.

6. The polarizing film according to claim 1, wherein at least one diffraction peak of said optical absorption anisotropic film is a diffraction peak derived from the periodic structure along the inplane direction, and said optical absorption anisotropic film shows diffraction peaks derived from the periodic structure along a direction parallel to the alignment axis in X-ray diffraction measurement thereof.

7. The polarizing film according to claim 1, wherein at least one diffraction peak of said optical absorption anisotropic film is a diffraction peak derived from the periodic structure along the inplane direction, and the half-value width of at least one of said diffraction peaks is 1.0 Å or less.

8. The polarizing film according to claim 1, wherein at least one diffraction peak of said optical absorption anisotropic film is a diffraction peak derived from the periodic structure along the inplane direction, said optical absorption anisotropic film shows diffraction peaks derived from the periodic structure along a direction parallel to the alignment axis in X-ray diffraction measurement thereof, and the period indicated by at least one of said diffraction peaks is 3.0 to 50.0 Å.

9. The polarizing film according to claim 1, wherein at least one diffraction peak of said optical absorption anisotropic film is a diffraction peak derived from the periodic structure along the inplane direction, said optical absorption anisotropic film shows diffraction peaks derived from the periodic structure along a direction parallel to the alignment axis in X-ray diffraction measurement thereof, and the half-value width of at least one of said diffraction peaks is 1.0 Å or less.

10. A display device comprising the polarizing film according to claim 1.

11. A process for producing the polarizing film according to claim 1, comprising at least the following [1] to [3] in this order;

[1] irradiating an optical alignment film formed on a substrate,

[2] coating a dichroic dye composition dissolved in an organic solvent on the optical alignment film, and

[3] aligning the coated film of the dichroic dye composition by heating at 50° C. or higher and 250° C. or lower to give an optical absorption anisotropic film.

* * * * *